(12) United States Patent
Karner et al.

(10) Patent No.: US 10,308,180 B2
(45) Date of Patent: Jun. 4, 2019

(54) REAR BACKUP SYSTEM FOR A VEHICLE

(71) Applicant: MAGNA ELECTRONICS INC., Auburn Hills, MI (US)

(72) Inventors: Lee Karner, Holland, MI (US); Kenneth Schofield, Holland, MI (US); Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/203,953

(22) Filed: Nov. 29, 2018

(65) Prior Publication Data

US 2019/0092238 A1 Mar. 28, 2019

Related U.S. Application Data

(63) Continuation of application No. 15/790,173, filed on Oct. 23, 2017, now Pat. No. 10,144,353, which is a (Continued)

(51) Int. Cl.
*H04N 7/18* (2006.01)
*B60R 1/00* (2006.01)
(Continued)

(52) U.S. Cl.
CPC ............ *B60R 1/00* (2013.01); *B29C 45/0017* (2013.01); *B29C 45/14639* (2013.01); (Continued)

(58) Field of Classification Search
CPC .. B60R 1/00; B60R 1/04; B60R 11/04; B60R 1/12; B60R 1/06; G06K 9/00805; (Continued)

(56) References Cited

U.S. PATENT DOCUMENTS 102,215 A 4/1870 Brockway
1,521,508 A 12/1924 Denoux
(Continued)

FOREIGN PATENT DOCUMENTS

CA 1063695 10/1979
EP 1022903 7/2000
(Continued)

OTHER PUBLICATIONS

Avallone, Eugene A. et al., Marks' Standard Handbook for Mechanical Engineers (11$^{th}$ Edition), pp. 6-190-6-204., McGraw-Hill, 2007.
(Continued)

*Primary Examiner* — Howard D Brown, Jr.
(74) *Attorney, Agent, or Firm* — Honigman LLP

(57) ABSTRACT

A rear backup system for a vehicle includes a rear backup video camera and a display device including a video display screen operable to display video images viewable by a driver of the vehicle. When a transmission of the vehicle is shifted into reverse gear to commence a backup event, video backup images derived from image data captured by the rear backup video camera are displayed at the video display screen of the display device. Display of the video backup images continues after shifting of the transmission out of reverse gear. Display of the video backup images at the video display screen ceases once a threshold condition is met. The threshold condition may include a threshold period of time elapsing after the transmission has been shifted out of reverse gear. The rear backup video camera continues to capture image data at least until the threshold condition is met.

39 Claims, 40 Drawing Sheets

Related U.S. Application Data continuation of application No. 15/262,480, filed on Sep. 12, 2016, now Pat. No. 9,796,331, which is a continuation of application No. 14/935,699, filed on Nov. 9, 2015, now Pat. No. 9,440,586, which is a continuation of application No. 14/641,812, filed on Mar. 9, 2015, now Pat. No. 9,183,749, which is a continuation of application No. 14/551,608, filed on Nov. 24, 2014, now Pat. No. 8,976,247, which is a continuation of application No. 14/293,487, filed on Jun. 2, 2014, now Pat. No. 8,896,700, which is a continuation of application No. 13/285,128, filed on Oct. 31, 2011, now Pat. No. 8,743,203, which is a continuation of application No. 11/226,628, filed on Sep. 14, 2005, now abandoned.

(60) Provisional application No. 60/692,113, filed on Jun. 20, 2005, provisional application No. 60/677,990, filed on May 5, 2005, provisional application No. 60/653,787, filed on Feb. 17, 2005, provisional application No. 60/642,227, filed on Jan. 7, 2005, provisional application No. 60/638,250, filed on Dec. 21, 2004, provisional application No. 60/624,091, filed on Nov. 1, 2004, provisional application No. 60/609,642, filed on Sep. 14, 2004.

(51) Int. Cl.

| | | |
|---|---|---|
| B29C 45/00 | (2006.01) | |
| B29C 45/14 | (2006.01) | |
| B60C 9/00 | (2006.01) | |
| B60Q 9/00 | (2006.01) | |
| B60R 1/04 | (2006.01) | |
| B60R 11/04 | (2006.01) | |
| G06K 9/00 | (2006.01) | |
| G06T 7/13 | (2017.01) | |
| G06T 7/70 | (2017.01) | |
| G08G 1/16 | (2006.01) | |
| G09G 5/02 | (2006.01) | |
| B29C 45/16 | (2006.01) | |
| B60R 1/06 | (2006.01) | |
| B60R 1/12 | (2006.01) | |
| G09G 3/00 | (2006.01) | |
| G09G 3/34 | (2006.01) | |
| B29L 11/00 | (2006.01) | |
| B29L 31/30 | (2006.01) | |
| B60R 11/00 | (2006.01) | |

(52) U.S. Cl.
CPC .... *B29C 45/14754* (2013.01); *B29C 45/1671* (2013.01); *B60C 9/00* (2013.01); *B60Q 9/008* (2013.01); *B60R 1/04* (2013.01); *B60R 1/06* (2013.01); *B60R 1/12* (2013.01); *B60R 11/04* (2013.01); *G06K 9/00805* (2013.01); *G06T 7/13* (2017.01); *G06T 7/70* (2017.01); *G08G 1/165* (2013.01); *G08G 1/166* (2013.01); *G08G 1/167* (2013.01); *G09G 3/001* (2013.01); *G09G 3/346* (2013.01); *G09G 5/026* (2013.01); *H04N 7/181* (2013.01); *H04N 7/183* (2013.01); *B29L 2011/0058* (2013.01); *B29L 2031/30* (2013.01); *B60R 2001/1215* (2013.01); *B60R 2001/1223* (2013.01); *B60R 2001/1253* (2013.01); *B60R 2001/1269* (2013.01); *B60R 2011/0033* (2013.01); *B60R 2300/105* (2013.01); *B60R 2300/308* (2013.01); *B60R 2300/808* (2013.01); *B60R 2300/8026* (2013.01); *B60R 2300/8066* (2013.01); *B60R 2300/8093* (2013.01); *G06T 2207/10016* (2013.01); *G06T 2207/30232* (2013.01); *G06T 2207/30261* (2013.01); *G09G 2300/023* (2013.01); *G09G 2300/0456* (2013.01); *G09G 2340/12* (2013.01); *G09G 2380/10* (2013.01)

(58) Field of Classification Search
CPC ........ G08G 1/167; G08G 1/166; G08G 1/165; B29C 45/14639; B29C 45/0017; B29C 45/1671; B29C 45/14754; G09G 3/346; G09G 5/026; G09G 3/001; H04N 7/183; H04N 7/181; G06T 7/13
See application file for complete search history.

(56) References Cited

U.S. PATENT DOCUMENTS

| | | |
|---|---|---|
| 1,800,797 A | 4/1931 | Hoople |
| 1,857,095 A | 5/1932 | Glowacki |
| 2,414,223 A | 1/1947 | De Virgilis |
| 2,456,182 A | 12/1948 | Goble |
| 2,763,188 A | 9/1956 | Bertell |
| 2,856,815 A | 10/1958 | Ross |
| 2,921,808 A | 1/1960 | David |
| 2,973,980 A | 3/1961 | Vogt et al. |
| 3,009,712 A | 11/1961 | Williams |
| 3,022,096 A | 2/1962 | Schwartz |
| 3,104,897 A | 9/1963 | Berger |
| 3,177,020 A | 4/1965 | Dumpis |
| 3,367,616 A | 2/1968 | Bausch et al. |
| 3,374,016 A | 3/1968 | Melton et al. |
| 3,448,553 A | 6/1969 | Herr et al. |
| 3,498,579 A | 3/1970 | Vicary |
| 3,530,495 A | 9/1970 | Kindel |
| 3,601,352 A | 8/1971 | Jensen et al. |
| 3,622,112 A | 11/1971 | Stroh |
| 3,635,435 A | 1/1972 | Perison, Sr. |
| 3,774,996 A | 11/1973 | Donnelly |
| 3,841,769 A | 10/1974 | Bowerman |
| 4,254,931 A | 3/1981 | Aikens et al. |
| 4,290,181 A | 9/1981 | Jackson |
| 4,382,572 A | 5/1983 | Thompson |
| 4,435,042 A | 3/1984 | Wood et al. |
| 4,436,371 A | 3/1984 | Wood et al. |
| 4,492,488 A | 1/1985 | Warshawsky |
| 4,571,209 A | 2/1986 | Manning et al. |
| 4,614,412 A | 9/1986 | Cohen |
| 4,632,348 A | 12/1986 | Keesling et al. |
| 4,646,210 A | 2/1987 | Skogler et al. |
| 4,731,769 A | 3/1988 | Schaefer et al. |
| 4,822,140 A | 4/1989 | Mittelhauser |
| 4,826,289 A | 5/1989 | Vandenbrink et al. |
| 4,891,559 A | 1/1990 | Matsumoto et al. |
| 4,917,477 A | 4/1990 | Bechtel et al. |
| 4,936,533 A | 6/1990 | Adams et al. |
| 4,948,242 A | 8/1990 | Desmond et al. |
| 4,967,319 A | 10/1990 | Seko |
| 5,012,082 A | 4/1991 | Watanabe |
| 5,027,200 A | 6/1991 | Petrossian et al. |
| 5,059,877 A | 10/1991 | Teder |
| 5,100,093 A | 3/1992 | Rawlinson |
| 5,100,095 A | 3/1992 | Haan et al. |
| 5,204,778 A | 4/1993 | Bechtel |
| 5,289,321 A | 2/1994 | Secor |
| 5,308,247 A | 5/1994 | Dyrdek |
| 5,313,072 A | 5/1994 | Vachss |
| 5,313,335 A | 5/1994 | Gray et al. |
| 5,327,288 A | 7/1994 | Wellington et al. |
| 5,341,437 A | 8/1994 | Nakayama |
| 5,355,118 A | 10/1994 | Fukuhara |
| 5,386,285 A | 1/1995 | Asayama |
| 5,414,461 A | 5/1995 | Kishi et al. |
| 5,424,952 A | 6/1995 | Asayama |
| 5,426,294 A | 6/1995 | Kobayashi et al. |
| 5,451,822 A | 9/1995 | Bechtel et al. |

(56) References Cited

U.S. PATENT DOCUMENTS

| | | |
|---|---|---|
| 5,471,515 A | 11/1995 | Fossum et al. |
| 5,481,409 A | 1/1996 | Roberts |
| 5,498,866 A | 3/1996 | Bendicks et al. |
| 5,521,633 A | 5/1996 | Nakajima et al. |
| 5,521,760 A | 5/1996 | De Young et al. |
| 5,530,420 A | 6/1996 | Tsuchiya et al. |
| 5,537,003 A | 7/1996 | Bechtel et al. |
| 5,550,677 A | 8/1996 | Schofield et al. |
| 5,555,136 A | 9/1996 | Waldmann et al. |
| 5,568,027 A | 10/1996 | Teder |
| 5,572,354 A | 11/1996 | Desmond et al. |
| 5,574,443 A | 11/1996 | Hsieh |
| 5,575,552 A | 11/1996 | Faloon et al. |
| 5,576,687 A | 11/1996 | Blank et al. |
| 5,582,383 A | 12/1996 | Mertens et al. |
| 5,587,699 A | 12/1996 | Faloon et al. |
| 5,632,092 A | 5/1997 | Blank et al. |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,669,698 A | 9/1997 | Veldman et al. |
| 5,670,935 A | 9/1997 | Schofield et al. |
| 5,671,996 A | 9/1997 | Bos et al. |
| 5,676,484 A | 10/1997 | Chamberlin et al. |
| 5,680,263 A | 10/1997 | Zimmermann et al. |
| 5,724,187 A | 3/1998 | Varaprasad et al. |
| 5,786,772 A | 7/1998 | Schofield et al. |
| 5,788,357 A | 8/1998 | Muth et al. |
| 5,790,403 A | 8/1998 | Nakayama |
| 5,793,308 A | 8/1998 | Rosinski et al. |
| 5,796,094 A | 8/1998 | Schofield et al. |
| 5,820,097 A | 10/1998 | Spooner |
| 5,837,994 A | 11/1998 | Stam et al. |
| 5,845,000 A | 12/1998 | Breed et al. |
| 5,850,176 A | 12/1998 | Kinoshita et al. |
| 5,877,897 A | 3/1999 | Schofield et al. |
| 5,878,370 A | 3/1999 | Olson |
| 5,883,684 A | 3/1999 | Millikan et al. |
| 5,920,367 A | 7/1999 | Kajimoto et al. |
| 5,923,027 A | 7/1999 | Stam et al. |
| 5,938,320 A | 8/1999 | Crandall |
| 5,949,331 A | 9/1999 | Schofield et al. |
| 5,956,181 A | 9/1999 | Lin |
| 5,984,482 A | 11/1999 | Rumsey et al. |
| 5,990,469 A | 11/1999 | Bechtel et al. |
| 6,001,486 A | 12/1999 | Varaprasad et al. |
| 6,005,724 A | 12/1999 | Todd |
| 6,049,171 A | 4/2000 | Stam et al. |
| 6,100,811 A | 8/2000 | Hsu et al. |
| 6,124,886 A | 9/2000 | DeLine et al. |
| 6,144,296 A | 11/2000 | Ishida et al. |
| 6,158,655 A | 12/2000 | DeVries, Jr. et al. |
| 6,222,447 B1 | 4/2001 | Schofield et al. |
| 6,222,460 B1 | 4/2001 | DeLine et al. |
| 6,226,061 B1 | 5/2001 | Tagusa et al. |
| 6,227,675 B1 | 5/2001 | Mertens et al. |
| 6,227,689 B1 | 5/2001 | Miller |
| 6,229,319 B1 | 5/2001 | Johnson |
| 6,243,003 B1 | 6/2001 | DeLine et al. |
| 6,250,148 B1 | 6/2001 | Lynam |
| 6,257,746 B1 | 7/2001 | Todd et al. |
| 6,259,423 B1 | 7/2001 | Tokito et al. |
| 6,281,804 B1 | 8/2001 | Haller et al. |
| 6,310,611 B1 | 10/2001 | Caldwell |
| 6,313,454 B1 | 11/2001 | Bos et al. |
| 6,315,421 B1 | 11/2001 | Apfelbeck et al. |
| 6,318,870 B1 | 11/2001 | Spooner et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,353,392 B1 | 3/2002 | Schofield et al. |
| 6,356,376 B1 | 3/2002 | Tonar et al. |
| 6,359,392 B1 | 3/2002 | He |
| 6,370,329 B1 | 4/2002 | Teuchert |
| 6,386,742 B1 | 5/2002 | DeLine et al. |
| 6,396,397 B1 | 5/2002 | Bos et al. |
| 6,420,975 B1 | 7/2002 | DeLine et al. |
| 6,428,172 B1 | 8/2002 | Hutzel et al. |
| 6,477,464 B2 | 11/2002 | McCarthy et al. |
| 6,483,438 B2 | 11/2002 | DeLine et al. |
| 6,498,620 B2 | 12/2002 | Schofield et al. |
| 6,523,964 B2 | 2/2003 | Schofield et al. |
| 6,540,193 B1 | 4/2003 | DeLine |
| 6,553,130 B1 | 4/2003 | Lemelson et al. |
| 6,593,011 B2 | 7/2003 | Liu et al. |
| 6,593,565 B2 | 7/2003 | Heslin et al. |
| 6,598,980 B2 | 7/2003 | Marusawa et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,639,519 B2 | 10/2003 | Drummond et al. |
| 6,690,268 B2 | 2/2004 | Schofield et al. |
| 6,717,610 B1 | 4/2004 | Bos et al. |
| 6,757,109 B2 | 6/2004 | Bos |
| 6,806,452 B2 | 10/2004 | Bos et al. |
| 6,822,563 B2 | 11/2004 | Bos et al. |
| 6,824,281 B2 | 11/2004 | Schofield et al. |
| 6,847,487 B2 | 1/2005 | Burgner |
| 6,864,930 B2 | 3/2005 | Matsushita et al. |
| 6,875,388 B2 | 4/2005 | Trotter et al. |
| 6,877,709 B2 | 4/2005 | March et al. |
| 6,882,287 B2 | 4/2005 | Schofield |
| 6,932,669 B2 | 8/2005 | Lee et al. |
| 6,970,184 B2 | 11/2005 | Hirama et al. |
| 7,004,593 B2 | 2/2006 | Weller et al. |
| 7,005,974 B2 | 2/2006 | McMahon et al. |
| 7,038,577 B2 | 5/2006 | Pawlicki et al. |
| 7,085,637 B2 | 8/2006 | Breed et al. |
| 7,110,156 B2 | 9/2006 | Lawlor et al. |
| 7,123,168 B2 | 10/2006 | Schofield |
| 7,164,117 B2 | 1/2007 | Breed |
| 7,167,796 B2 | 1/2007 | Taylor et al. |
| 7,172,300 B2 | 2/2007 | Plaster |
| 7,184,190 B2 | 2/2007 | McCabe et al. |
| 7,195,381 B2 | 3/2007 | Lynam et al. |
| 7,224,324 B2 | 5/2007 | Quist et al. |
| 7,227,459 B2 | 6/2007 | Bos et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,339,149 B1 | 3/2008 | Schofield et al. |
| 7,360,932 B2 | 4/2008 | Uken et al. |
| 7,370,983 B2 | 5/2008 | De Wind et al. |
| 7,420,756 B2 | 9/2008 | Lynam |
| 7,446,924 B2 | 11/2008 | Schofield et al. |
| 7,480,149 B2 | 1/2009 | DeWard et al. |
| 7,511,607 B2 | 3/2009 | Hubbard et al. |
| 7,720,580 B2 | 5/2010 | Higgins-Luthman |
| 7,914,187 B2 | 3/2011 | Higgins-Luthman et al. |
| 8,427,288 B2 | 4/2013 | Schofield et al. |
| 8,543,330 B2 | 9/2013 | Taylor et al. |
| 8,633,810 B2 | 1/2014 | Luo et al. |
| 8,676,491 B2 | 3/2014 | Taylor et al. |
| 8,743,203 B2 | 6/2014 | Karner et al. |
| 8,896,700 B2 | 11/2014 | Karner et al. |
| 8,976,247 B1 * | 3/2015 | Karner ............... B29C 45/0017 |
| | | 348/148 |
| 8,977,489 B2 | 3/2015 | Szczerba |
| 9,183,749 B2 | 11/2015 | Karner et al. |
| 9,191,574 B2 | 11/2015 | McMahon et al. |
| 9,440,586 B2 | 9/2016 | Karner et al. |
| 9,711,050 B2 | 7/2017 | Ansari |
| 9,796,331 B2 | 10/2017 | Karner et al. |
| 9,809,171 B2 * | 11/2017 | Weller ................... B60R 1/12 |
| 1,014,435 A1 | 12/2018 | Karner et al. |
| 2001/0002451 A1 | 5/2001 | Breed |
| 2002/0003571 A1 | 1/2002 | Schofield et al. |
| 2002/0011611 A1 | 1/2002 | Huang et al. |
| 2003/0133014 A1 | 7/2003 | Medonza |

(56) References Cited

U.S. PATENT DOCUMENTS

| | | |
|---|---|---|
| 2003/0197660 A1 | 10/2003 | Takahashi |
| 2004/0129478 A1 | 7/2004 | Breed |
| 2005/0046584 A1 | 3/2005 | Breed |
| 2005/0195383 A1 | 9/2005 | Breed |
| 2006/0038895 A1 | 2/2006 | Suzuki et al. |
| 2006/0050018 A1 | 3/2006 | Hutzel et al. |
| 2006/0061008 A1 | 3/2006 | Karner et al. |
| 2006/0287826 A1 | 12/2006 | Shimizu et al. |
| 2007/0290886 A1 | 12/2007 | Stam |
| 2009/0040306 A1 | 2/2009 | Foote et al. |
| 2009/0271078 A1 | 10/2009 | Dickinson |
| 2010/0073480 A1 | 3/2010 | Hoek |
| 2010/0245574 A1 | 9/2010 | Imanishi |
| 2011/0193961 A1 | 8/2011 | Peterson |
| 2012/0133768 A1* | 5/2012 | Stephan ................ B60R 1/00 348/148 |
| 2012/0154591 A1 | 6/2012 | Baur et al. |
| 2012/0162427 A1 | 6/2012 | Lynam |
| 2012/0200708 A1 | 8/2012 | Fukuda et al. |
| 2012/0236152 A1 | 9/2012 | De Wind et al. |
| 2012/0320209 A1 | 12/2012 | Vico et al. |
| 2013/0063601 A1 | 3/2013 | Wakabayashi et al. |
| 2013/0261861 A1 | 10/2013 | Saito |
| 2014/0058614 A1 | 2/2014 | Trombley et al. |
| 2014/0058655 A1 | 2/2014 | Trombley et al. |
| 2014/0058668 A1 | 2/2014 | Trombley et al. |
| 2014/0085472 A1 | 3/2014 | Lu et al. |
| 2014/0098229 A1 | 4/2014 | Lu et al. |
| 2014/0192181 A1 | 7/2014 | Taylor et al. |
| 2014/0226009 A1 | 8/2014 | Lynam et al. |
| 2014/0249723 A1 | 9/2014 | Pilutti et al. |
| 2014/0354452 A1 | 12/2014 | Okuyama |
| 2015/0070498 A1 | 3/2015 | Kriel |
| 2018/0056871 A1* | 3/2018 | Karner ................ B60R 1/06 |

FOREIGN PATENT DOCUMENTS

| | | |
|---|---|---|
| EP | 1065642 | 1/2001 |
| EP | 1170173 | 1/2002 |
| JP | 59114139 | 7/1984 |
| JP | 6079889 | 5/1985 |
| JP | 6080953 | 5/1985 |
| JP | 6414700 | 1/1989 |
| JP | H2117935 | 9/1990 |
| JP | 0550883 | 3/1993 |
| JP | 0577657 | 3/1993 |
| JP | 5213113 | 8/1993 |
| JP | 06227318 | 8/1994 |
| JP | 074170 | 1/1995 |
| JP | 07105496 | 4/1995 |
| JP | H730149 | 6/1995 |
| JP | 2630604 | 4/1997 |
| WO | WO2001080353 | 10/2001 |
| WO | WO 2003/095269 | 11/2003 |
| WO | WO 2004/076971 | 9/2004 |

OTHER PUBLICATIONS

CMOS sensor page of University of Edinburgh.
G. Wang, D. Renshaw, P.B. Denyer and M. Lu, CMOS Video Cameras, article, 1991, 4 pages, University of Edinburgh, UK.
Inter Partes Reexamination Proceeding IPR2015-00250 regarding U.S. Pat. No. 8,543,330, issued to Taylor et al.
Inter Partes Reexamination Proceeding IPR2015-00251 regarding U.S. Pat. No. 8,676,491, issued to Taylor et al.
Inter Partes Reexamination Proceeding IPR2015-01413 regarding U.S. Pat. No. 8,676,491, issued to Taylor et al.
Inter Partes Reexamination Proceeding IPR2015-01415 regarding U.S. Pat. No. 8,543,330, issued to Taylor et al.
Irani, M. et al., "Video compression using mosaic representations," Signal Processing: *Image Communication* 7 (1995), pp. 529-552.
Lu, M., et al. On-chip Automatic Exposure Control Technique, Solid-State Circuits Conference, 1991. ESSCIRC '91. Proceedings—Seventeenth European (vol. 1) with abstract.
McMillan, L. et al., "Plenoptic Modeling: An Image-Based Rendering System." Proceedings of SIGGRAPH 95, Los Angeles, CA, Aug. 6-11, 1995, pp. 39-46.
Okabayashi, S., et al. "Driver's Ability to Recognize the Forward View and Head-Up Display Images in Automobiles," J. Light & Vis. Env. vol. 16, No. 2 (1992), pp. 61-69.
Parenti, R.R., "Application of Fourier-Space Image-Restoration techniques to Turbulence Compensation and Sparse-Aperture Imaging." Massachusetts Institute of Technology—Lincoln Laboratory (Jun. 1994).
Reexamination Control No. 90/007,519, dated Apr. 22, 2005, Reexamination of U.S. Pat. No. 6,222,447, issued to Schofield et al.
Reexamination Control No. 90/007,520, dated Apr. 22, 2005, Reexamination of U.S. Pat. No. 5,949,331, issued to Schofield et al.
Reexamination Control No. 90/011,477, dated Feb. 7, 2011, Reexamination of U.S. Pat. No. 5,949,331, issued to Schofield et al.
Reexamination Control No. 90/011,478, dated Feb. 7, 2011, Reexamination of U.S. Pat. No. 6,222,447, issued to Schofield et al.
SAE Paper No. 920741 to Sugita, "Head-up Display Using a Hologram as an Optical Element".
Tremblay, M., et al. High resolution smart image sensor with integrated parallel analog processing for multiresolution edge extraction, Robotics and Autonomous Systems 11 (1993), pp. 231-242, with abstract.

\* cited by examiner

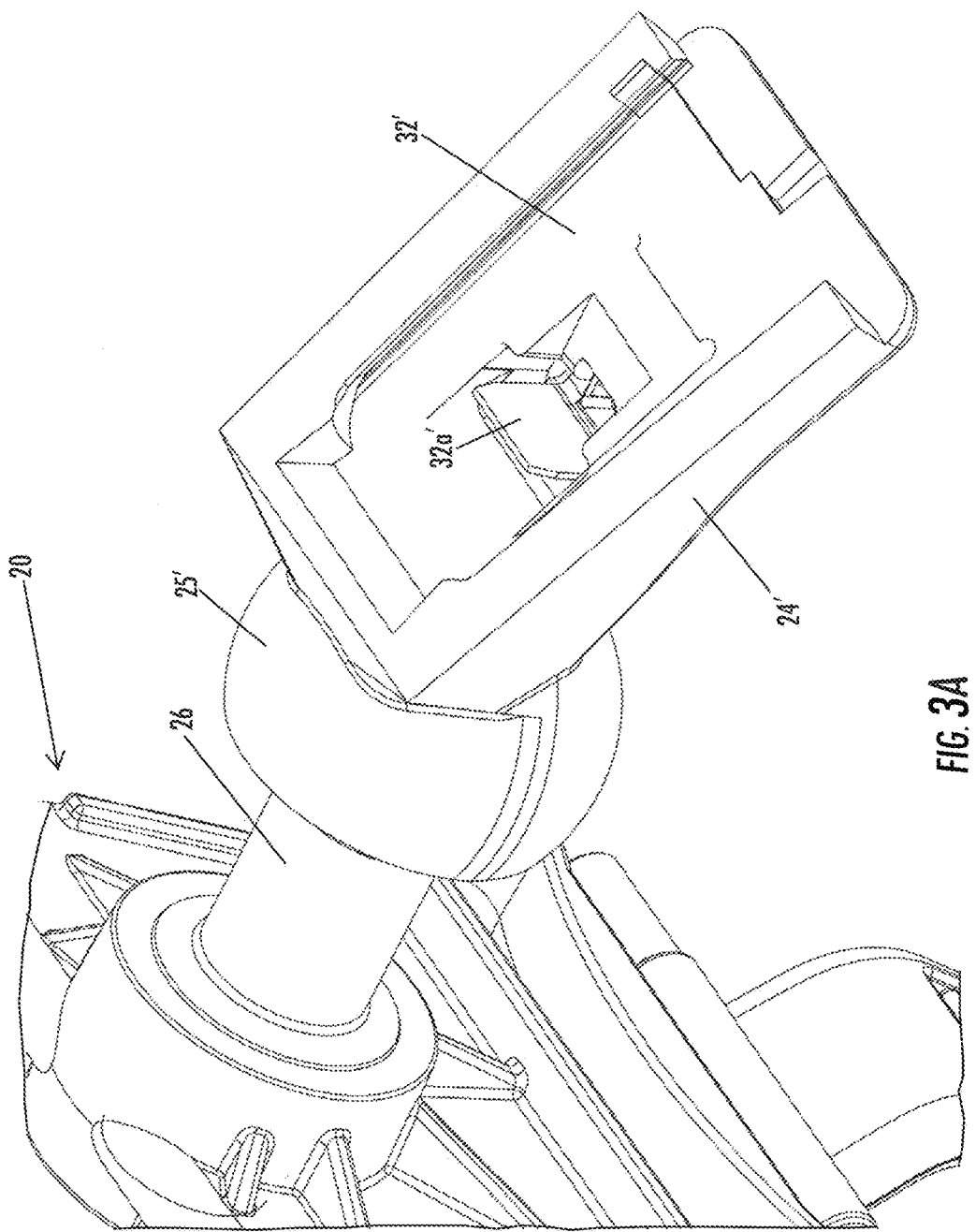

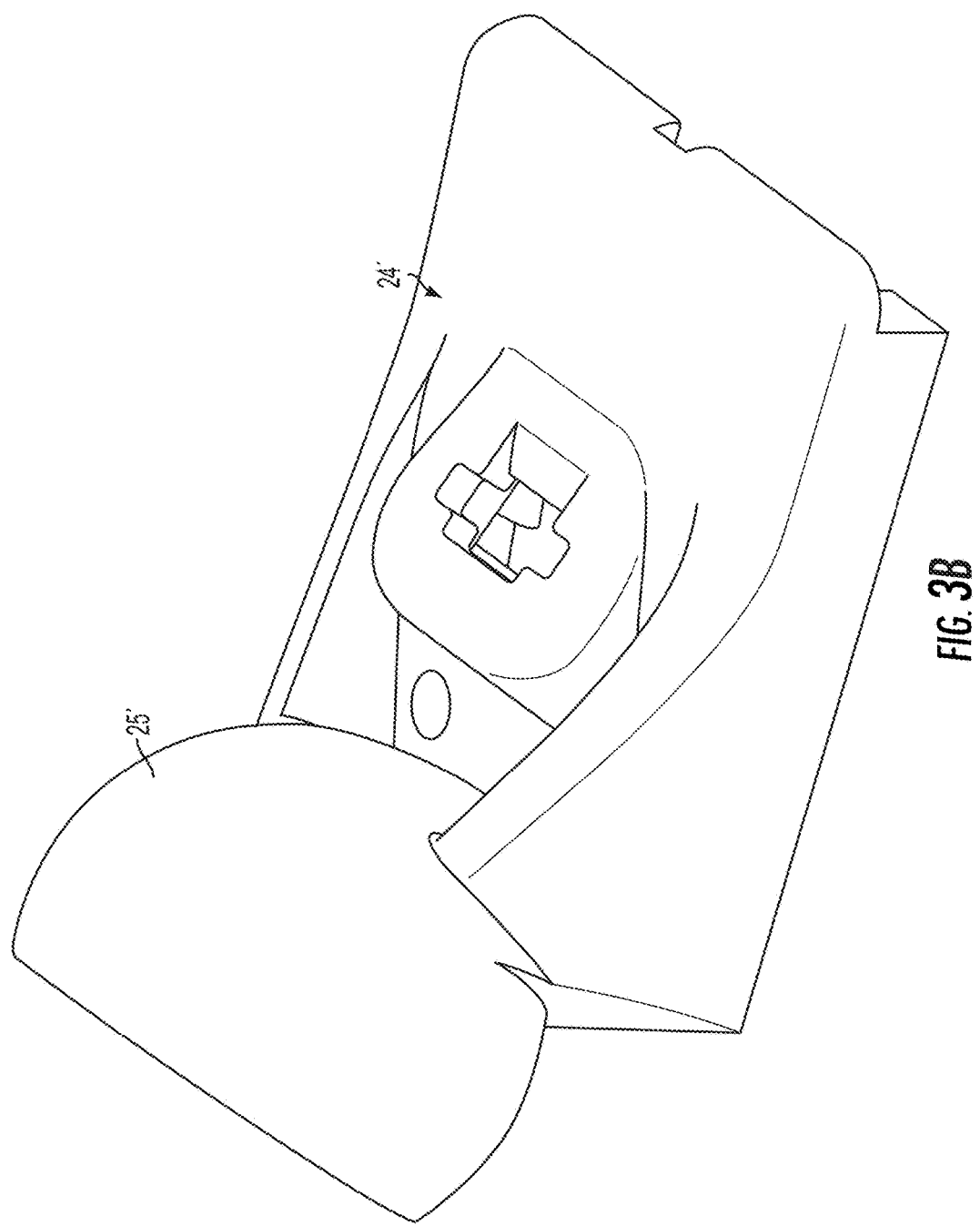

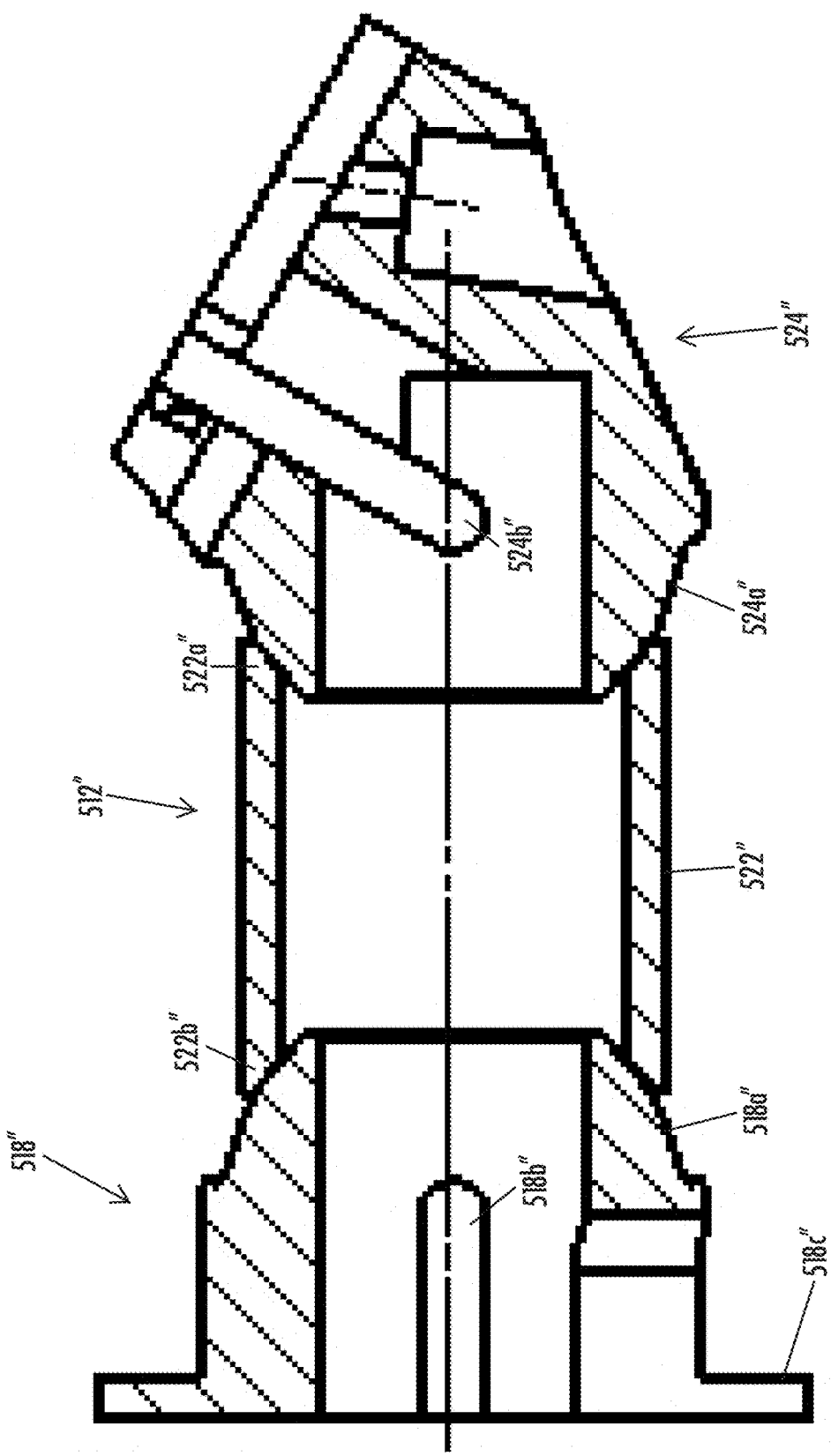

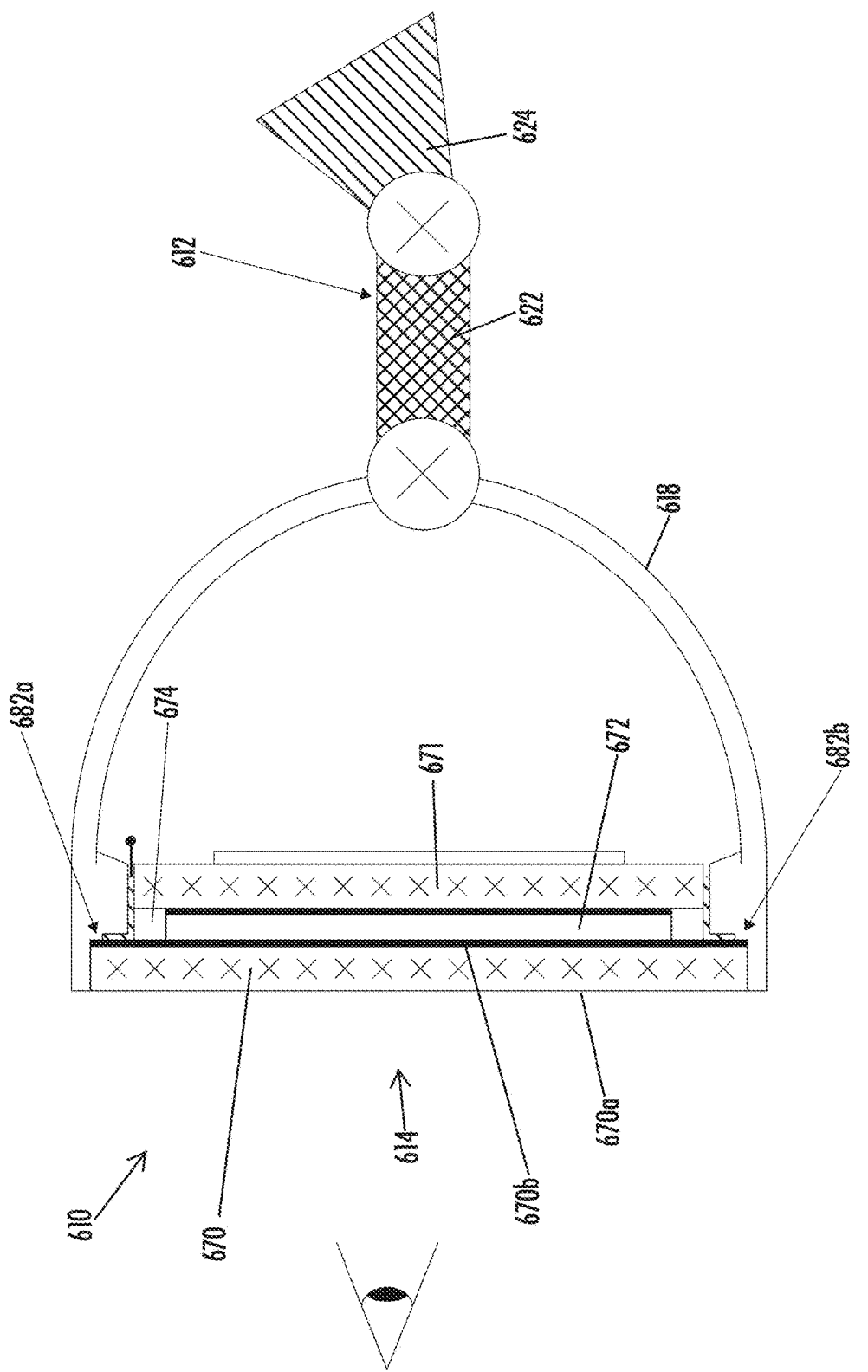

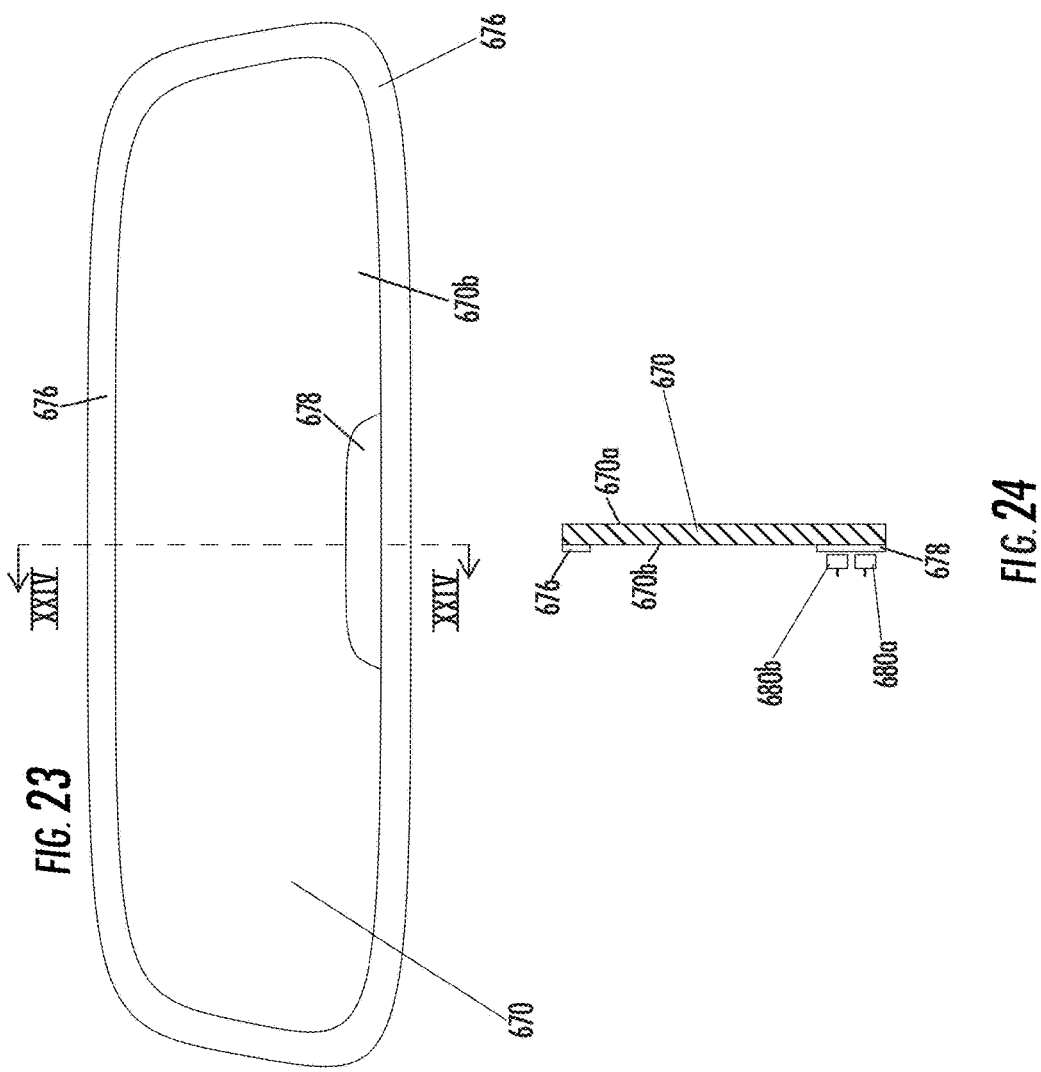

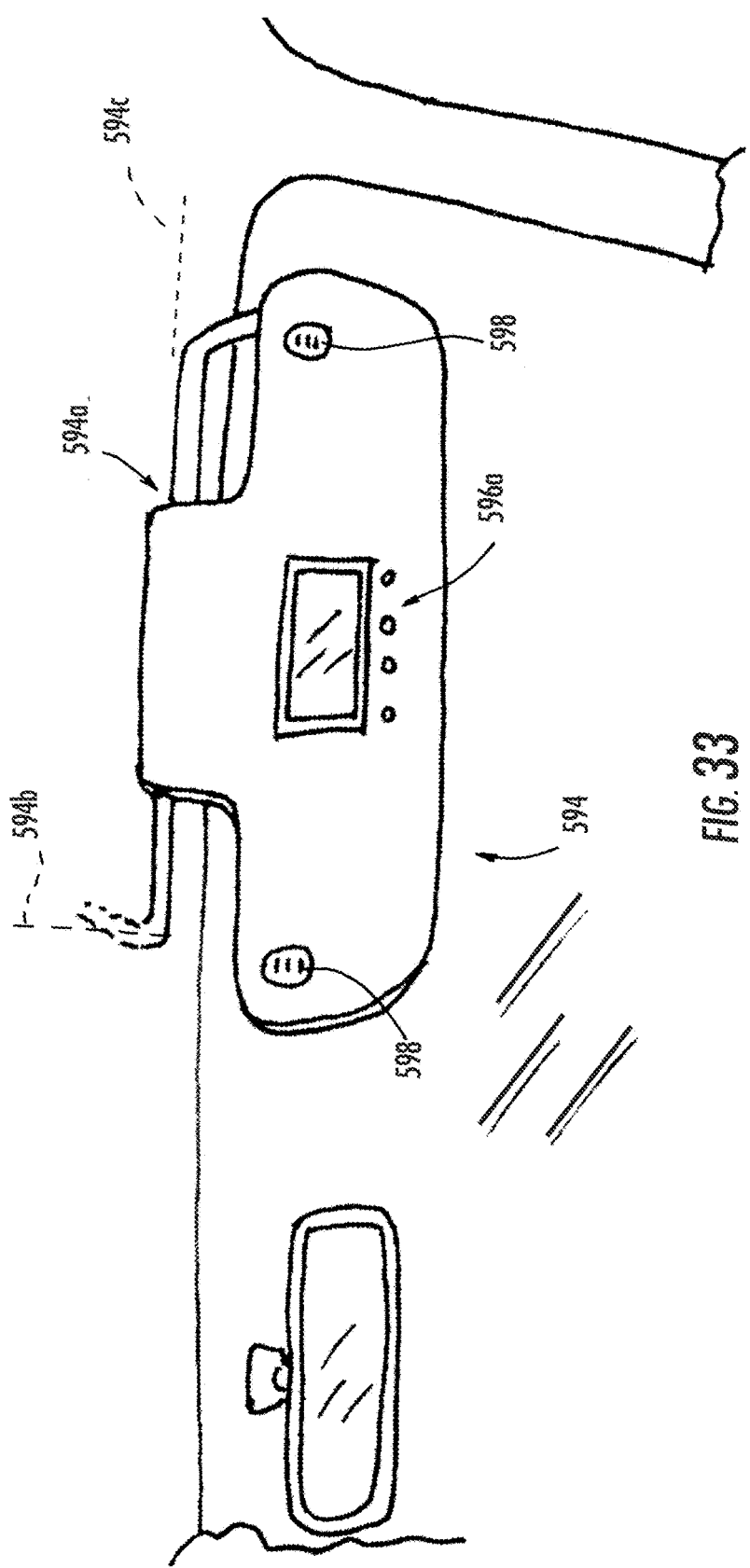

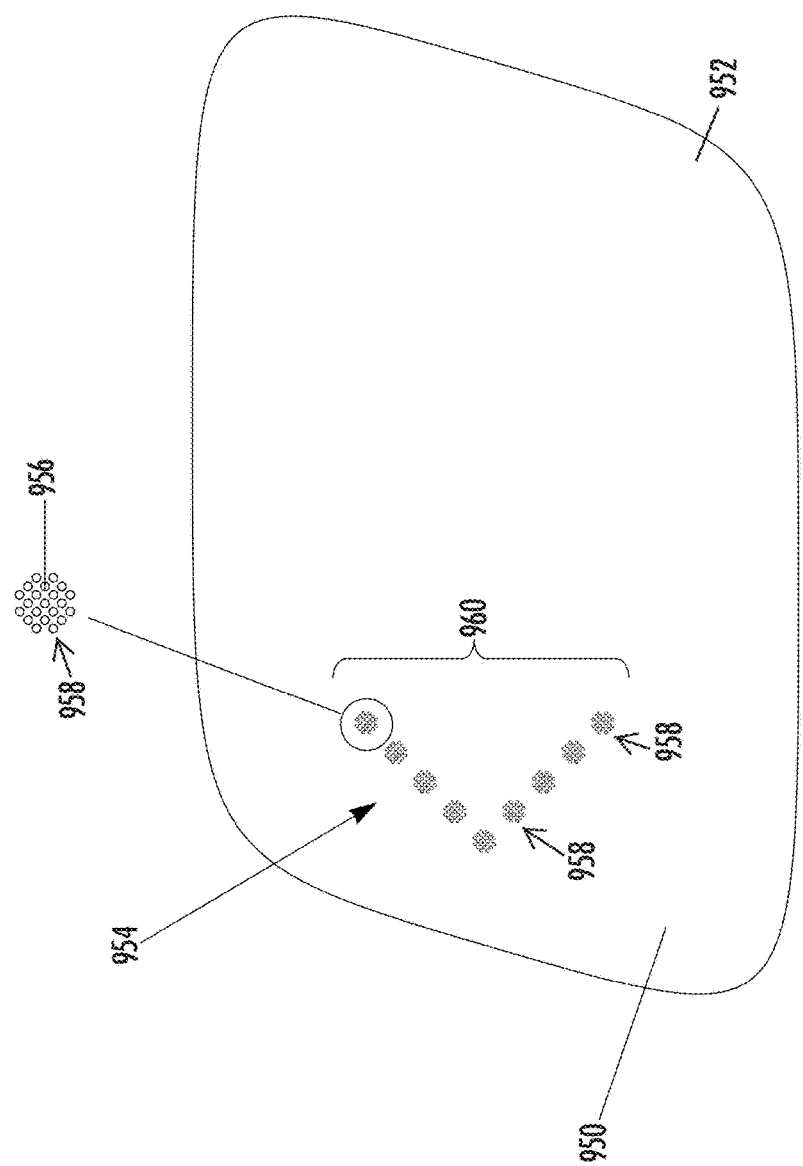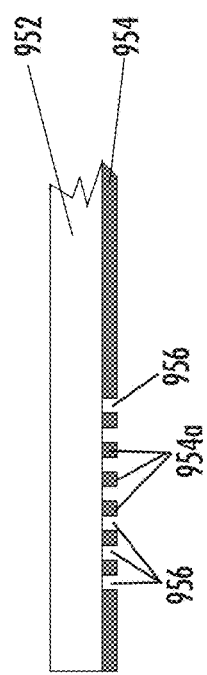

Closest Packing Area = $4d^2$

Spaced Packing Area: $a^2 + 4ad + 4d^2$

| Spacing between scratches/holes mm = | 0.35 | 0.35 | 0.35 | 0.15 | 0.2 | 0.25 | 0.3 | 0.25 | 0.3 | 0.35 | 0.4 | 0.45 | 0.5 |
|---|---|---|---|---|---|---|---|---|---|---|---|---|---|
| Hole diameter mm = | 0.08 | 0.1 | 0.15 | 0.1 | 0.15 | 0.2 | 0.25 | 0.15 | 0.15 | 0.15 | 0.15 | 0.15 | 0.15 |
| Closest Packing Area sq. mm = | 0.03 | 0.04 | 0.09 | 0.04 | 0.09 | 0.16 | 0.25 | 0.09 | 0.09 | 0.09 | 0.09 | 0.09 | 0.09 |
| Spaced Packing Area sq. mm = | 0.26 | 0.30 | 0.42 | 0.12 | 0.25 | 0.42 | 0.64 | 0.30 | 0.36 | 0.42 | 0.49 | 0.56 | 0.64 |
| Light Transmission Ratio %T = | 10% | 13% | 21% | 33% | 36% | 38% | 39% | 30% | 25% | 21% | 18% | 16% | 14% |

FIG. 38

REAR BACKUP SYSTEM FOR A VEHICLE

CROSS REFERENCE TO RELATED APPLICATIONS

The present application is a continuation of U.S. patent application Ser. No. 15/790,173, filed Oct. 23, 2017, now U.S. Pat. No. 10,144,353, which is a continuation of U.S. patent application Ser. No. 15/262,480, filed Sep. 12, 2016, now U.S. Pat. No. 9,796,331, which is a continuation of U.S. patent application Ser. No. 14/935,699, filed Nov. 9, 2015, now U.S. Pat. No. 9,440,586, which is a continuation of U.S. patent application Ser. No. 14/641,812, filed Mar. 9, 2015, now U.S. Pat. No. 9,183,749, which is a continuation of U.S. patent application Ser. No. 14/551,608, filed Nov. 24, 2014, now U.S. Pat. No. 8,976,247, which is a continuation of U.S. patent application Ser. No. 14/293,487, filed Jun. 2, 2014, now U.S. Pat. No. 8,896,700, which is a continuation of U.S. patent application Ser. No. 13/285,128, filed Oct. 31, 2011, now U.S. Pat. No. 8,743,203, which is a continuation of U.S. patent application Ser. No. 11/226,628, filed Sep. 14, 2005 (abandoned), which claims the benefit of U.S. provisional applications, Ser. No. 60/692,113, filed Jun. 20, 2005, Ser. No. 60/677,990, filed May 5, 2005, Ser. No. 60/653,787, filed Feb. 17, 2005, Ser. No. 60/642,227, filed Jan. 7, 2005, Ser. No. 60/638,250, filed Dec. 21, 2004, Ser. No. 60/624,091, filed Nov. 1, 2004, and Ser. No. 60/609,642, filed Sep. 14, 2004, which are all hereby incorporated herein by reference in their entireties.

FIELD OF THE INVENTION

The present invention relates to interior rearview mirror assemblies and, more particularly, to a method of making a mounting assembly for an interior rearview mirror assembly.

BACKGROUND OF THE INVENTION

Mounting arrangements or assemblies for mounting an interior rearview mirror assembly to an interior portion of a vehicle typically include a mounting arm that is pivotally attached to the mirror assembly and/or to a channel mount or mounting base, which in turn mounts to the interior portion of the vehicle. For example, a typical mounting assembly may include a mounting arm with a ball member or spherical member or portion at each end, with one end being pivotally received in a socket at the mirror assembly (or at a toggle portion of the mirror assembly for a prismatic mirror) and the other end being pivotally received in a socket at the mounting channel, which may be secured to a mounting button or the like at the interior surface of the windshield of the vehicle.

Typically, the ball members of the mounting arm are pressed into the respective sockets, such as via a machine or the like, to insert the ball member through the narrowed end of the socket and to secure the ball members within the sockets. The ball members are typically metallic elements received within polymeric sockets and biased via a biasing member or spring to provide the desired clamping or degree of resistance of pivotal movement of the ball member relative to the socket.

A variety of interior and exterior mirror assemblies with indicators are known in the art, such as U.S. Pat. Nos. 5,788,357; 6,257,746; 6,005,724; 5,481,409; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,938,320 and 5,786,772, Canadian Pat. No. CA 1,063,695, Pat. Abstracts of Japan Publication No. 0917573, published Jul. 8, 1997, which are all hereby incorporated herein by reference.

SUMMARY OF THE INVENTION

The present invention provides a mounting assembly that includes a mounting arm and a channel mount or mounting base and/or a mirror socket or toggle portion. The mounting arm may comprise a polymeric material and the channel mount and/or toggle portion is overmolded around the respective ball member. The mounting assembly thus may be formed via one or more molding processes, and obviates the need to press the ball members into the respective socket portions. Optionally, electrical conducting elements, such as wire harnesses or lead frames, may be included, preferably by insert molding, within the mounting arm and may extend from the mounting arm for connection to electrical components or leads, such as to a vehicle or accessory wiring harness and/or a circuit board or other electrical elements. Optionally, the mounting base (that attaches to a portion of the vehicle interior, such as to a mirror mounting button or similar attachment element adhered to an inner-cabin surface of the vehicle windshield or to a header portion proximate the join of the windshield to the roof region of the vehicle) may be overmolded via insert molding onto a metallic insert that may have the mounting structure for mounting to the mounting button or the like at the windshield of the vehicle.

According to an aspect of the present invention, a method of making a mounting assembly of an interior rearview mirror assembly includes providing a mounting arm having at least one ball member at at least one end thereof and molding at least one of a mounting base portion and a mirror mounting portion over the at least one ball member.

The ball member is pivotally received in the mounting base portion and/or mirror mounting portion after the mounting base portion and/or mirror mounting portion is molded and cured. The at least one ball member may comprise a first ball member at one end of the mounting arm and a second ball member at the other end of the mounting arm. The mounting base portion may be molded over the first ball member and the mirror mounting portion may be molded over the second ball member.

Optionally, the pivot joints may provide different torque thresholds for pivoting the mirror mounting portion about the mounting arm or the mounting arm about the mounting base portion. In one form, the mounting base portion may comprise a first material and the mirror mounting portion may comprise a second material, whereby the first material is different than the second material. In another form, the first ball member may have a first surface characteristic and the second ball member may have a second surface characteristic, whereby the first surface characteristic is different than the second surface characteristic.

Optionally, a channel element may be molded at least partially within the mounting base portion. Optionally, and for applications of the mounting assembly with prismatic mirror assemblies, the mirror mounting portion may comprise a toggle portion.

Optionally, the mirror mount portion may have a metallic element insert molded therein to provide the mounting structure for the mirror assembly. Optionally, the mounting or support arm may include electrical conductors insert molded therein and at least partially therealong, whereby the conductors may electrically connect to an electrical element at the mounting portion and/or at the mirror casing or reflective element. The mounting portion may include a socket or pocket for receiving a connector or plug of the vehicle wire harness, whereby the connector of the vehicle wire harness may connect to a mirror wire harness that includes wiring that extends through and/or along the mounting arm and into the mirror casing to a circuit board or the like within the mirror casing, such as at the reflective element of the mirror. The pocket includes side and front and rear walls or portions that substantially encompass and define the pocket region or receiving portion and that substantially conceal the connectors of the wire harness from viewing by a person in or at the vehicle.

According to another aspect of the present invention, a mirror assembly includes a reflective element and a support element for supporting and at least partially encasing the reflective element. The reflective element is received at least partially within a pocket or receiving portion or cavity of the support element. The support element preferably substantially retains the reflective element within the cavity via a lip portion that extends at least partially around the perimeter edge region of the front surface (the viewable surface of the reflective element that is viewable by the driver of the vehicle when the mirror assembly is installed in the vehicle) of the mirror assembly.

Optionally, the support element may comprise a substantially or at least partially flexible elastomeric element that may flex to allow the reflective element to be inserted into the cavity and may substantially return to its initial form (and may be biased to return to its initial form) to retain the reflective element within the support element. Optionally, the support element may be molded over and around the perimeter edge regions of the reflective element to substantially encompass the perimeter of the reflective element.

The support element may at least partially or substantially cover the rear surface of the reflective element (the surface opposite to the front surface and facing away from the driver of the vehicle when the mirror assembly is installed in the vehicle) to provide a back plate or cover or support portion. The support element may include attachment elements or tabs or the like at the rear or back support portion, such as for mounting or attaching a back plate to the reflective element and support element assembly.

The back support portion may include openings or apertures therethrough, such as for establishing electrical connections between the back plate (and circuitry or circuit board on the back plate) and electrical connections of the reflective element (such as fourth surface bus-bar connections for an electro-optic or electrochromic reflective element or cell), and/or for providing viewing apertures for display information to be displayed by a display device (at the circuitry or circuit board on the back plate) and through the viewing aperture and through the reflective element so as to be viewable by the driver of the vehicle at the reflective element.

Therefore, the present invention provides a unitarily molded or formed mounting assembly, with the toggle portion or mirror mounting portion and/or the channel mount or mounting base portion molded over the ends of the mounting arm. The mounting arm may include a ball member or partial ball member at one or both ends for pivotally attaching the mounting arm to the mirror mounting portion and/or the mounting base portion when the mirror mounting portion and/or the mounting base portion is/are molded over the ball members of the mounting arm. The molded or pre-formed mounting arm may be inserted or loaded into a mold and the toggle portion and channel mount may be molded over the ends of the mounting arm to form the mounting assembly via a unitary molding process. The pivot joints defined by the ball members and overmolded portions may provide different frictional resistance to provide different threshold torques for pivoting the mirror assembly or mounting arm about the respective pivot joints. For example, the mounting assembly may provide different surface conditions at the ball members or different materials of the mirror mounting portion and the mounting base portion to provide different torques at the pivot joints of the mounting assembly. The present invention thus provides for in mold forming of a socket around a ball member that is pre-formed and inserted into the mold cavity.

The present invention also provides a plastic mounting base formed by molding of a polymeric resin that preferably is overmolded over a metallic insert (that itself may be structurally adapted to at least partially cooperate with a structure on an attachment member, such as a mirror mounting button, to which the mounting base mounts) to provide structural integrity and the desired exterior appearance or surface to the mounting base. The polymeric-material or plastic support arm may include a wire or electrical conductor insert molded therein and at least partially therealong, whereby the conductors may connect to circuitry or accessories or a wiring harness at the mounting base and to corresponding circuitry or accessories within the mirror. The accessories or circuitry of the mounting base may be within the mounting base and generally along the longitudinal axis of the support arm, such that the base is not readily viewable by the driver of the vehicle. The electrical connections may be readily made as the mirror support assembly is assembled and as the mirror assembly is installed in the vehicle.

These and other objects, advantages, purposes and features of the present invention will become apparent upon review of the following specification in conjunction with the drawings.

BRIEF DESCRIPTION OF THE DRAWINGS

FIG. 3A is a perspective view of another mounting assembly of the present invention;

FIG. 3B is an opposite perspective view of the mounting assembly of FIG. 3A;

FIG. 21 is a sectional view of the mounting arrangement of FIG. 20;

FIG. 22 is a sectional view of a mirror assembly and reflective element assembly in accordance with the present invention;

FIG. 23 is a plan view of the front substrate of the reflective element assembly of FIG. 22;

FIG. 24 is a sectional view of the front substrate taken along the line XXIV-XXIV in FIG. 23;

FIG. 33 is a side elevation exploded view of a reflective element assembly having a reflective element, back plate and circuit board in accordance with the present invention;

FIG. 35 is a front elevation of an exterior mirror reflective element with a turn signal display formed thereon;

FIG. 36 is a sectional view of a portion of the reflective element of FIG. 35;

FIG. 38 is a table of light transmission ratio of a display for various sizes and spacings of scratches/holes in the reflector coating;

DESCRIPTION OF THE PREFERRED EMBODIMENTS

Figure 1:
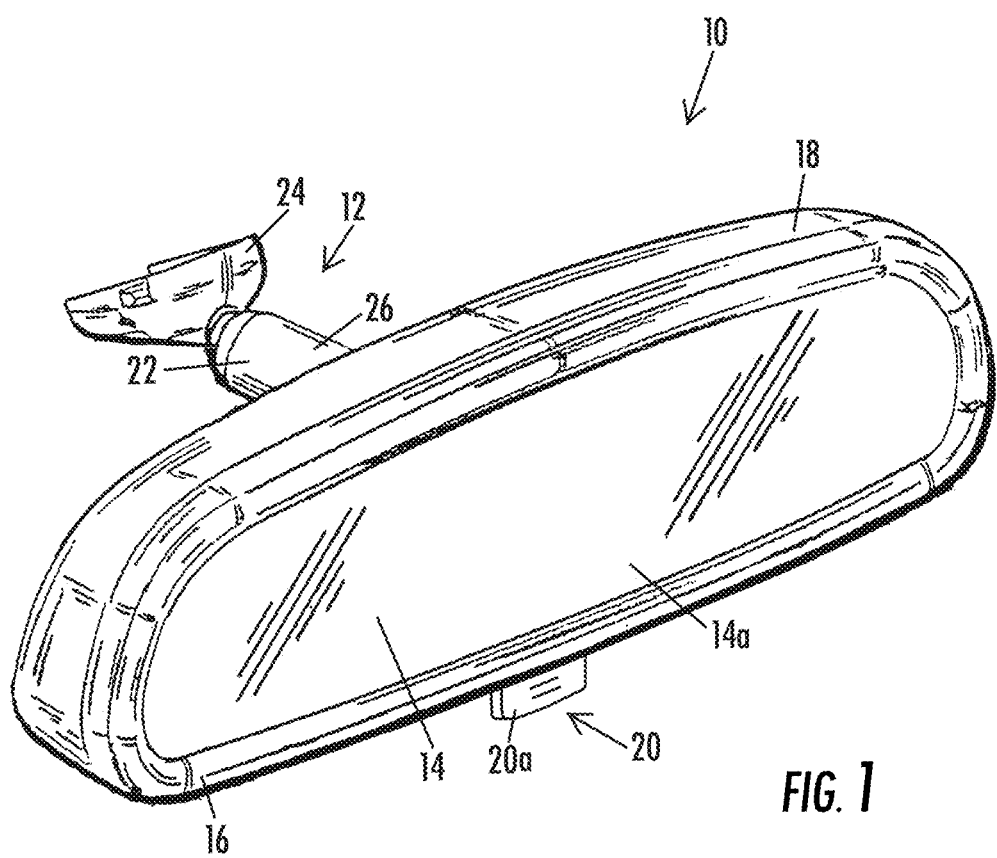
FIG. 1 is a perspective view of an interior rearview mirror assembly incorporating the mounting assembly of the present invention.
Figure 2:
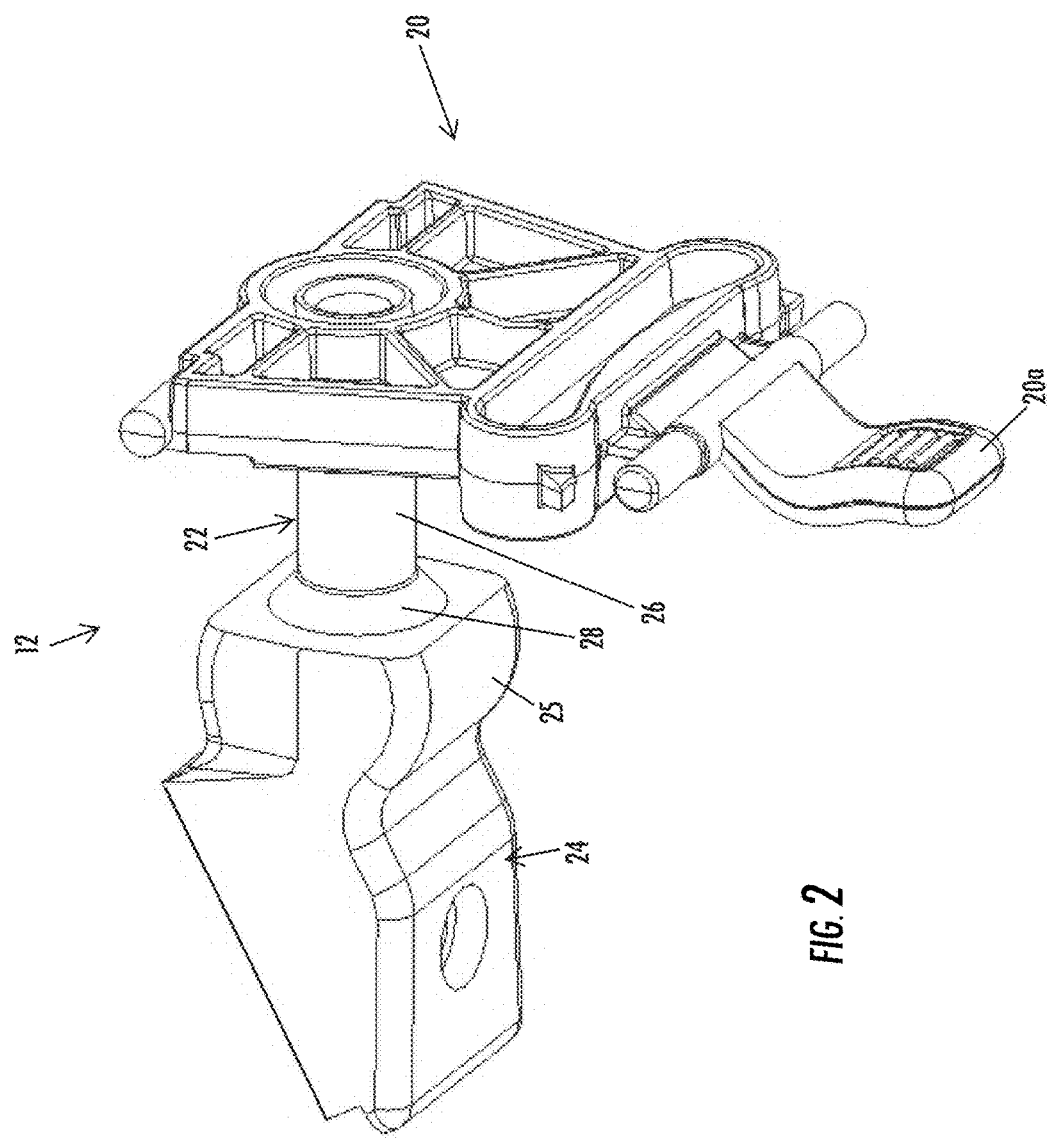
FIG. 2 is a perspective view of a mounting assembly in accordance with the present invention.

Referring now to the drawings and the illustrative embodiments depicted therein, an interior rearview mirror assembly 10 is pivotally or adjustably mounted to an interior portion of a vehicle, such as via a double ball mounting or bracket assembly 12 (FIG. 1). Mirror assembly 10 includes a prismatic reflective element 14, a bezel portion 16, a housing or casing 18, and a mirror mounting portion 20, such as a toggle or flip mechanism or toggle portion, for pivoting or adjusting the reflective element 14 between a full reflectivity daytime position and a reduced reflectivity nighttime position, as is known in the mirror art. The mounting or bracket assembly 12 adjustably mounts the reflective element 14 to an interior portion of the vehicle, such as to an interior surface of a windshield of the vehicle or the like. Mounting assembly 12 includes a mounting arm 22, and a mounting base portion or channel mount 24 and toggle portion 20 molded over the respective ends of the mounting arm 22, as discussed below.

The mirror assembly may comprise a prismatic mirror assembly, such as a prismatic mirror assembly utilizing aspects described in U.S. Pat. Nos. 6,318,870; 6,598,980; 5,327,288; 4,948,242; 4,826,289; 4,436,371 and 4,435,042; and PCT Application No. PCT/US04/015424, filed May 18, 2004; and U.S. patent application Ser. No. 10/933,842, filed Sep. 3, 2004, now U.S. Pat. No. 7,249,860, which are hereby incorporated herein by reference. Optionally, the prismatic reflective element may comprise a conventional prismatic reflective element or prism, or may comprise a prismatic reflective element of the types described in PCT Application No. PCT/US03/29776, filed Sep. 19, 2003; U.S. patent applications, Ser. No. 10/709,434, filed May 5, 2004, now U.S. Pat. No. 7,420,756; U.S. Ser. No. 10/933,842, filed Sep. 3, 2004, now U.S. Pat. No. 7,249,860; U.S. Ser. No. 11/021, 065, filed Dec. 23, 2004, now U.S. Pat. No. 7,255,451; U.S. Ser. No. 10/528,269, filed Mar. 17, 2005, now U.S. Pat. No. 7,274,501; and/or U.S. Ser. No. 10/993,302, filed Nov. 19, 2004, now U.S. Pat. No. 7,338,177, and/or PCT Application No. PCT/US2004/015424, filed May 18, 2004, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (the entire disclosures of which are hereby incorporated by reference herein), that can benefit from the present invention. Optionally, the mirror assembly may comprise an electro-optic or electrochromic reflective element assembly, as discussed below.

Mirror casing 18 and bezel portion 16 may be formed from various materials but are preferably molded from a resinous polymeric material as is conventionally known in the industry. Reflective element or prism 14 may also be formed from various materials such as plastic or glass or the like, but preferably is glass, and may have a planar front surface 14a extending at an angle to a planar rear surface (not shown). The rear surface of the prism may be coated with a reflective layer of a metal or metal alloy, such as chromium, aluminum or alloys thereof, as is conventionally known in the industry.

Actuation or pivotal movement of the toggle tab 20a of toggle portion 20 pivots prism 14 relative to the mounting arm 22 of mounting assembly 12 to pivot the reflective rear surface in order to reduce glare during nighttime conditions, as discussed below. When reflective element 14 is pivoted from a full reflectivity day position to a reduced reflectivity night position, the reflective surface is rotated such that the uncoated front surface 14a is aligned for viewing by the vehicle driver instead of the reflective rear surface. The reflective rear surface may reflect at least about 60 percent to 95 percent of the light incident thereon, while uncoated front surface 14a may reflect about 4 percent of the light incident thereon (or any other desired reflectivity commensurate with the construction/coated first surface that is utilized), thereby significantly reducing glare from headlights or other bright lights to the rear of the vehicle to the driver's eyes.

Figure 4:
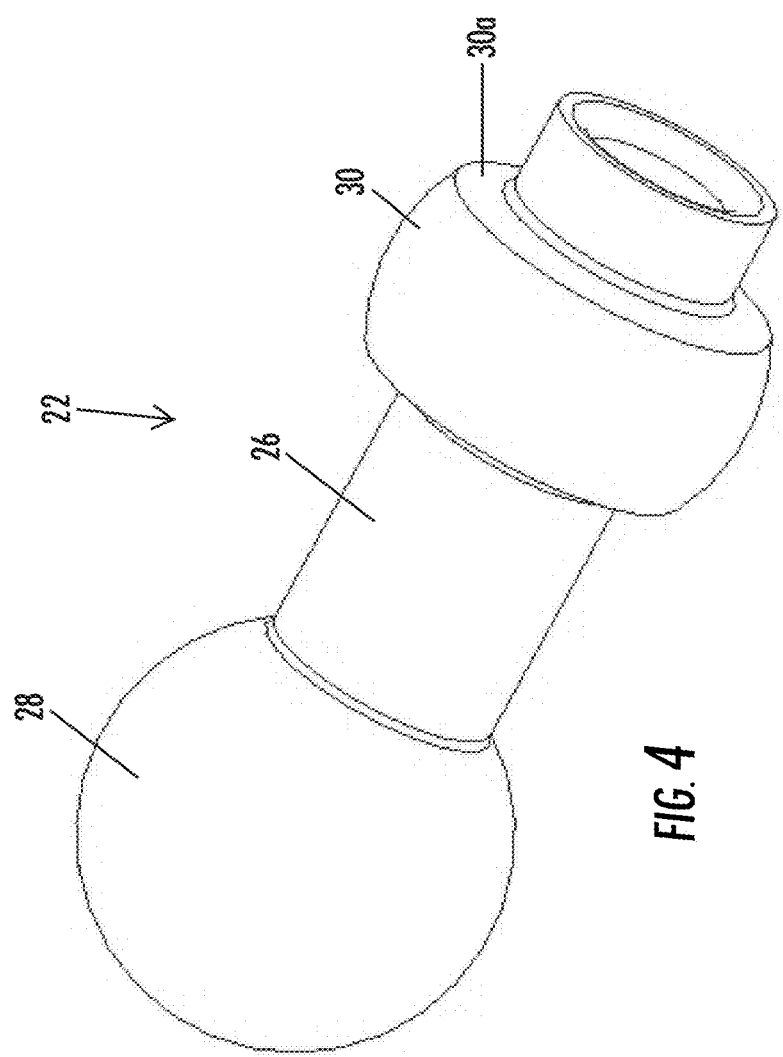
FIG. 4 is a perspective view of a mounting arm suitable for use with the mounting assembly of the present invention.

In the illustrated embodiment, and as best shown in FIG. 4, mounting arm 22 includes a shaft or arm portion 26, a ball member 28 at one end and a ball member 30 at the other end. The ball member 30 comprises a partial ball member, which allows for enhanced molding of the toggle portion 20 around the ball member 30, as discussed below. Mounting arm 22 may be molded of a polymeric material, such as an acetal or nylon material or the like, or may comprise a metallic material. Optionally, the ball members 28, 30 may be molded or formed to have different surface textures from one another, so as to provide different torques at the different pivot joints of the mirror assembly, as discussed below.

Mounting base portion or channel mount 24 may mount or attach to a mounting member at the interior portion of the vehicle, such as to a mounting button or the like at the interior surface of the windshield. The mounting button may be secured, such as by bonding or by a suitable adhesive, to an interior surface of a vehicle windshield, and may be a conventional mounting button or base member, such as the type disclosed in commonly assigned U.S. Pat. No. 4,936,533, issued to Adams et al., the disclosure of which is hereby incorporated herein by reference, or a breakaway mount such as the type disclosed in commonly assigned U.S. Pat. No. 5,820,097, issued to Spooner; or U.S. Pat. No. 5,100,095, issued to Haan et al., the disclosures of which are hereby incorporated herein by reference.

Figure 3:
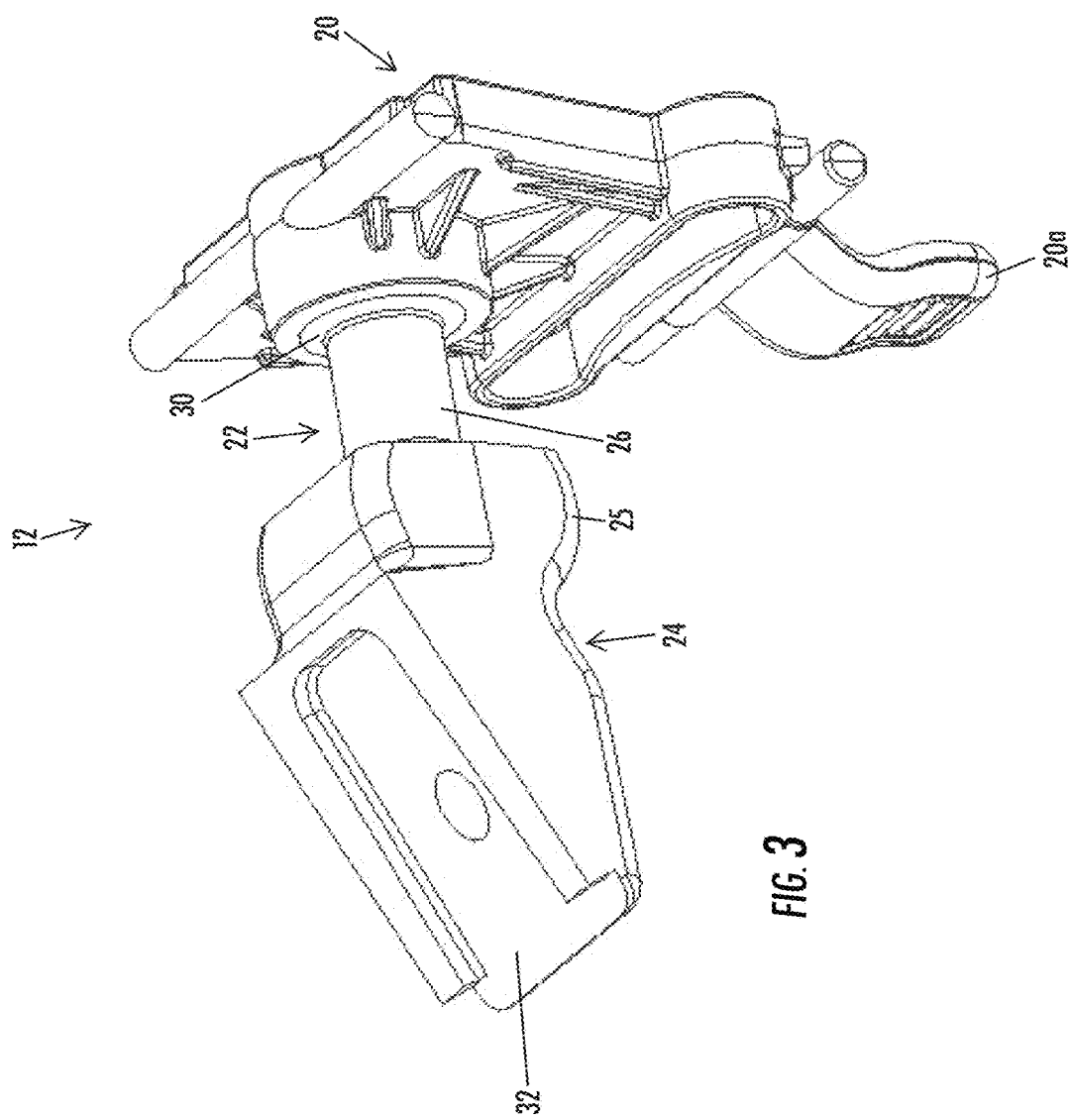
FIG. 3 is another perspective view of the mounting assembly of FIG. 2.

Channel mount 24 may comprise a molded element formed of a polymeric material, such as a polyolefin polymeric material, such as a polypropylene and/or polyethylene polymeric resinous material or the like. Channel mount 24 may have a socket portion 25 molded over and at least partially around ball member 28 of mounting arm 22 to pivotally attach mounting arm 22 to channel mount 24. Optionally, and desirably, channel mount 24 may be molded over and at least partially around a metallic channel element 32 (FIG. 3), whereby the metallic channel element 32 provides sufficient and desired rigidity to secure the channel mount to the mounting button or the like at the windshield of the vehicle. As shown in FIGS. 3A and 3B, a mirror mount 24' may be molded over a metallic channel element 32' and may have a socket portion 25' molded over the ball member of the support arm 22. The metallic channel element 32' may comprise a metallic stamping and may include a metallic clip or tab 32a' for retaining the mount and channel element to the mounting button on the interior surface of the vehicle windshield (or elsewhere in the vehicle).

Mirror mounting portion or toggle portion 20 may also comprise a molded element formed of a polymeric material, such as a polyolefin polymeric material, such as a polypropylene and/or polyethylene polymeric resinous material or the like. Toggle portion 20 may be molded over and at least partially around ball member 30 of mounting arm 22 to pivotally attach toggle portion 20 to mounting arm 22. Toggle portion 20 may be adjustably mounted to an attachment plate or the like at the rear surface of the prism 14, such as described in U.S. Pat. No. 6,318,870; and/or U.S. patent applications, Ser. No. 10/933,842, filed Sep. 3, 2004, now U.S. Pat. No. 7,249,860, which are hereby incorporated herein by reference. The toggle portion may include the toggle tab 20a, or may include a rotary flip mechanism (such as described in U.S. Pat. No. 6,329,925; and/or U.S. patent application Ser. No. 10/933,842, filed Sep. 3, 2004, now U.S. Pat. No. 7,249,860, which are hereby incorporated herein by reference), or the like, without affecting the scope of the present invention.

Mounting arm 22 of mounting assembly 12 thus may be formed of a rigid polymeric or metallic material, and the channel mount 24 and/or toggle portion 20 may be molded over and at least partially around the respective ball members 28, 30 of mounting arm 22 to provide a unitarily formed mounting assembly. The material for the mounting arm 22 is selected to be a material (such as a metallic material or a polymeric material) that can withstand the overmolding process and that allows for the overmolded portions to break free from the surfaces of the ball members after the portions are overmolded and cured. Optionally, the ball members of the mounting arm may be coated with a coating or layer that eases the breakaway or loosening of the overmolded portions from the surface of the ball members.

During the molding process, the pre-formed mounting arm 22 may be loaded or inserted into a mold cavity, with the ball members received in respective cavities for molding the toggle portion and channel mount. The polymeric material of the toggle portion and/or the channel mount may be injected or shot into the respective mold cavity to mold the portion around the respective ball member or partial ball member of the mounting arm. The channel element may be loaded or inserted into the channel mount mold cavity and thus may be insert molded into the channel mount as the channel mount is molded over the ball member 28 of the mounting arm 22. The channel mount and toggle portion may be molded via a single molding operation or may be molded via separate molding operations, and may comprise different materials (as discussed below), depending on the particular application of the mounting assembly.

The partial ball member 30 at the toggle end of the mounting arm 22 allows the mold to close around the shaft portion of the mounting arm and against the annular surfaces 30a of the partial ball member 30. This may reduce the amount of excess mold material or flash that may result from the mold closing on the spherical surface of a spherical ball member. Optionally, the ball member 28 may be formed as a partial ball member as well, without affecting the scope of the present invention.

Optionally, and desirably, the torque required to pivot the channel mount about the ball member 28 may be different than the torque required to pivot the toggle portion about the partial ball member 30. For example, the torque at the toggle portion may be less than the torque at the channel mount, so that a user of the mirror assembly may readily adjust the angle of viewing of the mirror assembly without repositioning the mirror assembly relative to the vehicle (such as may occur via pivoting the mounting arm relative to the channel mount). Further movement to overcome the frictional resistance at the channel mount may reposition the mirror assembly to the desired position. In order to achieve a greater torque at the mount joint over the torque at the mirror joint, the diameter of the ball members at the ends of the support arm may be different. Preferably, the diameter of the ball member at the mirror mount is at least about 20 percent (and more preferably at least about 25 percent and most preferably at least about 30 percent) greater than the diameter of the ball member at the mirror or toggle or back plate. For example, the diameter of the ball member at the mirror or toggle or back plate may be approximately 14-18 mm, while the diameter of the opposite ball member at the mirror mount may be approximately 20-25 mm.

Optionally, in order to provide different torques, the surface texture or surface condition of the ball members 28, 30 may be different to provide a different frictional resistance at each end of the mounting arm. For example, the ball member 28 may be stippled or otherwise textured or roughened, while the partial ball member 30 may be less stippled or textured or may be substantially smooth, such that the frictional resistance at the partial ball member 30 is less than the frictional resistance at the ball member 28. Thus, the surfaces of the ball members may be textured, such as, for example, by providing an EDM textured finish (such as known in the tooling arts) as formed by the mold tool. Alternately, or additionally, it is envisioned that the selected materials for the channel mount and the toggle portion may be different to provide different clamping forces or different frictional resistance at the respective ball members or pivot joints of the mounting assembly. Optionally, the wall/section thickness of the socket or receiving portions of the toggle or back plate and/or the mirror mount may be selected to provide the desired clamping pressure to the respective ball member to achieve the desired torques at the respective joints. For example, the socket portions may be molded over the respective ball members, whereby the thickness of the walls of the socket portions affects how much pressure the socket portion will apply to the respective ball member as the socket portion cools and shrinks after overmolding and upon exit from the mold. For example, a thicker socket wall thickness will apply a greater pressure on the ball member as the overmolded socket portion cools and shrinks as compared to a thinner socket wall thickness. Other means for providing different resistance or different torque at the pivot joints of the mounting assembly may be implemented, without affecting the scope of the present invention.

The differential torques at the respective pivot joints may thus be established by material selection and/or mechanical design. Preferably, the support arm is formed of a substantially stiff resin material that does not appreciably shrink after injection molding, so that the desired substantially uniformly defined and predicted spherical ball surface may be achieved. Preferably, the linear mold shrinkage, parallel (such as measured via ISO 294-4) is less than about 0.006 cm/cm, and more preferably less than about 0.004 cm/cm, and most preferably less than about 0.0025 cm/cm. Preferably, the linear mold shrinkage, transverse (such as measured by ISO 294-4) is less than about 0.015 cm/cm, and more preferably less than about 0.012 cm/cm, and most preferably less than about 0.01 cm/cm. It is also desirable that the selected material have a high flexural modulus, such as determined using ISO 178. Preferably, the flexural modulus is at least about 9 GPa, and more preferably at least about 11 GPa, and most preferably at least about 13 GPa. For example, a glass filled or glass reinforced Nylon material, such as DSM Akulon® Ultraflow™ K-FG) Nylon No. 6, 50 percent glass reinforced molding resin may be used. Such a material has a linear mold shrinkage, parallel, of about 0.002 cm/cm; a linear mold shrinkage, transverse, of about 0.009 cm/cm; and a flexural modulus of about 14 GPa.

Clearly, other filled or reinforced resinous polymeric materials may be used to achieve the desired results, without affecting the scope of the present invention. For example, a polybutylene terephthalate (PBT) filled/reinforced thermoplastic polyester resin may be used. Preferably, the material is at least about 20 percent glass/mineral filled, and more preferably at least about 25 percent glass/mineral filled, and most preferably at least about 30 percent glass/mineral filled. Such a material may provide a flexural modulus of about 9.5 GPa and a linear mold shrinkage in the flow direction of about 0.003 cm/cm. The material type and grade for the support arm thus may be selected to achieve the desired load and shrinkage factors or parameters and the desired color and surface finish of the support arm and ball members at opposite ends thereof.

The material selected for the mount and the toggle or back plate preferably has a selected shrinkage factor so that the overmolded socket portions may shrink around the ball members to retain and frictionally engage the ball members therein (however, should the construction be reversed so that the support arm comprises the sockets and the mount and/or toggle have the ball member, then the material selections may be reversed accordingly). Preferably, the mount material comprises a material that has at least about four times the amount of post-molding shrinkage over the material selected for the support arm (and more preferably at least about six times the amount of shrinkage and most preferably at least about eight times the amount of shrinkage). For example, the mount may be molded from an acetal resin, such as a Ticona Celcon® M90™ UV acetal copolymer having a flexural modulus of about 2.6 GPa (as determined by ASTM D790), and a linear mold shrinkage, parallel of about 0.022 cm/cm and a linear mold shrinkage, transverse of about 0.018 cm/cm. Other materials may be selected, including a filled polypropylene or other polymer resins with suitable mechanical and shrinkage properties, without affecting the scope of the present invention.

The toggle or backing plate may be molded over the ball member of the support arm and may also comprise a material that has a greater shrinkage factor than the support arm. For example, the overmolded toggle (which may include a flexible living hinge or the like) may comprise a polypropylene homopolymer or a polypropylene with a glass fiber filler. For example, the toggle may comprise a polypropylene homopolymer having a linear mold shrinkage in the range of about 0.025 to about 0.235 cm/cm (ASTM D956), and a flexural modulus in the range of about 1.35 GPa to about 1.65 GPa (ASTM D790). For example, a Basell Polyolefin grade Pro-fax 6523 general purpose polypropylene homopolymer resin (which is available in natural and custom compounded colors) may be used to mold the toggle. Optionally, the toggle may comprise a polypropylene with ten percent glass fiber filler having a linear mold shrinkage of about 0.007 cm/cm (ASTM D956) and a flexural modulus of about 2.4 GPa (ASTM D790). Optionally, the toggle may comprise a polypropylene with twenty percent glass fiber filler having a linear mold shrinkage of about 0.004 cm/cm (ASTM D956) and a flexural modulus of about 3.6 GPa (ASTM D790). Optionally, the toggle may comprise a polypropylene with thirty percent glass fiber filler having a linear mold shrinkage of about 0.003 cm/cm (ASTM D956) and a flexural modulus of about 5.6 GPa (ASTM D790). The stiffer materials, such as an acetal or a filled polypropylene may be more preferred for non-prismatic toggle or back plate members, such as back plates for electro-optic reflective element applications.

Optionally, the mounting arm of the mounting assembly may include a passageway therethrough for routing wiring or the like through the arm to provide electrical communication between the electronic circuitry element or printed circuit board or accessory of the mirror assembly and circuitry or accessories or power source of an accessory module or of the vehicle. For example, the mounting assembly may utilize principles described in U.S. patent application Ser. No. 10/032,401, filed Dec. 20, 2001, published Jul. 11, 2002 as U.S. Pat. Publication No. US2002/0088916, now U.S. Pat. No. 6,877,709; and/or PCT Application No. PCT/US2004/015424, filed May 18, 2004, which are hereby incorporated herein by reference, or may utilize electrical connection principles of the type described in International Publication No. WO 2003/095269, published Nov. 20, 2003; and/or U.S. patent application Ser. No. 10/512,206, filed Oct. 22, 2004, now U.S. Pat. No. 7,110,156, which are hereby incorporated herein by reference. Optionally, the mounting arm passageway may allow for infrared or visible light to be transmitted along the tube or arm to communicate signals to or from the mirror assembly. In such applications, the arm or mounting assembly may include reflectors or mirrored surfaces to guide and reflect the light between the source and receiver, and may adjust the reflectors to accommodate adjustment of the mirror head assembly relative to the mounting base. The mounting arm thus may provide a light conduit or path or pipe for light signals to be communicated or guided or directed to provide communication between the accessory module or pod and the interior rearview mirror assembly. Other means for providing electrical power and/or control to the electronic circuitry element or circuitry board and/or accessories of the mirror assembly may be implemented without affecting the scope of the present invention.

Although shown and described as a double ball mounting assembly, it is envisioned that a single ball or single joint mounting assembly (such as a single joint assembly of the types described in U.S. Pat. No. 6,483,438 and/or PCT Application No. PCT/US2004/015424, filed May 18, 2004, which are hereby incorporated herein by reference) may be formed in a similar manner, without affecting the scope of the present invention. For example, the toggle portion may be molded over the ball member of a mounting arm in a similar manner as described above, while the other end of the mounting arm may be insert molded into a channel mount so that the mounting arm extends from the channel mount in a substantially rigid or non-moving manner. Optionally, the channel mount and mounting arm may be integrally or unitarily formed as a single element, without affecting the scope of the present invention. The channel mount and mounting arm element may comprise a metallic material or a polymeric material. If the channel mount and mounting arm element comprises a polymeric material, a metallic channel element may be insert molded into the channel mount as described above.

Although shown and described as including a toggle portion for a prismatic mirror assembly, the mounting assembly of the present invention may include a mounting or attaching portion for attaching to an electro-optic reflective element assembly or cell of an electrochromic mirror assembly, without affecting the scope of the present invention. For example, the attaching portion may utilize aspects of the assemblies described in U.S. Pat. Nos. 6,690,268; 6,483,438 and 6,593,565; and/or U.S. patent application Ser. No. 10/933,842, filed Sep. 3, 2004, now U.S. Pat. No. 7,249,860, which are hereby incorporated herein by reference. In such applications, the backing plate or mounting plate may comprise a filled polypropylene or acetal or other suitable polymeric material.

The interior rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or U.S. patent applications, Ser. No. 10/054,633, filed Jan. 22, 2002, now U.S. Pat. No. 7,195,381; and/or U.S. Ser. No. 11/021,065, filed Dec. 23, 2004, now U.S. Pat. No. 7,255,451, which are all hereby incorporated herein by reference, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein. The mirror assembly may include one or more displays, such as the types disclosed in U.S. Pat. Nos. 5,530,240 and/or 6,329,925, which are hereby incorporated herein by reference, and/or display-on-demand or transflective type displays, such as the types disclosed in U.S. Pat. Nos. 6,690,268; 5,668,663 and/or 5,724,187, and/or in U.S. patent applications, Ser. No. 10/054,633, filed Jan. 22, 2002, now U.S. Pat. No. 7,195,381; U.S. Ser. No. 10/528,269, filed Mar. 17, 2005, now U.S. Pat. No. 7,274,501; U.S. Ser. No. 10/533,762, filed May 4, 2005, now U.S. Pat. No. 7,184,190; and/or U.S. Ser. No. 11/021,065, filed Dec. 23, 2004, now U.S. Pat. No. 7,255,451; and/or PCT Application No. PCT/US03/29776, filed Sep. 9, 2003; and/or PCT Application No. PCT/US03/35381, filed Nov. 5, 2003; and/or U.S. provisional applications, Ser. No. 60/630,061, filed Nov. 22, 2004; Ser. No. 60/667,048, filed Mar. 31, 2005; Ser. No. 60/629,926, filed Nov. 22, 2004; Ser. No. 60/531,838, filed Dec. 23, 2003; Ser. No. 60/553,842, filed Mar. 17, 2004; and Ser. No. 60/563,342, filed Apr. 19, 2004, and/or PCT Application No. PCT/US03/40611, filed Dec. 19, 2003, which are all hereby incorporated herein by reference, or may include or incorporate video displays or the like, such as the types described in PCT Application No. PCT/US03/40611, filed Dec. 19, 2003, and/or U.S. provisional applications, Ser. No. 60/630,061, filed Nov. 22, 2004; and Ser. No. 60/667,048, filed Mar. 31, 2005, which are hereby incorporated herein by reference. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854 and 6,420,036, and in PCT Application No. PCT/US03/29776, filed Sep. 9, 2003, which are all hereby incorporated herein by reference. The mirror may include or be associated with driver circuitry for driving/controlling the electro-optic or electrochromic reflective element or cell, such as driver circuitry of the types described in U.S. Pat. No. 6,447,124 and/or U.S. patent applications, Ser. No. 10/456,599, filed Jun. 6, 2003, now U.S. Pat. No. 7,004,593, and/or U.S. Ser. No. 11/201,661, filed Aug. 11, 2005, now U.S. Pat. No. 7,480,149, which are hereby incorporated herein by reference.

Optionally, the plastic mirror mount or base and socket may be unitarily molded from a polymeric resin to form the base for mounting to the mirror mounting button or the like at the windshield and the socket for receiving the ball of the mounting or support arm. The mirror mount may be molded over a metallic insert or the like so as to provide a polymeric outer coating or portion, while providing the stiffness and rigidity of the metallic element. Portions of the mirror mount or base that engage, for example, a mirror mounting button attached to the vehicle windshield, may thus be metal [or metal with only a thin layer of polymeric material molded over; this thin layer however provides a cosmetic utility (thus an unpainted metal zinc die-cast can be used as the metal insert but the thin polymeric layer gives it a color and appearance matching the rest of the molded mirror mount or base)]. However, other portions of the mirror mount or base that engage the mirror mounting button attached to the vehicle windshield may be molded (of the polymeric resin used to form the overall mirror mount or base) to form a mirror-button engaging element or structure, such as a plastic lip or tongue. Thus, one aspect of the present invention comprises the combination formed via insert/overmolding of metal-like property/structure and plastic/polymeric-like property/structure for at least the mirror mount or base.

Figure 5:
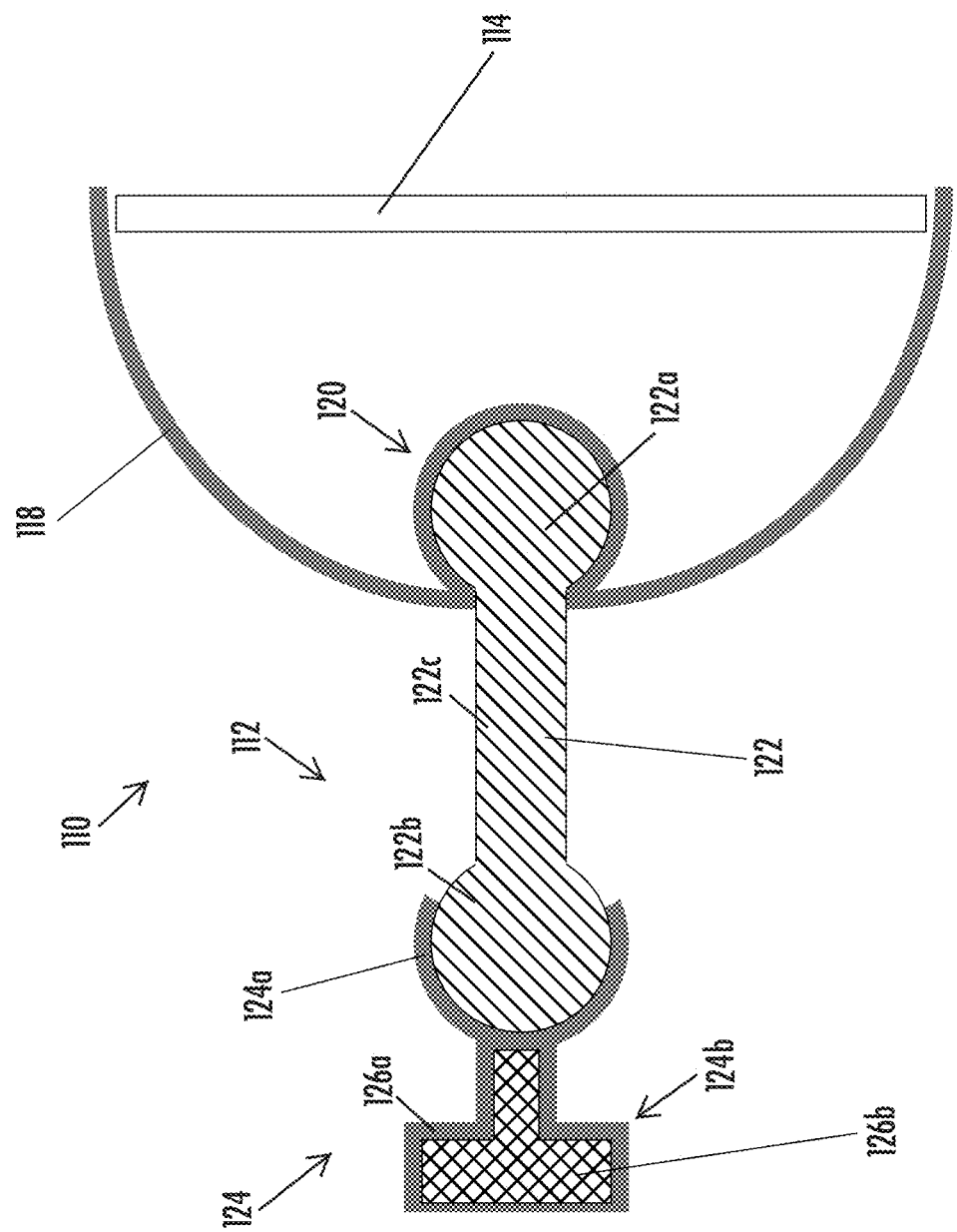
FIG. 5 is a sectional view of another mounting assembly in accordance with the present invention.

For example, and with reference to FIG. 5, a mirror assembly 110 is pivotally or adjustably mounted to an interior portion of a vehicle, such as via a double ball mounting or bracket assembly 112. Mirror assembly 110 includes a reflective element 114, a polymeric-material housing or casing 118, and mirror socket 120. The mounting or bracket assembly 112 adjustably mounts the mirror casing 118 and/or reflective element 114 to an interior portion of the vehicle, such as to an interior surface of a windshield of the vehicle or the like. Mounting assembly 112 includes a plastic mounting arm or support arm 122, and a plastic mounting base portion or channel mount 124. The plastic molded ball ends 122a, 122b of support arm 122 may be received within respective plastic molded sockets 124a and 120 to pivotally mount the mirror casing or reflective element to the base 124.

Support arm 122 comprises a polymeric support arm, such as a support arm molded or otherwise formed of an acetal material or the like. The support arm 122 comprises a double ball arm with opposite ball members or spherical portions 122a, 122b at opposite ends of an arm or shaft portion 122c. As shown in FIG. 5, the ball member 122a of support arm 122 may be pivotally received within a socket 120 of casing 118 to pivotally mount casing 118 to support arm 122, while the ball member 122b is pivotally received within a socket 124a of mounting base 124. However, the support arm 122 may be pivotally attached to the casing or may pivotally attach to a mounting or attachment or back plate at the reflective element or to a toggle member or the like, without affecting the scope of the present invention. The reflective element 114 may comprise a prismatic reflective element (whereby the support arm is preferably attached to a toggle member, such as a toggle member of the types discussed above), or may comprise an electro-optic reflective element, such as an electrochromic reflective element or the like (whereby the support arm is preferably attached to a plastic molded attachment or back plate at the rear surface of the reflective element), without affecting the scope of the present invention.

Mounting base 124 includes the socket 124a and a base portion 124b integrally molded or formed together, such as by injection molding, as known in the molding arts. Base portion 124b includes a polymeric overmold portion 126a that is molded over and at least partially around a metallic insert portion 126b. The metal insert 126b may comprise a metallic material, such as a die-cast aluminum or zinc material, and may provide the channels or tabs or structure or the like for engaging and mounting to and cooperating with the mirror mounting button (not shown) or structure at the windshield of the vehicle (or to other mounting structures of the vehicle). The mounting base thus provides the desired mechanical quality and mounting structure via the metallic insert, and provides the desired color and appearance (or texture or decorative effect) and resilience (particularly for the socket portion) via the overmolded plastic or polymeric portion. The mounting base provides the desired qualities and characteristics with an integrally formed component, which enhances the assembly process of the mirror assembly and provides enhanced structural integrity of the mounting base and mounting assembly.

Optionally, the mirror assembly may include one or more electrical accessories or elements, and may be connected to a power source and/or control of the vehicle via connection to a wire harness of the vehicle. For example, and with reference to FIG. 6, a mirror assembly 110' may include a mounting assembly 112' that includes a support arm 122' with electrical conductors or conductive elements 128 insert molded or integrally molded within and at least partially along the support arm 122'. The electrical conductors or conductive elements may comprise individual conductive elements (such as metal wires or leads) separated by the non-electrically conducting molded polymeric material of the support arm, or may comprise multi-wire wire harnesses (comprising multiple wires, each individually electrically insulated one from another) or cables, such as a ribbon cable or harness or the like, without affecting the scope of the present invention. The conductors may be insert molded in the support arm while the support arm is being formed, such as by injection molding, or may be fed through a passageway formed in an already-molded support arm (for example, a multi-wire ribbon or cable of individually insulated wires or leads may be threaded through or otherwise passed through a passageway formed or established in the support arm).

Figure 6:
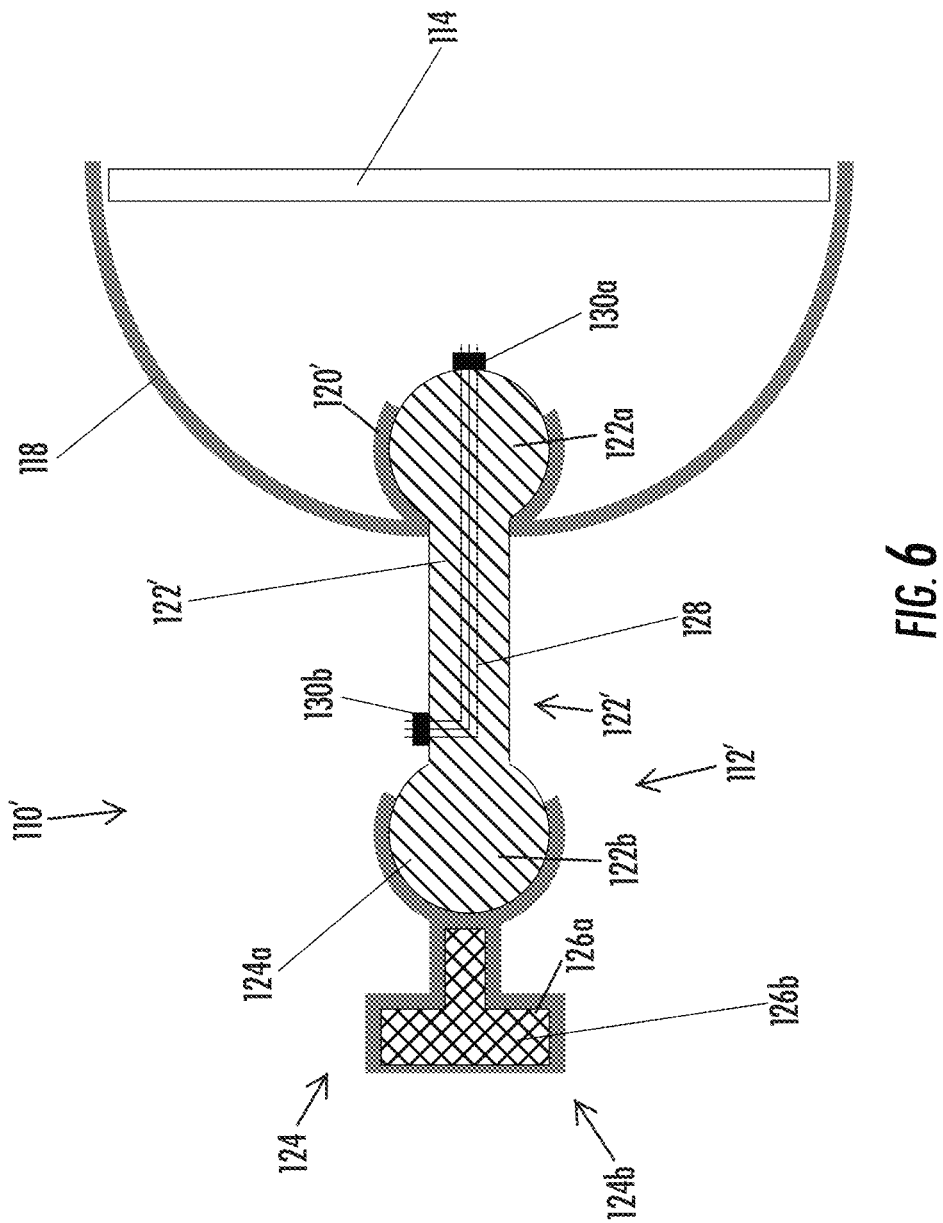
FIG. 6 is a sectional view of another mounting assembly in accordance with the present invention.

In the illustrated embodiment, the electrical conductors or conductive elements 128 terminate at connectors 130a, 130b, such as multi-pin plugs or sockets at opposite ends of the conductors 128 for connecting or plugging the connectors to corresponding connectors (not shown) at or in the mirror casing 118 (such as at a circuit board or the like at the mirror reflective element or otherwise within the mirror casing) or at the mounting base 124. As shown in FIG. 6, the connector 130a may be positioned at the end of ball 122a, and the socket 120' (which may be formed at the casing or at a toggle member or attachment or back plate of the mirror) may have an opening formed at the end to accommodate the connector and to provide clearance for movement of the connector relative to the socket when the mirror is pivoted or articulated about ball 122a. The other connector 130b may be positioned at the support arm for connecting to a wire or harness or cable or the like of the vehicle, such as to a wire harness extending from a headliner of the vehicle or the like. The connectors 130a, 130b may be connected to the conductive elements 128, and may include a flying lead or flexible lead or wires between the ends of the conductive elements at the support arm and the plugs or sockets at the ends of the connectors (so as to provide sufficient slack to allow ball movement within the ball socket joint without placing strain on electrical connectors/connections). The mirror assembly 110' may otherwise be substantially similar to the mirror assembly 110, discussed above, such that a detailed discussion of the mirror assemblies will not be repeated herein. The common or substantially similar elements or components are shown in FIGS. 5 and 6 with common reference numbers.

Figure 7:
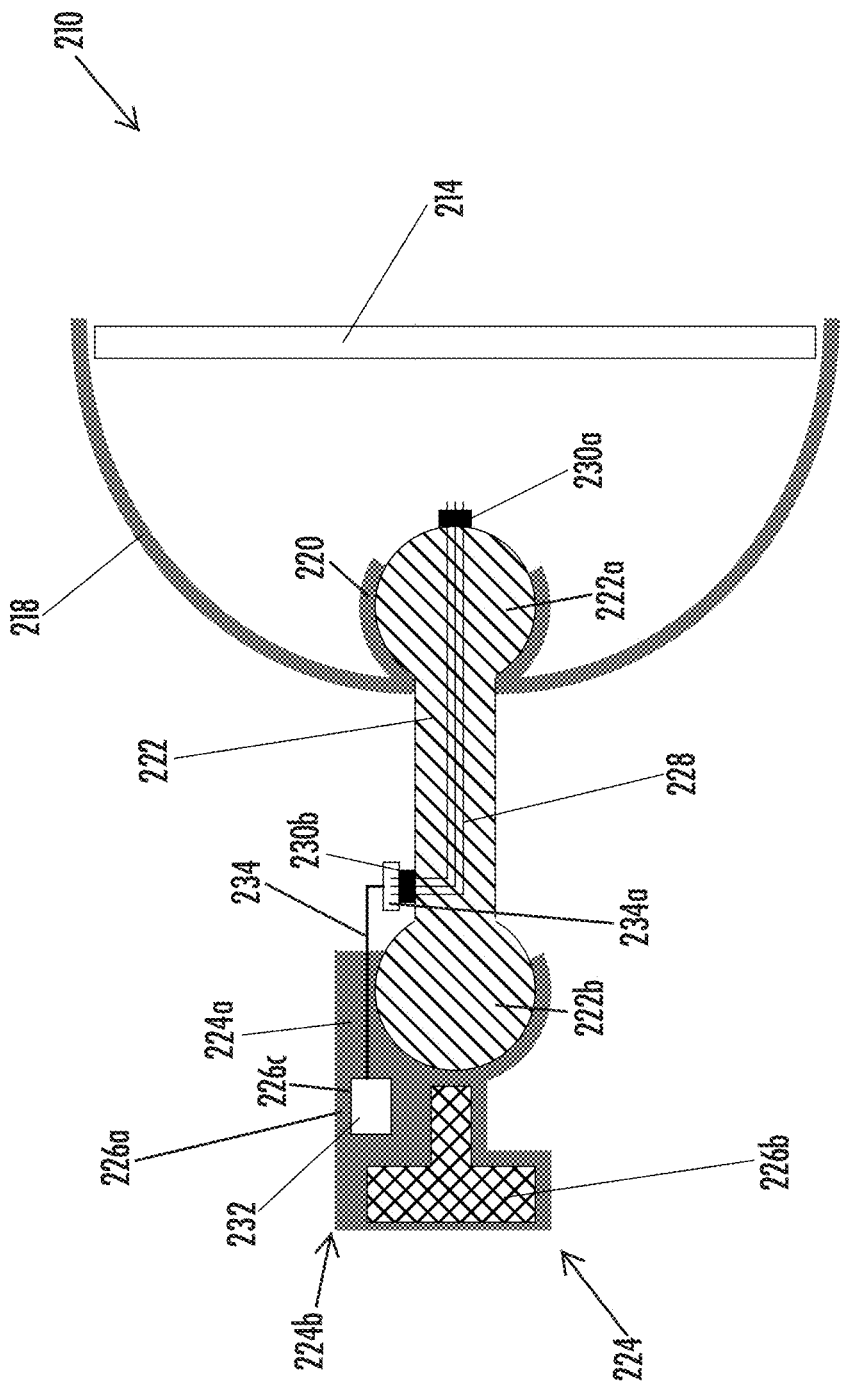
FIG. 7 is a sectional view of another mounting assembly in accordance with the present invention.

Optionally, the mounting base of the mounting assembly may include or incorporate an electrical accessory or element or circuitry that may be electrically connected to a corresponding electrical accessory or element or circuitry within the mirror casing. For example, and with reference to FIG. 7, a mirror assembly 210 may include an essentially all-polymeric or plastic mounting assembly 212 having a mounting base 224 that houses or contains an electrical element or circuitry or sensor 232, such as a compass sensor, such as a magneto-responsive sensor, such as a magneto-resistive sensor, a magneto-capacitive sensor, a magneto-inductive sensor, a flux-gate sensor or a Hall-effect sensor or the like. The sensor 232 may be positioned at and within the molded base portion 226a so that the sensor is substantially fixedly positioned within the vehicle when the mounting base is attached to the mounting button or structure of the vehicle. The sensor 232 may include a lead or wire or wires 234 with a connector 234a, such as a multi-pin plug or socket or the like, at an end thereof for connecting to a corresponding connector or plug or socket 230b of electrical conductors 230 of support arm 222. The support arm 222 and electrical conductors 228, connectors 230a, 230b, mirror housing or casing 218 and socket 220 of mirror assembly 210 may be substantially similar to the corresponding components of mirror assembly 110', discussed above, such that a detailed description of the common or similar components will not be repeated herein.

Mounting base 224 may be molded or formed to define the base portion 226a and a socket portion 224a for receiving ball member 222b of support arm 222. The base portion 226a may be molded over and at least partially around a metallic insert 226b, such as described above with respect to base portion 26a. Base portion 226a may be molded or formed with a cavity 226c and/or passageway for receiving the sensor or wire, or may be overmolded over and at least partially around the sensor and/or wire. The wire 234 comprises a flying lead or flexible lead that extends from the base portion 226a to the connector or terminals at the support arm 222, and includes sufficient slack or flexibility to accommodate pivotal movement or articulation of the support arm relative to the socket 224a of mounting base 224. The other connector 230a (at ball member 222a received in socket 220 (which may be formed at the casing or at a toggle member or attachment or back plate of the mirror)) may connect to a corresponding connector at a circuit board or electrical element or the like at the mirror casing, such as to circuitry on a circuit board at the reflective element or the like. The electrical element at or in the mirror casing may include controls or display circuitry and elements that are associated with or incorporated in a compass system and/or display system of the mirror assembly.

The accessory or sensor (or other electrical component or circuitry) thus may be positioned or located at or within the plastic molded mounting base of the mirror assembly. The accessory thus is positioned generally along the longitudinal axis of the mounting arm, and generally between the ball member 222b and the mounting base/mounting button at the windshield when the mirror assembly is installed in a vehicle, and not substantially above or below the mounting base (such as in a pod or gondola or module located above or below the mirror assembly) such as is typically done in known mirror assemblies. By positioning the accessory generally along the longitudinal axis of the support arm or generally along the z-axis (the axis along the vehicle and normal to the cross car or x-axis and the vertical or y-axis), the accessory is located generally between the windshield and the mirror casing and reflective element when the mirror assembly is installed in the vehicle, and does not extend substantially above or below or to either side of the mirror when the mirror assembly is installed in the vehicle. The mounting base thus may house or contain the accessory in a location that does not interfere with the forward field of view of the driver of the vehicle. The mirror assembly of the present invention thus may provide a fixed sensor with double ball movement or articulation, and with reduced interference with the forward field of view by the driver of the vehicle.

Optionally, and as discussed above, the electrical accessory or circuitry housed or contained within the mounting base may comprise a compass sensor that is part of a compass system and/or display of the mirror assembly and/or vehicle. Note that the magneto-responsive sensor used with the mirror assembly may comprise a magneto-responsive sensor, such as a magneto-resistive sensor such as the types disclosed in U.S. Pat. Nos. 5,255,442; 5,632,092; 5,802,727; 6,173,501; 6,427,349 and 6,513,252 (which are hereby incorporated herein by reference), or a magneto-inductive sensor, such as described in U.S. Pat. No. 5,878,370 (which is hereby incorporated herein by reference), or a magneto-impedance sensor, such as the types described in PCT Publication No. WO 2004/076971, published Sep. 10, 2004 (which is hereby incorporated herein by reference), or a Hall-effect sensor, such as the types described in U.S. Pat. Nos. 6,278,271; 5,942,895 and 6,184,679 (which are hereby incorporated herein by reference). The sensor circuitry and/or the circuitry in the mirror housing and associated with the sensor may include processing circuitry. For example, a printed circuit board may include processing circuitry which may include compensation methods such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and 6,642,851, which are all hereby incorporated herein by reference. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442 and/or 5,632,092, and/or U.S. patent applications, Ser. No. 10/456,599, filed Jun. 6, 2003, now U.S. Pat. No. 7,004,593; and/or U.S. Ser. No. 11/029,695, filed Jan. 5, 2005, now U.S. Pat. No. 7,253,723, and/or PCT Application No. PCT/US2004/015424, filed May 18, 2004, and/or U.S. provisional application Ser. No. 60/636,931, filed Dec. 17, 2004, which are all hereby incorporated herein by reference.

Optionally, the sensor may comprise a two-axis sensor (comprising two magneto-responsive sensor elements disposed orthogonally to each other and disposed in the cavity 226c generally parallel to the floor plane of the vehicle so as to be sensitive to the horizontal component of the Earth's magnetic field), or the sensor may comprise a three-axis sensor (comprising two magneto-responsive sensor elements disposed orthogonally to each other and disposed in the cavity, and a third magneto-responsive sensor element at a right angle (approximately ninety degrees) to the two sensor elements and disposed in the cavity, so that the three-axis sensor is sensitive to the horizontal component and to the vertical component of the Earth's magnetic field), without affecting the scope of the present invention. The sensor may be arranged at a desired angle to provide enhanced sensing in the horizontal directions when the mirror assembly is installed in the vehicle. For example, aspects of constructions such as are disclosed in U.S. Pat. Nos. 6,140,933 and 6,928,366, which are hereby incorporated herein by reference, may be utilized.

Optionally, an integrated automotive "compass-on-a-chip" may be disposed in the cavity of the mounting base and may comprise at least two magneto-responsive sensor elements, associated A/D and D/A converters, associated microprocessor(s) and memory, associated signal processing and filtering, associated display driver and associated LIN/CAN BUS interface and the like, all (or a sub-set thereof) created or disposed onto a silicon substrate (such as using CMOS technology) and constituting an ASIC chip, which is small (preferably less than approximately a two square centimeter area, more preferably less than approximately a 1.5 square centimeter area, and most preferably less than approximately a one square centimeter area or thereabouts) and readily packagable into the cavity.

Optionally, and preferably, such a compass-on-a-chip ASIC may also include the hardware and software required to receive an output from a temperature sensor (such as a thermocouple or thermostat that is located external the vehicle cabin in order to sense and monitor the temperature external to the vehicle) and to convert this signal to a reading in degrees Fahrenheit or Celsius, and to provide this reading via an on-chip temperature display driver and/or via a BUS protocol or via an on-chip wireless transmitter or the like to a digital or other type of temperature display so that the driver and/or occupants of the vehicle can view the temperature being measured (such as the temperature external the vehicle and/or the temperature within the vehicle cabin). Thus, for example, a monolithic compass/temp-on-a-chip ASIC may be disposed in the likes of a mirror mount or within the mirror head/housing of an interior rearview mirror assembly, and it may provide both the external temperature readout and a compass direction heading readout to an information display at the mirror head/housing (or elsewhere in the vehicle, such as the instrument panel/cluster or at an overhead console or accessory module or the like). Optionally, such a chip or circuit board or circuitry may also or otherwise comprise EC driver circuitry for controlling/driving an electro-optic or electrochromic reflective element or cell, such as by utilizing aspects of the EC driver-on-a-chip such as described in U.S. patent application Ser. No. 11/201,661, filed Aug. 11, 2005, now U.S. Pat. No. 7,480,149, which is hereby incorporated herein by reference.

Figure 8:
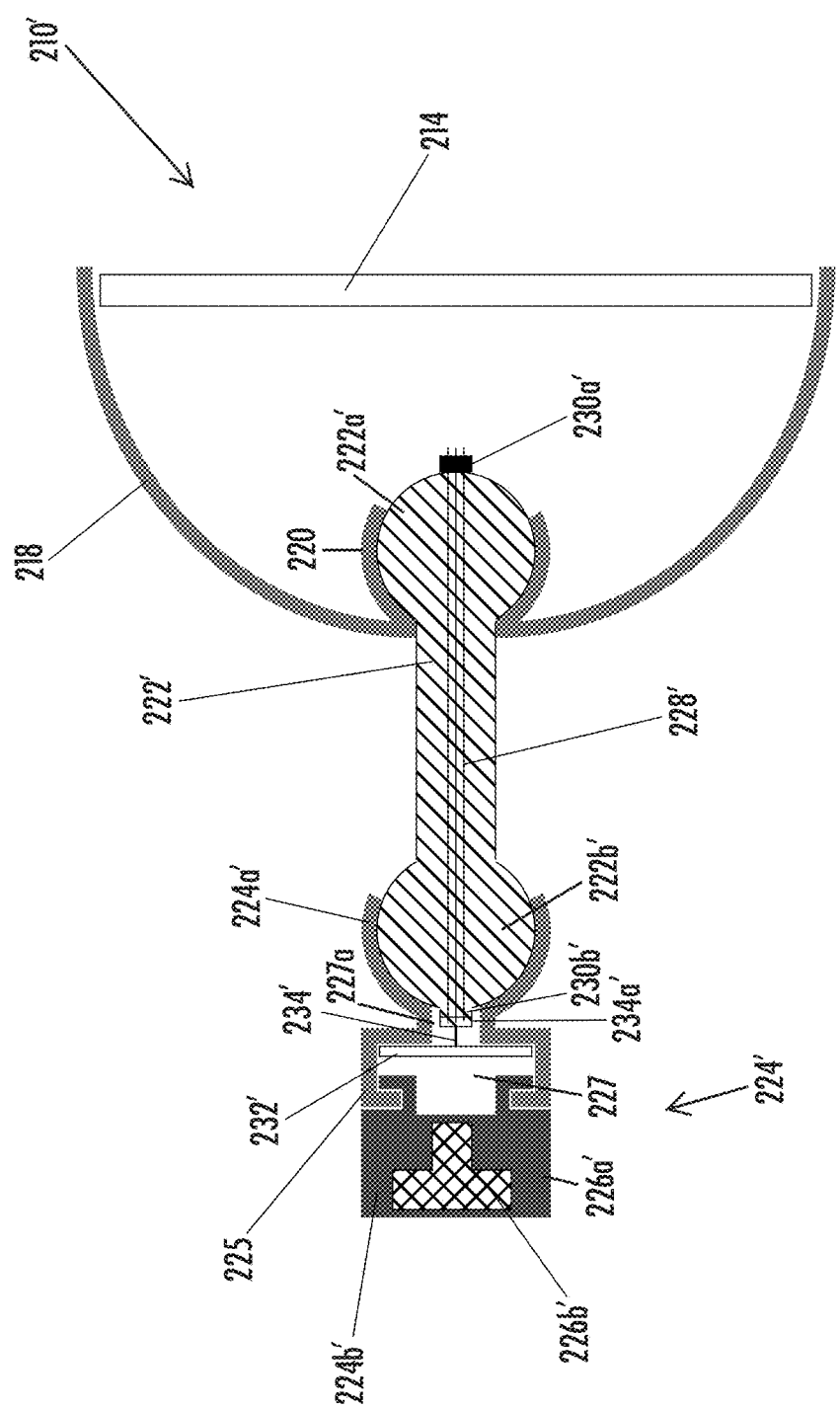
FIG. 8 is a sectional view of another mounting assembly in accordance with the present invention.

Optionally, and with reference to FIG. 8, a mirror assembly 210' may include a polymeric mounting base 224' that includes a polymeric base portion or mount portion 224b' that is attachable or connectable to a polymeric socket portion 225, with a cavity 227 defined at the junction of the portions 225, 224b'. The molded polymeric support arm 222' may include integrally molded wiring or electrical conductors 228' that extend between the ends of the ball members 222a', 222b', and that may have connectors 230a, 230b at the respective opposite ends of the conductors and ball members. The ball member 222a' includes the connector 230a' extending therefrom, and is received within socket 220 (which may be formed at the casing or at a toggle member or attachment or back plate of the mirror) of mirror housing 218. The polymeric socket portion 225 may comprise a polymeric socket 224a' for receiving the polymeric ball member 222b' therein and may have an opening or cavity or passageway 227a from a base region of the socket 224a' to the cavity 227.

An electrical component or element, such as a printed circuit board 232' or other electrical element or circuitry or accessory or the like, may be positioned within cavity 227 and may connect to the connector 230b' (or to the ends or terminals of the conductors 228') via a flying lead or connecting wire or element 234'. The connecting wire 234' may have a connector 234a', such as a multi-pin plug or socket or the like, for connecting to the corresponding connector 230b', such as a corresponding multi-pin plug or socket, at the ball member 222b'. The circuit board 232' may be received and retained within the cavity 227 (such as by snapping into the cavity or otherwise inserting into the cavity), and may readily connect to the conductors 228' of the support arm 222' when the support arm is attached to or received in the socket 224a' (or may connect to the connector 230b before being inserted into the cavity). The circuit board and/or circuitry may include a compass sensor, such as described above, or other electrical elements or circuitry or sensors, such as an antenna or the like, while the mirror casing may house or contain one or more electrical accessories, such as lights, display elements, sensors and the like, which are associated with or powered or controlled by the circuitry of the circuit board 232' via the electrical conductors 234', 228'.

Socket portion 225 may attach to base portion or mount portion 224b' to secure the socket portion to the mount portion and to retain the circuit board within the cavity. The socket portion 225 and base portion 224b' may snap together or may be otherwise secured together, such as via ultrasonic welding or the like, or by any suitable mechanical or adhesive attachment means. The polymeric base portion 224b' may include a metallic insert 226b' that may be insert molded within an overmolded polymeric or plastic portion 226a', such as in a similar manner as described above. The mirror reflector or reflective element 214 and mirror housing or casing 218 and other elements or components of mirror assembly 210' may be substantially similar to the mirror assembly 210 described above, such that a detailed discussion of the similar or common components of the mirror assemblies will not be repeated herein.

The mounting base thus may house or contain or capture an electrical component or element or circuitry at a location that does not interfere with the forward field of view of the driver of the vehicle. The electrical component may be positioned within the mounting base and generally between the ball member 222b' (that is attached to the mounting base) and the mounting button at the windshield when the mirror assembly is installed in the vehicle. The electrical component and the electrical connection between the electrical component and the electrical conductors of the support arm are contained within the mounting base and do not extend upward or downward or sideward so as to be readily viewable by the driver of the vehicle when the mirror assembly is installed in the vehicle.

Because the mounting base comprises a mount portion and a socket portion, the mirror assembly may be readily adapted for various applications or optional applications, such as for different vehicles or vehicle lines or platforms or for different options of a particular vehicle or vehicle line or the like. For example, the socket and mounting arm (and attachment plate or the like at the opposite or mirror end of the mounting arm) may comprise standard or common components, while the mounting portion may be selected with the appropriate metallic insert that matches or corresponds to the mounting button or the like of the particular vehicle in which the mirror assembly will be installed. For example, the mirror mounting button on the windshield of a MY05 VW vehicle is different than that on the windshield of a MY05 General Motors vehicle, and thus this aspect of the current invention facilitates economic manufacture by the mirror manufacturer of standard interior mirror assemblies but with only the mounting portion needed to be customized to fit and attach to a particular automaker's design of the windshield mounting button. The appropriate mounting portion (with the appropriate metal insert and mounting structure) thus may be selected and attached to the socket portion of a particular mirror assembly, so that the mirror assembly is configured to be installed into a particular vehicle or vehicle line or the like.

Optionally, the mounting portion may accommodate other accessories or circuitry or the like as well, such as a rain sensor or imaging device or the like, and may electrically connect to the circuitry or connectors of the socket portion. For example, the mounting portion may include a rain sensor or the like and may position the rain sensor against the windshield, such as described in U.S. Pat. Nos. 6,250,148; 6,341,523 and 6,824,281, and in U.S. patent applications, Ser. No. 10/023,162, filed Dec. 17, 2001, now U.S. Pat. No. 6,516,664; U.S. Ser. No. 10/348,514, filed Jan. 21, 2003, now U.S. Pat. No. 6,968,736; U.S. Ser. No. 10/958,087, filed Oct. 4, 2004, now U.S. Pat. No. 7,188,963; and/or U.S. Ser. No. 11/201,661, filed Aug. 11, 2005, now U.S. Pat. No. 7,480,149, which are all hereby incorporated herein by reference, or may include an imaging device, such as an imaging array sensor for imaging systems of the types described in U.S. Pat. Nos. 6,757,109; 6,717,610; 6,396,397; 6,201,642; 6,353,392; 6,313,454; 6,396,397; 5,550,677; 5,670,935; 5,796,094; 5,877,897; 6,097,023 and/or 6,498,620, and/or U.S. patent applications, Ser. No. 09/441,341, filed Nov. 16, 1999, now U.S. Pat. No. 7,339,149, and U.S. Ser. No. 10/427,051, filed Apr. 30, 2003, now U.S. Pat. No. 7,038,577, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; and/or Ser. No. 60/638,687, filed Dec. 23, 2004, which are all hereby incorporated herein by reference. Optionally, the mounting portion or mirror assembly may be at or in or associated with an accessory module or windshield electronics module or the like that is located at or near the interior rearview mirror assembly, such as an accessory module or windshield electronics module of the types described in U.S. patent applications, Ser. No. 10/958,087, filed Oct. 4, 2004, now U.S. Pat. No. 7,188,963; and U.S. Ser. No. 10/456,599, filed Jun. 6, 2003, now U.S. Pat. No. 7,004,593, and/or U.S. Pat. Nos. 6,824,281; 6,690,268; 6,250,148; 6,341,523; 6,593,565; 6,428,172; 6,501,387; 6,329,925 and 6,326,613, and/or in PCT Application No. PCT/US03/40611, filed Dec. 19, 2003, and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference.

Figure 9:
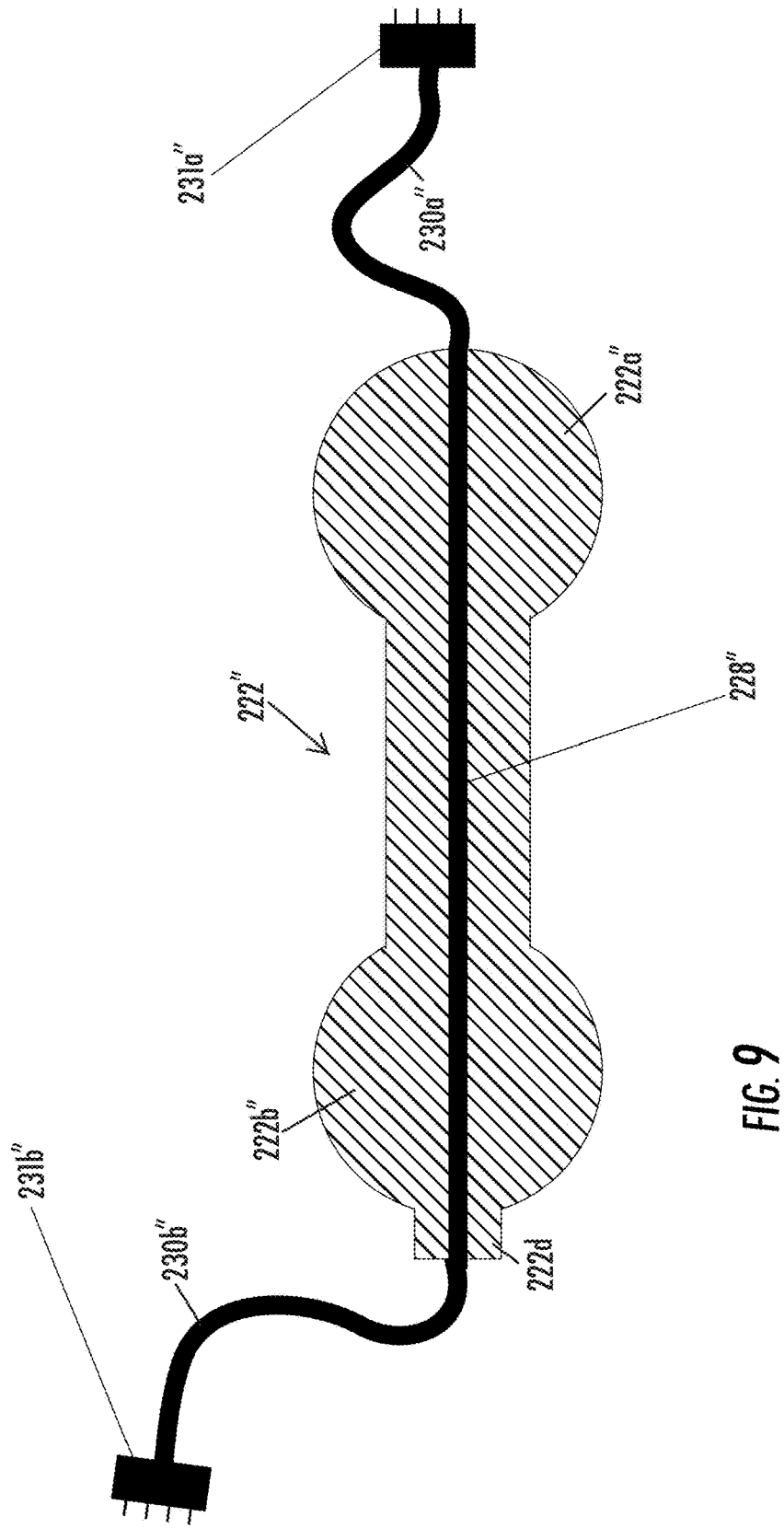
FIG. 9 is a sectional view of a mounting member with an electrical conductor insert molded within the mounting member.

Optionally, and with reference to FIG. 9, the polymeric support arm 222" may include a multi-wire cable or harness 228" insert molded therein. The wire or cable 228" may comprise multiple electrical conductors or wires and may include flying leads 230a", 230b" or wires or cable extending from the opposite ends or ball members 222a", 222b" of the support arm 222". The support arm 222" may comprise a plastic molding, such as an acetal or engineering plastic resin or the like, and may be molded over and around a portion of the wire or cable 228". The leads 230a", 230b" may include electrical connectors 231a", 231b" (such as multi-pin connectors or the like, such as four pin or sixteen pin or other multi-pin plug and socket type connectors or the like) at the ends thereof for connection to the respective electrical connectors. The plastic material may be molded around and over the electrical conductors or the conductors may be fed or threaded through a pre-formed support arm with a passageway formed therein. For example, the electrical connector 231a" may connect to an electrical connector at a circuit board in the mirror housing, while the connector 231b" may connect to an electrical connector at the mirror mount, such as to a vehicle wire harness or the like at or near the mirror mount. The leads and connectors thus may be readily connected to the corresponding connectors at the mirror mount and mirror casing, and the support arm may be readily attached to or received in the sockets to pivotally and electrically connect the mirror to the mirror mount. As shown in FIG. 9, one or both ball members may include an extension or knob 222d at an end thereof. Such an extension is entirely optional, and may assist in forming a stop or limit in the cavity included in the molded mirror mount or base to accommodate and allow movement of the flying lead wire harness.

Figure 10:
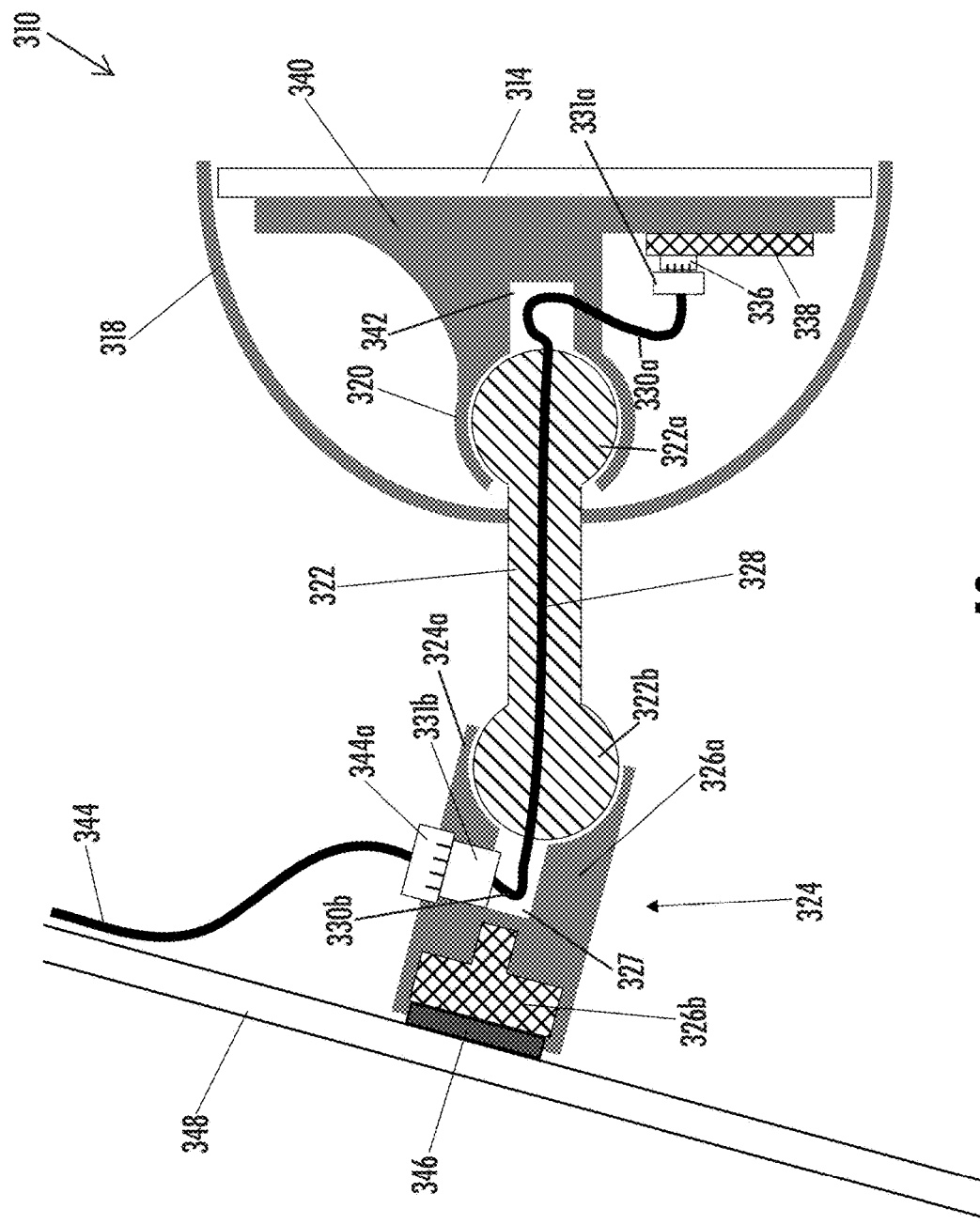
FIG. 10 is a sectional view of another mounting assembly in accordance with the present invention.

For example, and with reference to FIG. 10, a support arm 322 of a mirror assembly 310 may include a wire harness 328 integrally molded into the support arm 322, with leads 330a, 330b and connectors 331a, 331b extending from the ball members 322a, 322b at each end of the support arm 322. The mirror assembly 310 may have a mirror housing or casing 318 and reflective element 314 mounted at or attached to ball member 322a of support arm 322, and a mounting base 324 mounted at or attached to ball member 322b of support arm 322.

The lead 330a and connector 331a may connect to a connector 336 at a printed circuit board 338 within casing or housing 318, such as at a back plate or attachment plate 340 at the reflective element 314. The back plate 340 may include the socket 320, which may be integrally formed with the back plate 340 or may be attached to the back plate. The back plate 340 and socket 320 may define a recess or cavity 342 for receiving the lead 330a as it extends from ball member 322a, so that sufficient clearance is provided to accommodate pivotal movement of the support arm relative to the socket 320 and back plate 340. The lead may be positioned within the cavity 342 with sufficient slack or free play to allow for pivotal movement or articulation of the socket about the ball member, without stressing the electrical conductors or wires. Although shown as a socket incorporated into or joined to the back plate (such as for a mirror assembly having an electro-optic reflective element, such as an electrochromic reflective element or the like), the socket for receiving ball member 322a may be incorporated into or joined to a toggle member (such as for a mirror assembly having a prismatic reflective element) or the mirror casing or the like, without affecting the scope of the present invention.

Socket 324a of mirror mount 324 may pivotally receive ball member 322b therein, and may define a cavity 327 for receiving lead 330b to provide sufficient clearance to accommodate pivotal movement of the support arm relative to the socket 324a. Connector 331b may be positioned in the plastic mount portion 326a of mirror mount 324, and may include multiple pins or connecting elements that may be recessed within the mount portion 326a. As shown in FIG. 10, a wire harness 344 and connector 344a may be connected to the connector 331b at the mirror mount 324, such as via a plug and socket connection or the like. Mirror mount may include a metallic insert 326b, where the plastic portion 326a may be molded over and at least partially around the metallic insert 326b, such as in the manner discussed above. The metallic insert 326b may include the mounting structure for mounting or attaching the mirror assembly to a mirror mounting button 346 or the like at a windshield 348 of a vehicle, such as discussed above.

Figure 11:
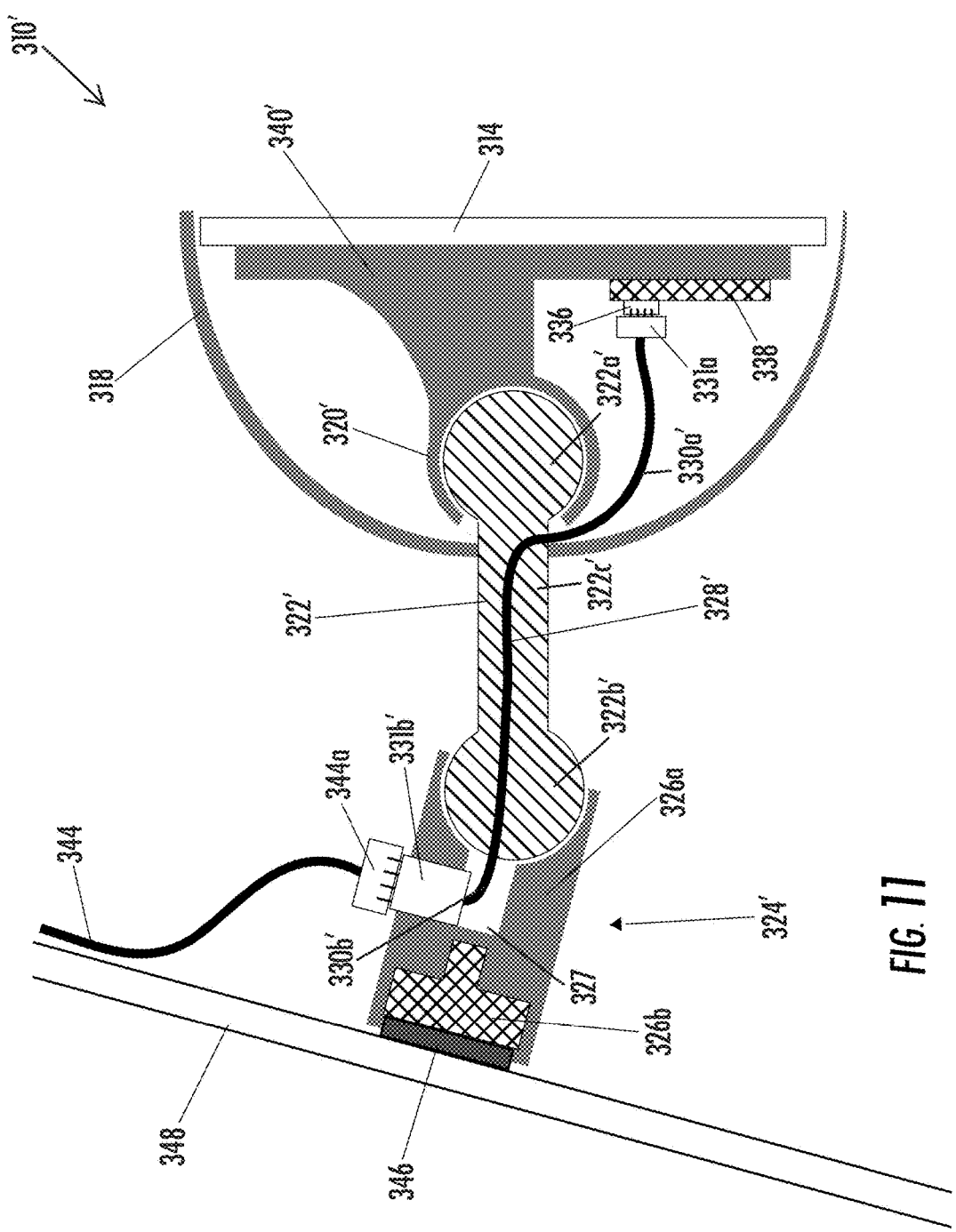
FIG. 11 is a sectional view of another mounting assembly in accordance with the present invention

Optionally, and as shown in FIG. 11, a support arm 322' of a mirror assembly 310' may include a wire harness 328' that extends from the shaft 322c' of support arm before the ball member 322a' (and preferably where the support arm is within the mirror casing 318 and thus concealed or not readily viewable), where the lead 330a' may extend around the socket 320' of back plate 340' to connect to the circuit board 338 via the connectors 331a, 336. The other lead 330b' may extend from the ball member 322b' into a cavity 327 of socket 324a', such as in a similar manner as discussed above. The connecting elements of the connector or plug 331b' may be flush with or recessed in the exterior surface of the mirror mount, or may protrude from the mirror mount 324' (as shown in FIG. 11), without affecting the scope of the present invention. Mirror assembly 310' may otherwise be substantially similar to mirror assembly 310, described above, such that a detailed discussion of the mirror assemblies will not be repeated herein. The similar or common components of the mirror assemblies are shown in FIGS. 10 and 11 with common reference numbers.

Optionally, the mounting base of the mirror assembly may be molded from a polymeric resin to incorporate a wire conduit or cover (or at least a base/bottom portion thereof), which may be positioned generally along the windshield and above the mounting base when the mounting base is attached to the mounting button on the windshield. The wire cover extends to the headliner of the vehicle, and conceals the vehicle or other accessory wire harness emanating from the roof portion so that this wire harness is not readily viewable to an occupant of the vehicle and is substantially contained within the wire cover or conduit. The mounting base may be formed or molded to have a portion of a wire cover (such as a conduiting member or wire passageway that extends about one inch or thereabouts above the mounting base and that may receive the wire harness or lead therein), which may receive an end of a separate wire cover that contains and conceals the wire harness or lead between the end of the partial cover and the headliner of the vehicle. The wire cover may insert into or receive the end of the partial cover (or may otherwise connect or snap or join to the partial cover) extending from the mounting base, and may contain the wire harness or lead therein. The appropriate length wire cover thus may be selected for the particular application, so as to provide the appropriate length cover depending on the distance between the mirror mounting base and the headliner of a particular vehicle model located proximate the junction of the windshield with the vehicle roof. Optionally, the mirror mounting base may include the full length wire cover or conduiting member extending from the mounting base, and thus may be molded or formed/customized (such as by cutting the conduiting member to a desired or appropriate length) for the particular vehicle model application.

Figure 12:
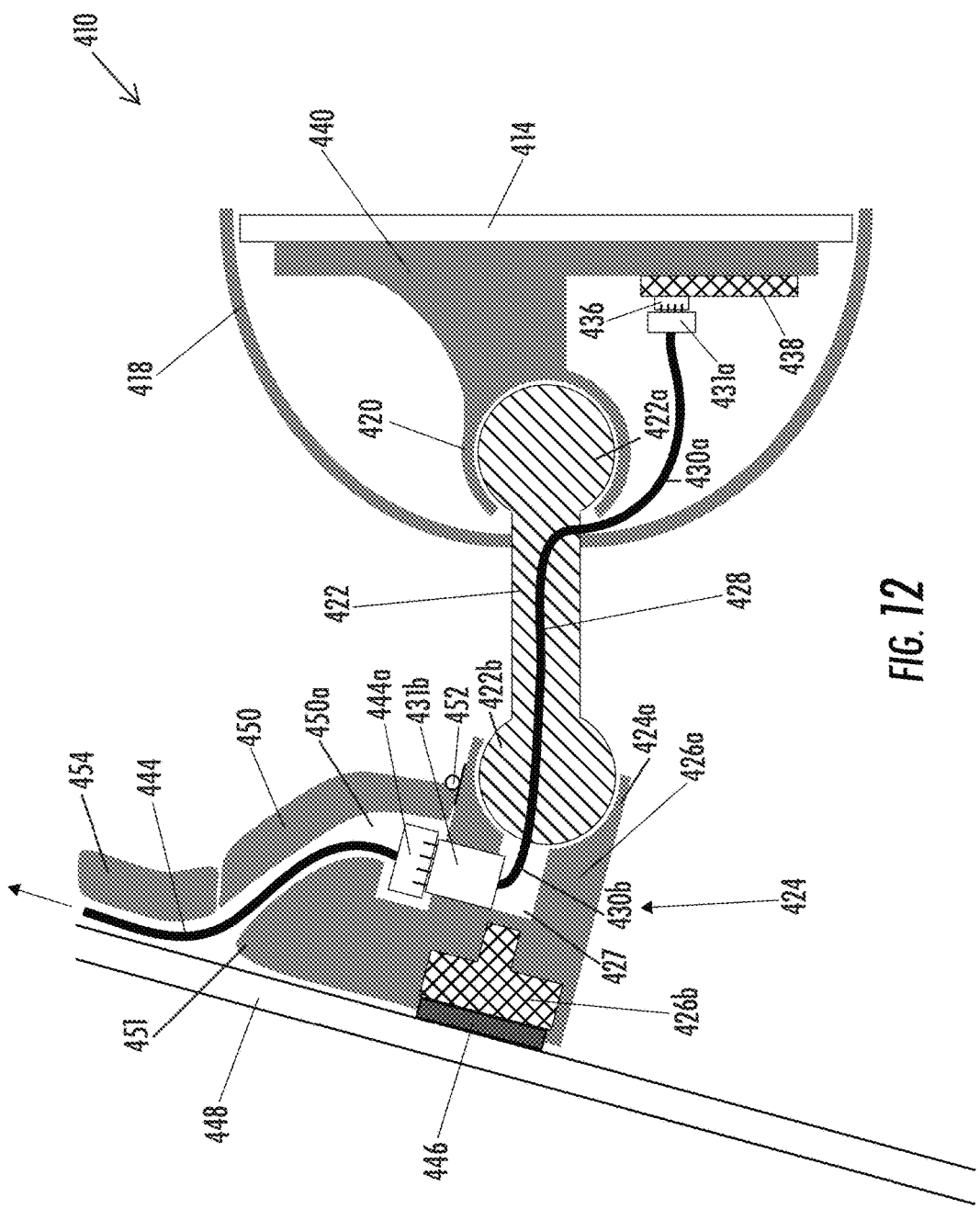
FIG. 12 is a sectional view of another mounting assembly in accordance with the present invention.

For example, and with reference to FIG. 12, a mirror assembly 410 includes a mounting base or mirror mount 424, a polymeric support arm 422 and a mirror housing 418 and reflective element 414. The mirror housing 418, reflective element 414, back plate 440, socket 420 and support arm 422 may be substantially similar as the corresponding components of mirror assembly 310', discussed above, such that a detailed discussion of the mirror assemblies will not be repeated herein. The similar or common components or elements between the mirror assemblies 310', 410 are shown in FIG. 12 with similar reference numbers to those of FIG. 11, but with 100 added to each reference number.

Mirror mount 424 includes a polymeric portion 426a molded over a metal insert 426b, such as via similar molding processes discussed above. The metal insert 426b includes the mounting structure for mounting to or attaching to the mounting button 446 at the windshield 448. Similar to mirror mount 324, discussed above, mirror mount 424 includes a plastic socket portion 424a for receiving a ball member 422b of support arm 422, and defines a cavity 427 for receiving the lead 430b of wires 428 within the plastic or polymeric portion 426a. Wire or conducting elements 430b may terminate at a connector 431b, which may be positioned generally at an upper surface or region of the socket portion of the mirror mount. As can be seen in FIG. 12, the mirror mount 424 may include a wire cover or conduiting member 450 that extends upward from the socket portion and generally along the windshield when the mirror assembly is mounted at the windshield. In the illustrated embodiment, wire cover 450 is flexibly or movably attached to socket portion 424a via a hinge portion 452, such as a living hinge molded with the cover and mirror mount, such that the cover 450 may move or flex or bend to facilitate access to connector 431b. The wire cover 450 at least partially defines a passageway 450a along a body portion or upper portion 451 of the mirror mount when the wire cover 450 is pivoted along the body portion 451. The hinged cover 450 may extend substantially upward between the mirror mount and the headliner of the vehicle, or may extend partially upward from the mirror mount and may receive or connect to a separate cover element or member 454, which may attach to cover 450 and may extend along the windshield 448.

The mirror assembly thus may be installed by bringing the mounting base (already attached to the support arm and mirror) toward the mounting button at the windshield and attaching or mounting the mirror assembly to the mounting button. The hinged cover 450 may be moved or bent or pivoted toward the support arm to facilitate access to the connector 431b, and the connector 444a of wire harness 444 may be electrically connected to the connector 431b of mounting base 424. The connector at the end of the wire harness or lead (that extends from the headliner or from an overhead console of the vehicle) thus may be plugged into or otherwise connected to the connector at the mounting base (or at an end of a lead extending from the mounting base or from the support arm) when the mirror assembly is at or near or attached to or mounted on the mounting button. After the connection is made, the hinged wire cover 450 may be pivoted toward the windshield and may snap in place or may be otherwise secured in place along the windshield and/or along the body portion 451 of the mirror mount 424.

The wire cover thus may be adjustably joined to the body of the mounting base, such as via a living hinge, which allows the wire cover to bend or fold to facilitate access to the connector at the mounting base so that the wire harness or lead may be electrically connected to the connector. When so connected, the wire cover may bend or flex or snap into the appropriate orientation or angle so that the wire cover extends upward from the mounting base and generally along the windshield of the vehicle. Optionally, the wire harness may be routed or fed or positioned through and along the separate wire cover or conduiting member 454 before the connection is made and the wire cover may connect to or join to or snap to the partial conduiting member 450 extending from the mounting base.

The plastic mounting base may be molded over the mounting structural component, such as a channel mount element or the like. The structural component is formed to mount to or attach to the mounting button at the windshield. The mounting assembly may provide a breakaway mount, such as a mounting arrangement utilizing the principles described in U.S. Pat. No. 5,820,097, issued to Spooner; or U.S. Pat. No. 5,100,095, issued to Haan et al., the disclosures of which are hereby incorporated herein by reference. Typically, the mounting button comprises a metal button, such as formed of a sintered or pressed steel or aluminum or a die-cast zinc or the like, that is compatible with filed proven adhesives and the like, such as silicone adhesive or modified epoxy or PVB (polyvinyl buteryl) or the like. The breakaway element is typically provided at the mounting base or channel mount. It has been suggested to use engineering plastics as a substitute for the metal mounting button; however, in order to achieve the desired mechanical properties (including the ability to reliably receive and hold a threaded fastener or screw to secure the mounting base to the button), such metal-like engineering plastics are sometimes used for the button, but the breakaway elements remain at the channel mount or base.

Figure 13:
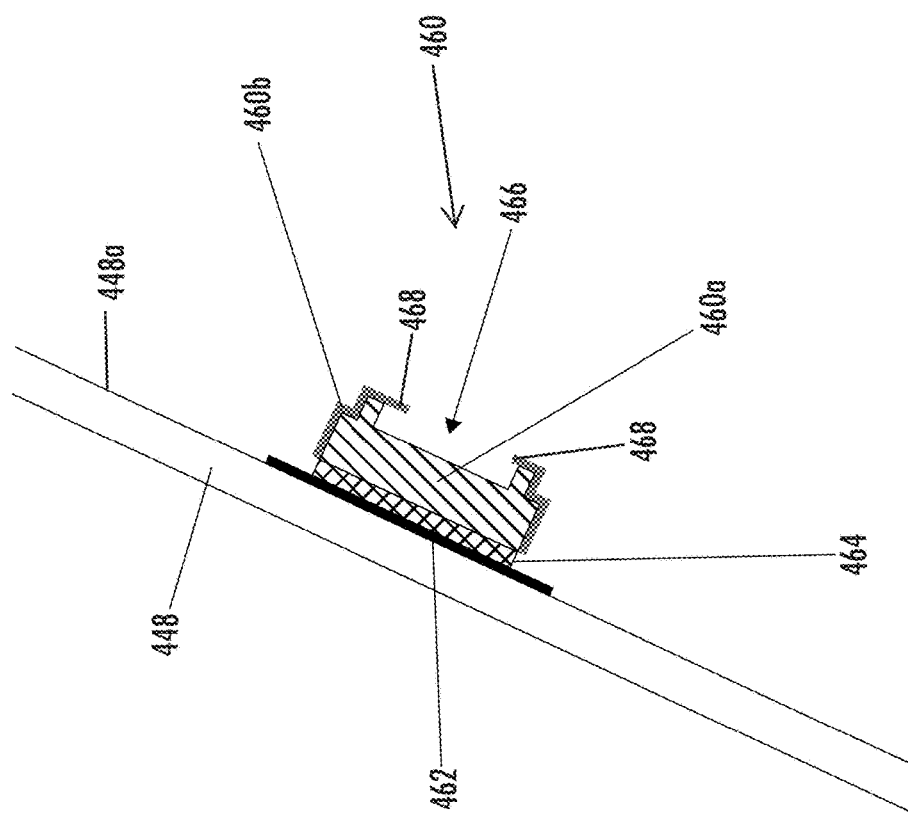
FIG. 13 is a sectional view of a mounting attachment of the present invention.

Optionally, and with reference to FIG. 13, a mounting button 460 may be adhered or bonded to the windshield 448, and the mirror assembly (including the mounting base, support arm and mirror housing) may be attached to the mounting button to attach the mirror assembly to the interior portion of the vehicle. As shown in FIG. 13, the mounting button 460 may be adhered or bonded to a blackout layer or frit layer 462 at the interior surface 448*a* of the windshield 448 via a suitable adhesive layer 464, such as a silicone adhesive, a PVB adhesive or an epoxy or the like. Although shown in FIG. 13 as having a generally horizontally oriented channel or receiving portion for slidably receiving the channel mount of the mounting base in a generally horizontal or side to side or lateral direction or orientation, typically, and preferably, the mounting button may have a generally vertically oriented channel or receiving portion for slidably receiving the channel mount in a generally vertical direction or orientation and along the windshield. The mounting button may be implemented for either application, without affecting the scope of the present invention.

Mounting button/attachment member 460 may include a metal portion 460*a*, which may be formed of a metal material, such as a die-cast zinc, a sintered or processed steel or aluminum or the like, and a polymeric molded portion 460*b* molded over and partially around the metal portion 460*a*. The metal portion 460*a* may define a receiving portion 466 for receiving the channel mount or mirror mounting base of the interior rearview mirror assembly. The overmolded polymeric portion 460*b* may include tabs or elements 468 at the receiving portion to retain or hold the mounting base at the receiving portion 466. The tabs or elements 468 may provide a breakaway characteristic at the mounting button of the mirror mounting arrangement, such that the mirror assembly may break away from the mounting button by breaking or bending or flexing of the elements 468 at the mounting button. The mounting button of the present invention thus provides the structural integrity of a metal mounting button, while also providing the breakaway elements at the mounting button.

The support assembly or mounting assembly of the mirror assembly of the present invention may be formed or molded together. Optionally, and preferably, the conductors or wire harness or the like (preferably including electrical connectors, such as plugs or sockets at ends thereof) may be obtained from an electrical supplier and placed in the mold tool in an injection molding machine configured to mold the support arm. The support arm may then be formed by injection of polymeric resin (such as acetal resin) into the injection molding tool over and around the conductors or wire harness already placed therein, such that the flying leads and their terminal connectors extend from the respective ends of the molded support arm when it is formed and removed from the tool (optionally, and less desirably, the conductors may be fed or threaded through a passageway formed in and at least partially along an already-molded support arm, such as in a manner similar to that described in U.S. patent application Ser. No. 10/032,401, filed Dec. 20, 2001, now U.S. Pat. No. 6,877,709, which is hereby incorporated herein by reference).

The formed support arm (with the electrical conductors extending therefrom) may then be placed in a second mold, where the mirror mount or base portion may be molded over the ball member, and the back plate and socket may be molded over the ball member. Optionally, the connector (such as connector 331*b* or 431*b*, discussed above) may be molded in place at the exterior portion of the mounting base (and optionally at or within a wire cover portion extending from the mounting base) so as to be readily connected to the wire harness or the like at the mounting base, while the other connector (such as connector 331*a* or 431*a*, discussed above) may be loose after the molding process so that the connector may be connected to the circuit board or the like at the reflective element. The cavities (such as cavities 327 and 342, discussed above) at the mounting base and back plate provide space for the flying leads (such as leads 330*b*, 330*a*, respectively) to provide sufficient clearance for pivotal movement or articulation of the support arm relative to the mounting base and/or back plate (or optionally a toggle member or the like depending on the particular application) of the mirror assembly.

The present invention thus provides a molded support arm and molded or overmolded mounting base. The molded support arm, the molded mounting base and the molded back plate portion or toggle portion may all be molded from the same polymeric resin material (such as acetal) or from different polymeric materials. For example, the support arm may by molded from a high-stiffness engineering plastic resin, such as a glass or mineral filled nylon resin, and both the mounting base and the back plate/toggle can be molded from similar resinous material, such as acetal or such as a polyolefin resinous material, such as polypropylene or the like. Alternately, and optionally, the support arm can be molded from one polymer resin material, the mounting base from another polymer resin material, and the back plate/toggle from a third polymer resin material. For example, a support arm can first be molded from filled nylon, and placed in an injection molding tool with two sections/cavities/regions. Then, a mounting base formed of acetal can be formed by injecting acetal resin into a first section/cavity/region of the tool at one end of the support arm, and a back plate/toggle can be generally simultaneously formed at the other end of the support arm, such as by injecting a filled polyolefin or an ABS resin into a second mold section or cavity or region. Such dual injection molding or overmolding can be used to customize the individual appearance (such as color or texture) and/or performance (such as ball/socket torque) of the support arm, the mounting base and the back plate/toggle portion. Also, differential molding packing pressures and/or tool surfaces/texturing and/or ball/socket sizing can be used to achieve a far higher torque for the ball joint formed via overmolding of the mounting base to the ball at one end of the support arm than is achieved for the ball/socket joint at the other end via overmolding of the back plate/toggle thereat. The mounting base may include or house or contain an electrical accessory or sensor or circuitry or circuit board therein, and the support member may have electrical conductors insert molded therein. The electrical conductors may include electrical connectors at respective ends, and may readily connect to an electrical accessory or circuitry or circuit board at the mirror and to an electrical accessory or circuitry or circuit board or wire harness at the mounting base.

The electrical accessory or sensor or circuitry or circuit board at or in the mounting base may be positioned within the mounting base and generally between the windshield and the ball member of the support arm that is attached to the mounting base. The electrical accessory or component or element thus is at a location that is not readily viewable by a driver of the vehicle when the mirror assembly is installed in the vehicle. The mounting base and/or the back plate of the reflective element may be molded over the ball members of the support arm and may contain the leads and/or connectors of the support arm therein.

Figure 14:
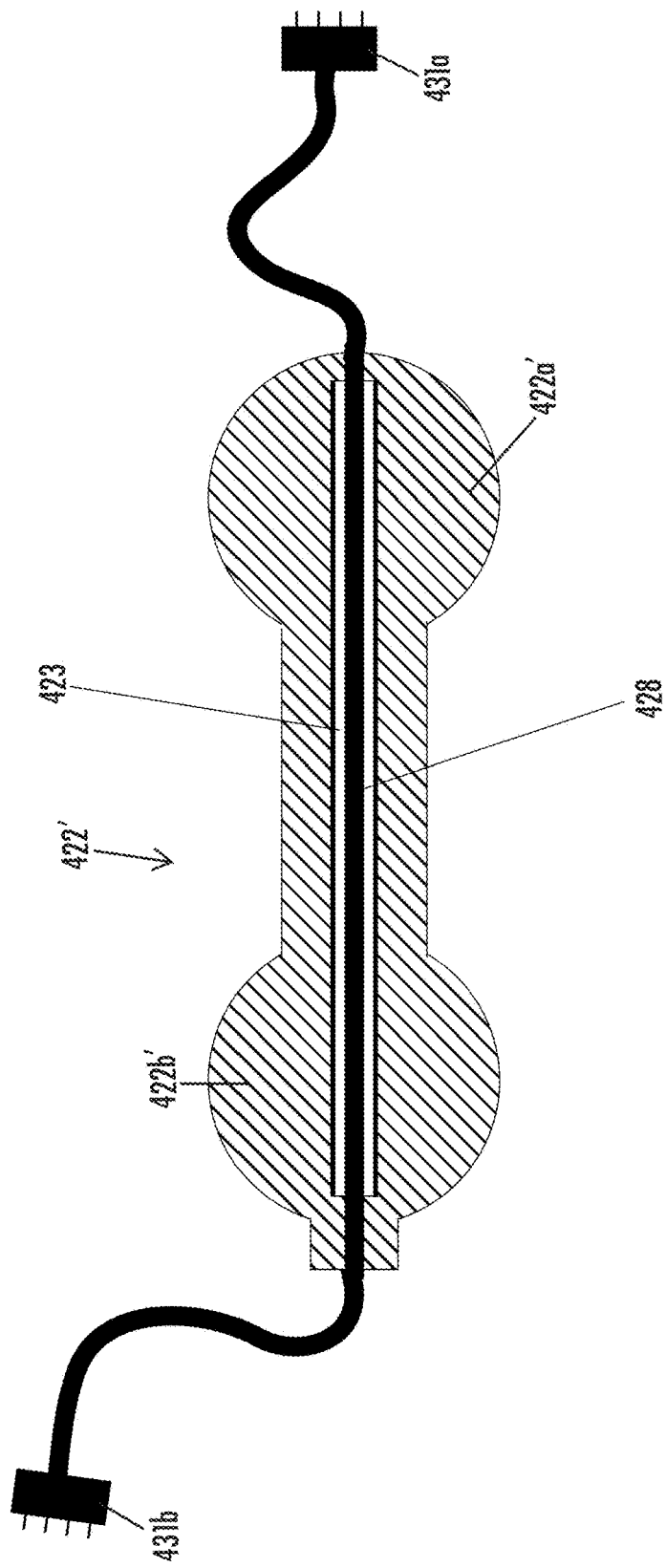
FIG. 14 is a sectional view of another mounting member in accordance with the present invention.
Figure 15:
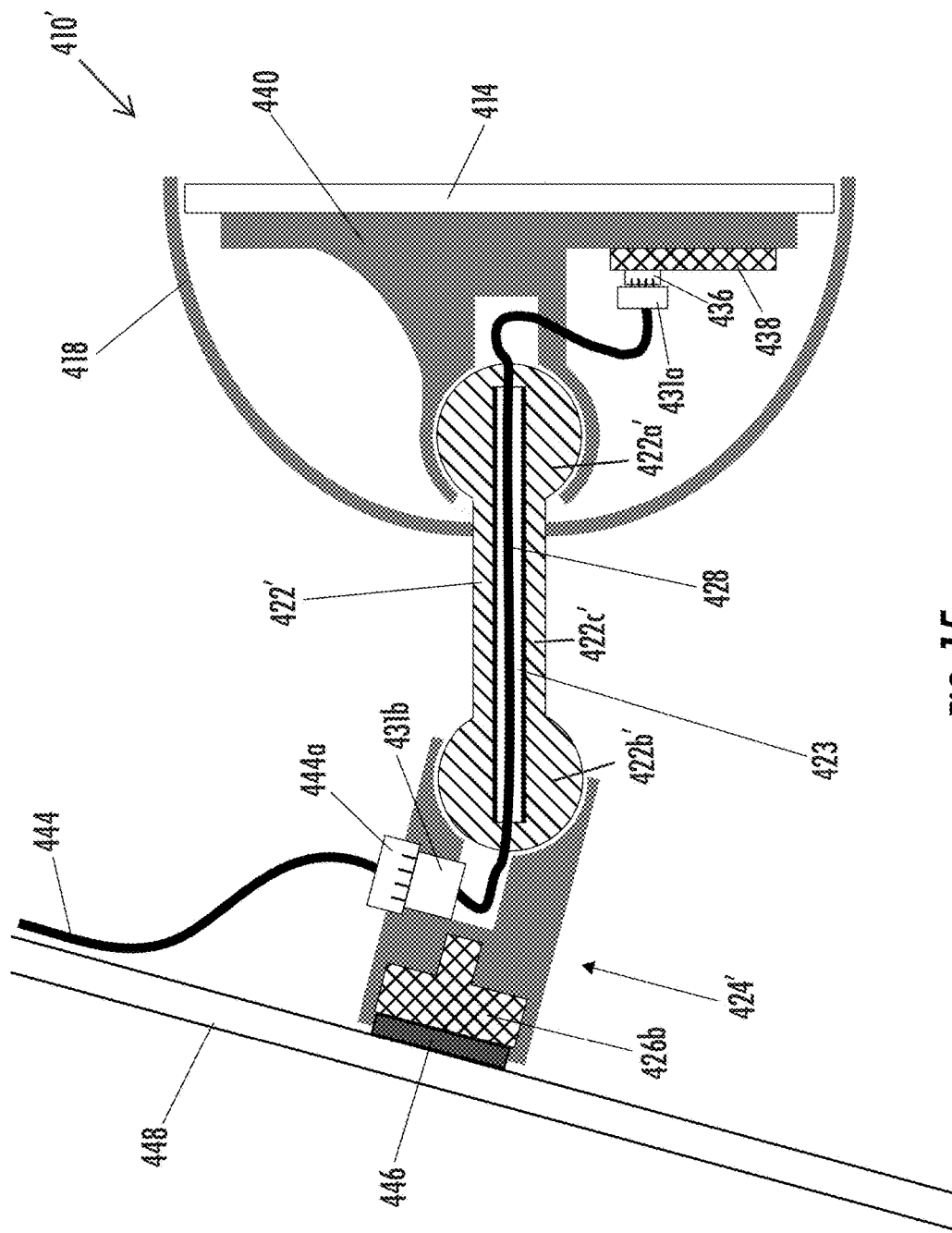
FIG. 15 is a sectional view of a mirror assembly incorporating the mounting member of FIG. 14.

Optionally, and with reference to FIGS. 14 and 15, a support arm 422' may include a substantially rigid stiffening element or insert element 423 insert molded within the support arm to provide additional strength and rigidity to the support arm. The stiffening element 423 may comprise a hollow tube or conduit, such as a metal tube or conduit, such as aluminum or zinc or magnesium or copper or brass or steel or an Inconel or any alloy of these or any other metal or the like, or such as a ceramic tube or conduit, or such as a plastic or polymeric tube or conduit (comprising a plastic material (such as an engineering plastic or polymeric material or a highly glass or mineral filled nylon or the like) that is stiffer or more rigid and stronger than the plastic material of the overmolded support arm), or the like. Many such engineering polymeric resins, often due to the high filler content, do not provide an aesthetically attractive/customizable Class A outward appearance. Thus, a central core engineering plastic (such as reinforced nylon or the like) rigid stiffening arm or insert element can be molded or formed and can be overmolded with a less rigid/less structurally strong resinous material, such as an unfilled polymeric resin material, such as a polypropylene or a polyethylene or the like, which provides a more desired or aesthetic appearance or texture or outer surface characteristic or finish (such as a Class A finish) or the like. Thus, a structural core (that may be metal) that provides structural rigidity and/or vibration reduction/dampening is sheathed/encased in an outer plastic molding that imparts the desired texture/color/appearance to the part. The wall thickness of such a stiffening tube or conduit (or cross-sectional diameter if a solid stiffening element) may be chosen to be whatever dimension is desired to achieve the desired enhancement of rigidity of the support arm, and the overall dimensions may be chosen to optimize rigidity enhancement while minimizing added weight.

The electrical wire harness 428 may be routed through the stiffening tube 423 and may extend through the ball members 422a', 422b' for connection to the connectors 436, 444a at the circuit board 438 and the mounting base or mirror mount 424', respectively. In the illustrated embodiment, the insert element or stiffening tube terminates inward from the ends of the support arm, such that portions of the wire harness are insert molded within the support arm material (though, alternately, a hollow channel or passageway or conduit could be included in the molding at one or both ends of the support arm to provide a wire passageway for the cable leading into/out of the central/core stiffening tube or element). The wire harness 428 may include plug or socket connectors 431a, 431b for electrically connecting the wire harness to the connectors 436, 444a at the circuit board 438 at the mirror head and the vehicle wire harness 444 at the mirror base, respectively. The mounting arrangement and mirror assembly 410' may otherwise be substantially similar to the mounting arrangement and mirror assembly 410 of FIG. 12, discussed above, such that a detailed discussion of the mounting arrangements and mirror assemblies will not be repeated herein. The common or similar components are shown in FIG. 15 with the same reference numbers as used in FIG. 12.

The insert element or stiffening element 423 may extend substantially the length of the support arm (and/or may terminate inward of the ends of the support arm as shown in FIGS. 14 and 15) or may be sized so that the stiffening element protrudes partially from one or both ends of the support arm, without affecting the scope of the present invention. Optionally, the stiffening element or tube may terminate near the ends or outer surface of the ball members but within the ball members. The arm material may be molded over the tube and over the ends of the tube. The thin wall portion of the ball members at the ends of the tube may be punctured or punched or broken through after the arm is molded and cured to create the passageway through the arm. The thin walls at the ends of the tube may be punched through or broken after the toggle and/or mounting base are molded over the ball members, so that material from the subsequent molding processes will not infiltrate the tube passageway during the subsequent molding of the toggle and/or mounting base.

Optionally, the wire harness 428 may pass through the stiffening element and may extend from the opposite ends of the ball members of the support arm, or may extend through different portions of the ball members or may exit the support arm at or along the arm portion 422c' of the support arm (such as shown in FIG. 12), or the like, without affecting the scope of the present invention. Optionally, the stiffening element need not be hollow, and may comprise a solid stiffening element to provide reinforcement and/or stiffening characteristics to the support arm (which may or may not have a wire or wire harness routed or insert molded therethrough). Although shown extending along a substantially straight support arm, it is envisioned that the support arm and/or the insert element or stiffening element may comprise a non-straight element, such as a curved support arm and/or a curved insert element, without affecting the scope of the present invention.

Optionally, the stiffening element may include vibration reducing or dampening characteristics, such as structural characteristics or properties or the like, that function to reduce/dampen the vibration of the support arm and mirror head. For example, the stiffening element may include materials or structures, such as soft materials and/or aerated materials and/or foamed materials or the like, that are embedded in and/or integrally molded within the plastic support arm. Optionally, such as for applications where reduced vibration is a dominant desire, the materials used and/or the designs employed for the insert element may not necessarily add stiffening and/or rigidity inducing/enhancing characteristics, but may improve vibration functionality or performance via vibration reducing/dampening characteristics and/or materials and/or features. The insert element thus may improve vibration performance of the mirror via a vibration dampening functionality, which may include the use of materials and/or structure embedded and/or integrally molded within the plastic or polymeric support arm. For example, the insert element may include characteristics or features, such as a non-straight shape or form, such as a serpentine shape or form, or a multi-vane shape or form or the like, in order to reduce, dampen, dissipate and/or ameliorate vibration of the mirror. Also, or alternately, the insert element or vibration functionality may include the use of soft materials and/or foamed materials and/or aerated materials within the support arm and/or other such vibration reducing/damping materials and/or features and/or characteristics such as are known in the vibration reducing/damping arts.

Thus, the stiffening element and wire harness subassembly may be pre-formed by a wire harness manufacturer. For example, the wire harness manufacturer may thread the wires or conducting elements through the hollow stiffening tube, and then attach the connector or connectors to one or both of the ends of the wires. The wires and connectors, with the stiffening tube around at least a portion of the wires, may then be shipped to the support arm molding facility or location or the like for forming the support arm over and around the stiffening element and a portion of the wires. For example, the stiffening element may be placed in a support arm mold, and the wires protruding from either end of the stiffening element may be placed or routed to the appropriate locations in the mold cavity, and the support arm material (such as an acetal or engineering plastic resin or the like) may be molded over the stiffening element and portion of wires within the cavity to form the support arm about the stiffening element. The support arm (with the insert element or stiffening element insert molded therewithin) may then be attached to the mounting base and mirror head socket, and the wire may be electrically connected to the connector at the printed circuit board of the mirror head. Optionally, and as described above, the molded arms may be loaded into a mold tool and the mirror mount material and toggle material may be injected into the respective tool cavities to form the mirror mount and toggle material around or partially around the respective ball members of the support arm. Optionally, multiple molded arms may be picked up and placed or loaded (such as by a robotic device or automated device the like) into multi-cavity mold tools to form multiple mounting assemblies via a substantially automated molding process. The assembled mirror assembly may be shipped to a vehicle assembly plant, where the mirror assembly may be mounted or attached to a mounting button at the vehicle windshield (or to any other mounting structure within the vehicle), and the vehicle wiring harness may be electrically connected to the connector at the mounting base of the mirror assembly to electrically connect the vehicle wiring to the mirror head.

Figure 16:
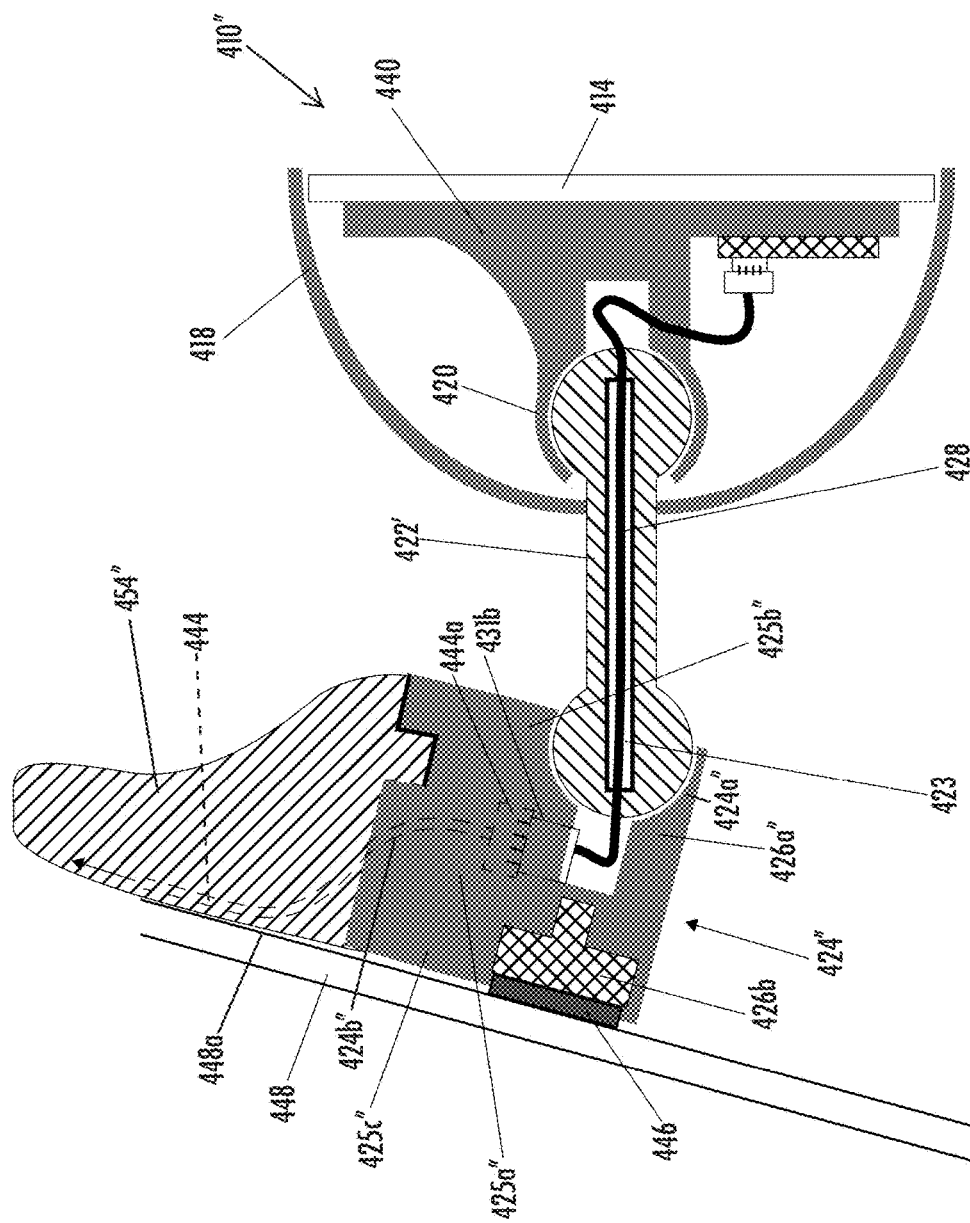
FIG. 16 is a sectional view of another mirror assembly incorporating another mounting arrangement in accordance with the present invention.

Optionally, and with reference to FIG. 16, the mirror housing 418 and reflective element 414 of an interior rearview mirror assembly 410" may be mounted to a mounting base or mirror mount 424" via the support arm 422'. The mirror housing 418, reflective element 414, back plate 440, socket 420 and support arm 422' may be substantially similar as the corresponding components of mirror assemblies 410, 410', discussed above, such that a detailed discussion of the mirror assemblies will not be repeated herein. The similar or common components or elements between the mirror assemblies 410, 410' and 410" are shown in FIG. 16 with similar reference numbers to those of FIGS. 12 and 15.

The polymeric portion 426a" of mirror mount 424" includes the socket portion 424a" and a shield portion or wall portion or pocket portion 424b" that extends upward from socket portion 424a" and generally along the interior surface 448a of the windshield 448. Shield portion 424b" provides opposite sidewalls 425a" and a cabin side wall 425b" and a windshield side wall 425c" extending upward from socket portion 424a" to define a cavity or receiving pocket into which the vehicle wire harness 444 and connector 444a can be inserted to connect to the corresponding connector 431b of mirror wire harness 428. In the illustrated embodiment, the connector or plug 431b (or socket) of mirror wire harness 428 is secured or retained or positioned at the socket portion 424a" of mounting base 424" and is accessible at a lower or bottom portion of the cavity defined by the walls 425a", 425b", 425c" of shield portion 424b", so that the connector or socket 444a (or plug) of vehicle wire harness 444 may be readily connected or plugged into the connector 431b of vehicle wire harness 428, such as after the mirror assembly 410" is mounted to the mounting button 446 at the windshield 448.

Shield portion 424b" includes opposite side walls 425a" that extend upward along the sides of the mirror mount and limit or substantially preclude a driver or occupant of the vehicle or a person outside of the vehicle from viewing the vehicle wire harness and the connectors or plug/socket or joint of the wire harnesses from either side of the rearview mirror assembly 410" when the mirror assembly is installed in the vehicle. Likewise, the shield portion 424b" includes a rear or interior or cabin side wall portion 425b" that extends upward from the socket portion 424a" and limits or substantially precludes the driver or occupant of the vehicle from viewing the vehicle wire harness and the connectors or plug/socket or joint of the wire harnesses from within the cabin of the vehicle. Also, the shield portion 424b" includes a front or windshield side wall portion 425c" that extends upward and generally along the windshield 448 to limit or substantially preclude a person outside of the vehicle from viewing the vehicle wire harness and the connectors or plug/socket or joint of the wire harnesses from outside of the vehicle cabin and through the vehicle windshield. The sidewalls 425a", rear wall portion 425b" and front wall portion 425c" may be unitarily formed together and function to define a receiving cavity or pocket for the vehicle wire harness and connector to be inserted into or received into for connection to the connector of the mirror wire harness, such as after the mirror assembly is mounted to the mounting button at the vehicle windshield.

The shield portion 424b" thus at least partially defines a substantially encased or enclosed cavity and/or passageway along the windshield and at least partially toward the headliner of the vehicle. Optionally, a separate cover element or member 454" may substantially encase the vehicle wire harness 444 between the shield portion 424b" and the vehicle headliner, and may attach to an upper portion of shield portion 424b". The cover member 454" thus may extend along the windshield 448 and substantially encase and conceal the vehicle wire harness 444 between the mount 424" and the headliner so that the wire harness 444 is not readily viewable by a driver or occupant of the vehicle. The cover member 454" may attach to the upper end of the shield portion 424b", such as via a snap type connection or the like, so as to be substantially retained to the shield portion 424b" of the mirror mount or base 424".

The mirror assembly thus may be installed by bringing the mounting base (already attached to the support arm and mirror) toward the mounting button at the windshield and attaching or mounting the mirror assembly to the mounting button. The vehicle connector 444*a* of wire harness 444 may be electrically connected to the connector 431*b* within the pocket or cavity of the shield portion 424*b*" of mounting base 424". The connector at the end of the wire harness or lead (that extends from the headliner or from an overhead console of the vehicle) thus may be plugged into or otherwise connected to the connector at the mounting base (or at an end of a lead extending from the mounting base or from the support arm) when the mirror assembly is at or near or attached to or mounted on the mounting button. Optionally, the wire harness 444 may be routed or fed or positioned through and along the separate wire cover or conduiting member 454" before the connection is made and the wire cover may connect to or join to or snap to the shield portion 424*b*" at an upper end of the mounting base.

Thus, and in accordance with the present invention, the plug connector at the end of a wire harness coming from the upper windshield area/headliner/roof of the vehicle may be received by, nested in and/or enveloped by the upper portion of the mirror mount of the interior rearview mirror assembly, and the presence of the plug connector of the wire harness to the socket within the mirror mount (or vice versa) is hidden from view from the front of the vehicle through the windshield, and hidden from view by an occupant within the vehicle cabin) by the plastic shielding portion/wall of the mirror mount. Note that as previously described, a portion of the mirror mount or shield or wall may be hinged and/or detachable/replaceable, such as a trap door or removable cover or the like, to facilitate or ease making the plug/socket connection.

Optionally, and preferably, an end portion of a wire cover can mechanically attach, such as by a snap or snug connection, to the upper portion of the mirror mount, so that essentially the presence of the wire harness and its connection to the mirror assembly is hidden from direct view. Many vehicle connector wire harnesses terminate in the likes of a multi-pin connector having, for example, eight or ten or even sixteen parallel pins/connectors (such as about ½ inch to an inch or more in length). The upper portion of the mirror mount thus may be configured so that is wider (wider transverse across the vehicle) than the lower portion so as to accommodate such a wide connector. Such a configuration places the wider/waisted upper portion of the mirror mount typically above the ball joint at the mirror mount when the mirror assembly is normally mounted in the vehicle, without the lower portion of the mirror mount being required or desired to be similarly broader dimension. This places the wider connection portion substantially hidden and substantially behind the mirror casing when viewed by the driver, and at an upper portion not likely to interfere with the field of view through the windshield below the mirror button location.

Figure 29:
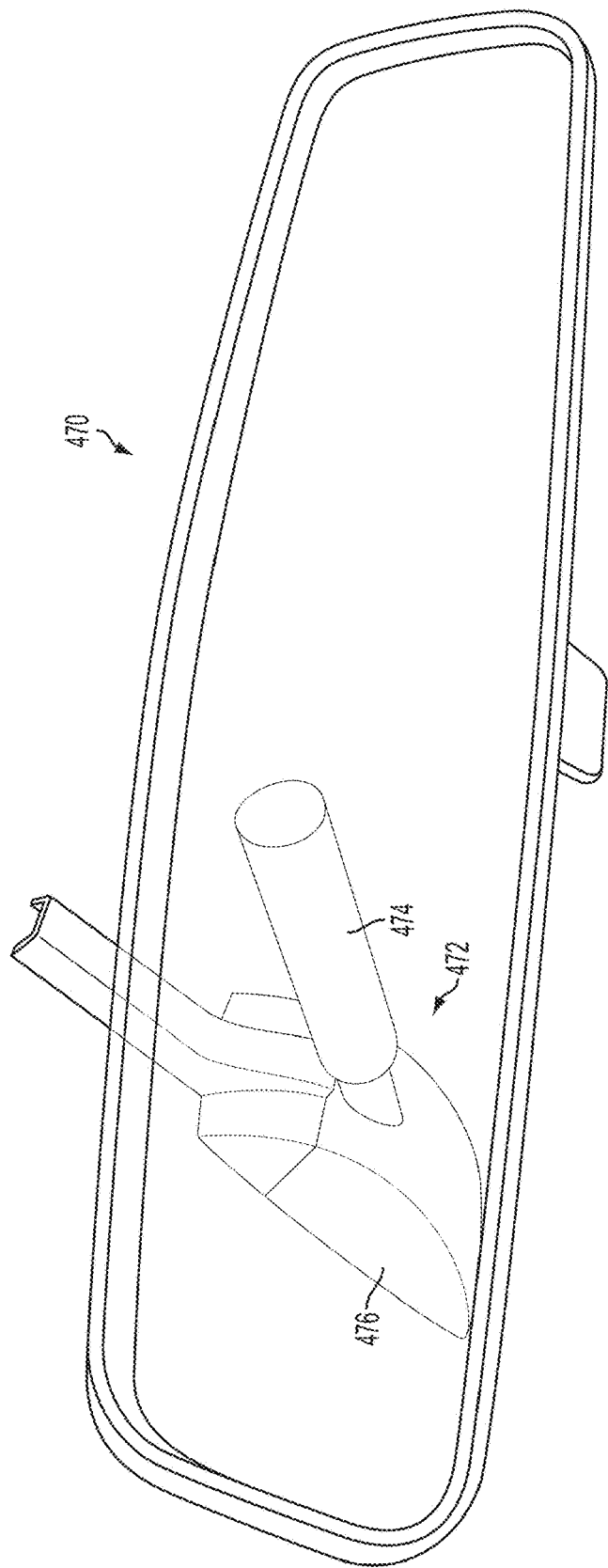
FIG. 29 is a perspective view of an interior rearview mirror assembly mounted on a mounting arrangement in accordance with the present invention.
Figure 30:
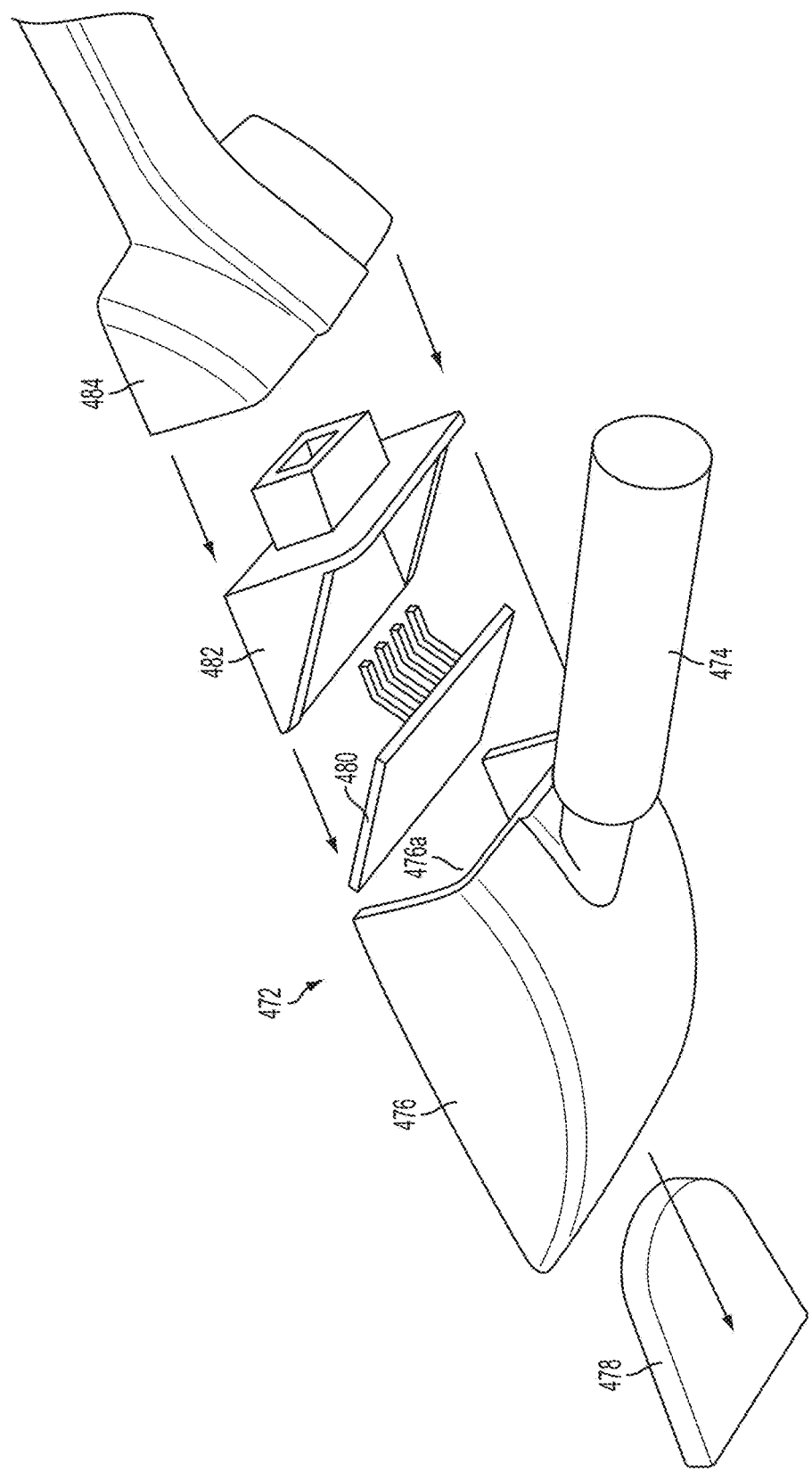
FIG. 30 is an exploded perspective view of the mounting arrangement of FIG. 29.
Figure 31:
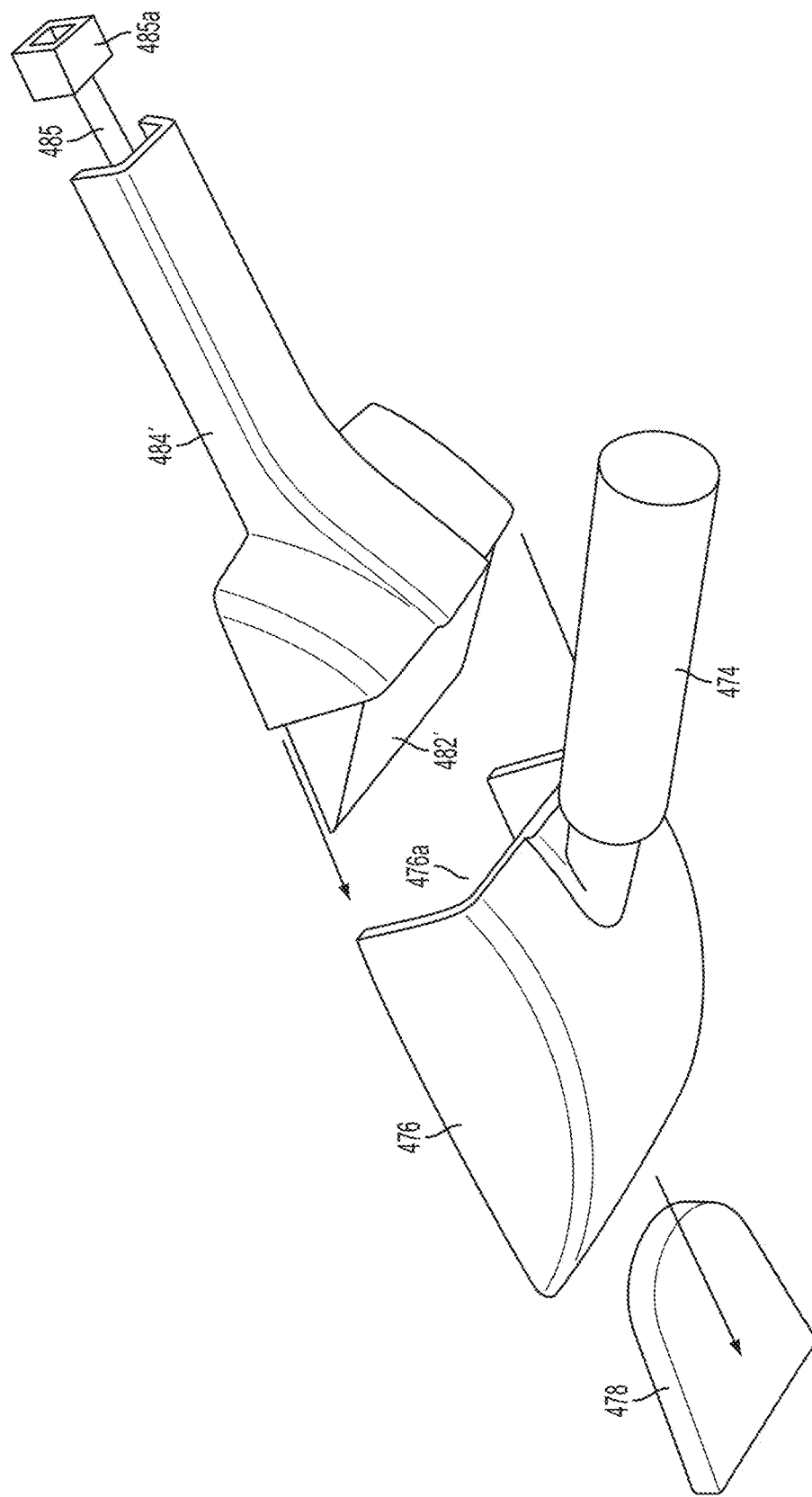
FIG. 31 is another exploded perspective view of a mounting arrangement of the present invention.

Optionally, and with reference to FIGS. 29-31, an interior rearview mirror assembly 470 may be pivotally attached to a mounting arrangement 472 at an interior portion of a vehicle, such as at an interior surface of a vehicle windshield. The interior rearview mirror is pivotally attached (such as by using a two ball pivot attachment or a one ball pivot attachment such as are known in the interior rearview mirror arts) to a mounting arm 474, which is pivotally attached to a base portion or channel mount portion 476 of the mounting arrangement 472 (exemplary embodiments of such one or two ball mounting arrangements are discussed above and are shown in U.S. Pat. Nos. 4,936,533; 5,820,097; 5,100,095; 5,555,136; 5,582,383; 5,680,263; 5,984,482; 6,227,675; 6,229,319 and 6,315,421, the disclosures of which are hereby incorporated herein by reference).

Base portion or mount 476 may receive or attach to a mounting button 478 or the like at the windshield surface, and includes a channel or cavity or receiving portion 476*a* that is open at an upper end of the base portion. As shown in FIG. 30, a circuit element 480, such as a printed circuit board or a flexible circuit board or electronic chip or other circuitry or circuit element, may be received within the channel or receiving portion 476*a*, and may be electrically or conductively connected to a plug or connector 482. The plug 482 is at least partially received in channel or cavity or receiving portion 476*a* and protrudes generally upwardly and along the windshield from the base portion or mount 476. Although shown and described as a male connector or plug, the connector may alternatively comprise a female connector or socket or other electrical connector, without affecting the scope of the present invention. A wire cover 484 attaches to the upper end of the accessorized base portion or mount 476 and extends along the windshield between the base portion and the vehicle headliner. The wire cover 484 includes an electrical wire or cable that routes through and along the wire cover between the headliner and the base portion. Wire cover 484 includes a connector or socket (or other suitable male or female connector for connecting to the connector at the base portion) at its lower end for connecting (and preferably snap-connecting) to the connector or plug 482 at the upper end of the accessorized base portion or mount 476.

The mounting arrangement 472 thus may provide a mounting location for accessory circuitry, such as a standalone compass circuit or system, preferably including a "compass-on-a-chip" as described above, or the like, at the windshield and generally behind the mirror and thus substantially concealed from view by the driver of the vehicle. Preferably, the mounting arrangement is configured so that at least two of the magneto-responsive compass sensors of the compass circuit are arranged generally horizontal and generally parallel to the ground when the compass circuitry is mounted within the mounting arrangement of the present invention and the mounting arrangement is mounted within the vehicle. Optionally, the circuitry element or circuit board or chip at the base portion may be electrically connected to circuitry within the mirror casing, such as via wiring or the like routed through the mounting arm, such as in the manners described above.

Prior art interior rearview mirror assemblies (such as the types described in U.S. Pat. Nos. 5,576,687 and 6,877,888, which are hereby incorporated herein by reference) have included the use of pods that typically and preferably can detach from the mirror mount, typically by snapping onto where the ball exits the mount. While such arrangements have good utility, they tend to be styling obvious to the driver of the vehicle and may be bulky and large.

Optionally, the circuitry element or circuit board or chip may not be electrically connected to accessories or circuitry of the mirror, and may be separate from the mirror accessories or electrical content. For example, the mirror may comprise a prismatic reflective element or mirror (such as shown in FIG. 29) and may comprise a base level mirror, with no electronic accessories or circuitry within the mirror casing. The mounting arrangement of the present invention may receive an appropriate circuit element or circuit board or chip to provide the desired electronic content or feature at or near the mirror assembly. For example, the circuit element may comprise compass circuitry (including, for example, the appropriate magneto-responsive sensor elements, microprocessor, LIN/CAN communication circuitry and the like), thereby providing a stand-alone compass system without requiring an upgrade to a mirror assembly with the desired electronic content. The desired electrical feature (such as a compass system or compass sensor and circuitry) may be provided with the circuit element or chip or circuit board, and an associated display may be provided elsewhere in the vehicle and remote from the mirror assembly. For example, compass circuitry can be included in the mirror mount base portion that provides a compass directional heading signal, preferably over a LIN or CAN bus connection or the like, to a compass display located remote and away from the mirror assembly, such as in the instrument panel or an overhead console or the like.

The desired electronic feature thus may be selected and readily installed in the vehicle with little or no changes required to the mirror assembly. The desired electrical content may be readily installed in the vehicle at the assembly plant without affecting the mirror content or other accessory content of the mirror or accessory module or vehicle. The accessorized or accessorizable mirror mount is thus constructed with a cavity or internal structure or receiving portion so that an accessory, such as an electronic circuit board or an electronic module or the like, can be included therein, with ease of incorporation and assembly at the mirror manufacturer or vehicle assembly line, but with the incorporation and presence of the accessory being largely unnoticed or unnoted by the owner of the vehicle. The mirror mount thus is not being unduly enlarged so as to be styling objectionable and/or so as to unduly impede the forward field of view of the driver through the windshield. In this regard, incorporation of the internal structure and/or cavity in the portion of the mirror mount that is above the button on the windshield when the mirror mounts thereto is preferred because the central upper windshield region between the button and where the windshield meets the head liner or roof region is largely unused by the driver for the forward driving task.

The supplier of the mirror mount thus may manufacture a mount with a mechanical attachment portion adapted for attaching the mirror mount to the vehicle. The mount may include electronic circuitry or a similar accessory (and may be capped), or may be left unoccupied and capped (largely for cosmetic effect or for later incorporation of an accessory), depending on the particular application and desired electrical content or accessory of the mount and/or mirror system (optionally, the same cap provided with an unoccupied mount may be replaced at the mount after an accessory is incorporated into the mount to conceal/hide the presence of the accessory within the mirror mount, or the accessory itself, when plugged or inserted into the rest of the mount, may complete the external styling of the mirror mount, such as shown at 484' in FIG. 31). For example, the mount may be provided with a removable "dummy" cap that may be removed by the vehicle manufacturer (or by the mirror manufacturer) to allow the desired electrical content to be added to the mount, if desired.

The mount thus may be provided as a standardized item (and by a separate manufacturer or manufacturing line from the manufacturer or manufacturing line of the complete mirror assembly itself), and may then be customized or accessorized for the particular vehicle or particular application of the mount and mirror assembly. The mirror manufacturer or vehicle manufacturer may then add in the desired or standard accessory or accessories or circuitry (such as, for example, compass circuitry or the like) to the standard mount. The mount thus may be sold or supplied or provided as a separate unit, and not part of the mirror assembly, and may be populated (such as by adding/inserting/attaching the desired accessory or circuitry) by the mount provider or by another manufacturer or competitor (such as the vehicle manufacturer or mirror manufacturer or the like). Although shown and described as providing a cavity for inserting an accessory at an upper portion of the accessorized mirror mount, it is envisioned that one or more cavities or caps or connectors may be provided at the side or sides of the mount or at the bottom or lower portion of the mount to allow for other accessories or the like at the mirror mount (such as accessories or components utilizing aspects of the types described in U.S. Pat. Nos. 6,902,284; 6,824,281 and 6,690,268, which are hereby incorporated herein by reference).

Thus, the installation of the mirror assembly and assembly of the wire cover to the base portion may be readily accomplished by an operator at the vehicle assembly plant, in order to provide the desired or appropriate electrical feature at the mirror assembly or remote from the mirror assembly. For example, the base portion (with mounting arm and mirror assembly attached thereto) may be slid onto and secured to the mounting button at the windshield, and the appropriate chip or circuit board and associated connector may be readily inserted into and secured (such as via a snap fit connection) at the upper end of the base portion. The wire cover then may be snapped to the connector to complete the electrical and mechanical connections.

Optionally, and as shown in FIG. 31, the wire or cable 485 of the wire cover 484' may include an electrical connector or plug or socket 485a at its upper end for electrical connection to the vehicle wire harness at the headliner of the vehicle. Optionally, and as also shown in FIG. 31, the connector or plug 482' may have the circuit board or chip attached thereto and/or the wire cover 484' may have the circuit board or chip retained thereto or therein, whereby the wire cover may be readily attached to the upper end of the base portion to complete the installation of the circuit board or chip at the windshield. The wire cover thus may include the circuitry and wiring and may be readily attached or snapped or clipped onto the upper end of the base portion to provide the desired electrical content at the mounting base of the mirror assembly. The present invention thus provides an accessorized mirror mount that may include at least one electrical accessory integrated or included in or includable in or within its structure.

Figure 17:
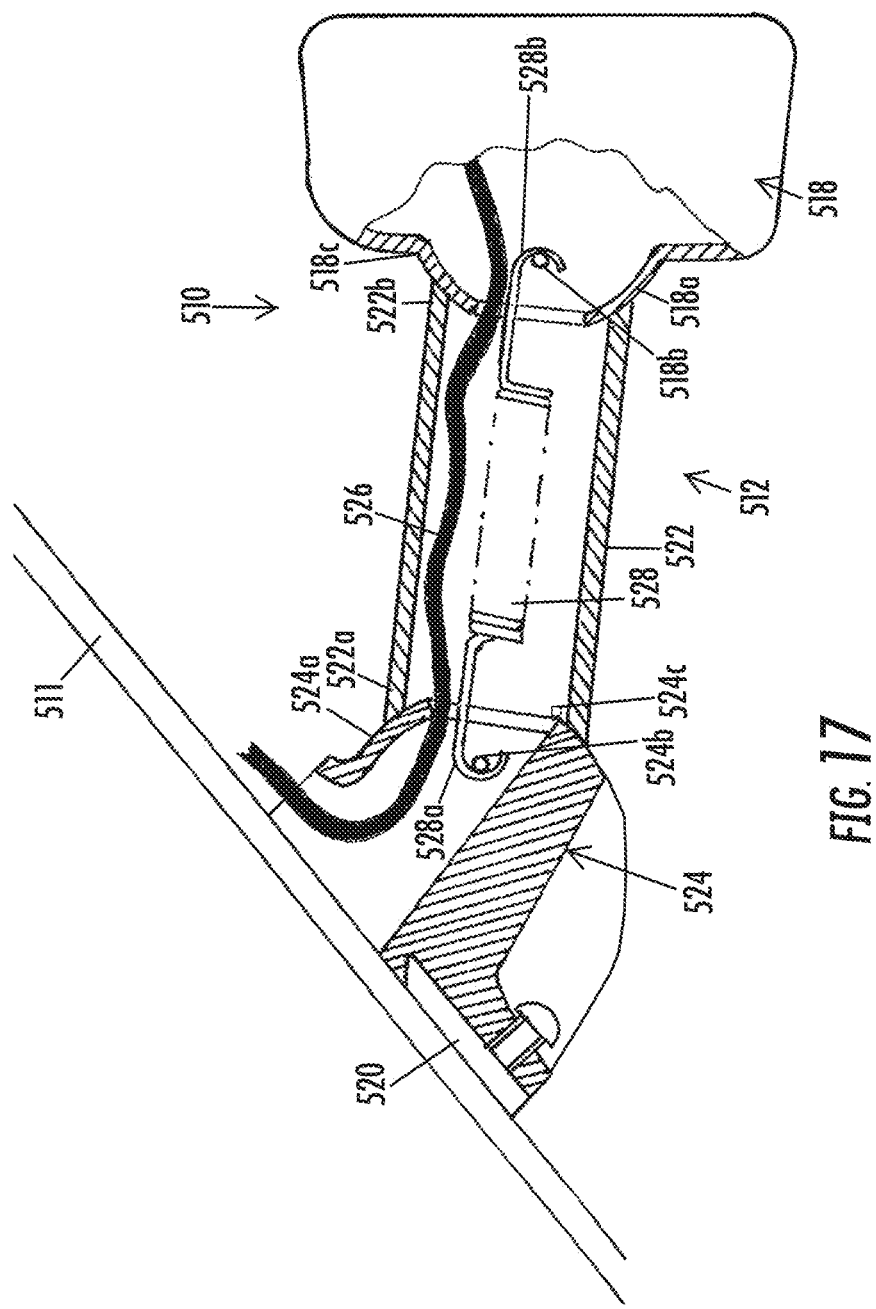
FIG. 17 is a partial sectional view of a mirror assembly incorporating another mounting arrangement in accordance with the present invention.

Optionally, and with reference to FIG. 17, an interior rearview mirror assembly 510 may include a support assembly 512 that supports or mounts a mirror housing or casing 518 and reflective element assembly (not shown in FIG. 17) at an interior portion of a vehicle, such as at a mounting button 520 at a windshield 511 of a vehicle. The support assembly 512 includes a support arm 522 that is pivotally engaged with a mounting base 524 (which is attachable to the mounting button 520 at the windshield) at one end 522a and with the mirror casing 518 at the other end 522b. As shown in FIG. 17, the support arm 522 comprises a generally hollow tube with open ends 522a, 522b, which partially receive a curved or rounded or partially spherical portion 524a, 518a of the respective mounting base 524 or mirror casing 518. The ends 522a, 522b may have curved engaging surfaces for substantially uniformly engaging the curved or rounded or partially spherical portions 524a, 518a of the mounting base 524 and mirror casing 518 to facilitate substantially smooth pivotal movement of the mirror casing 518 relative to end 522b and of the end 522a relative to the mounting base 524. An electrical wire or wiring harness 526 may extend from the mirror head (such as from a circuit board or circuitry at the mirror head and within the mirror casing), through the support arm 522 and further through the mounting base 524 and out of the mounting base for electrical connection to a vehicle power source or wiring harness, such as at the headliner or an overhead console of the vehicle.

As can be seen in FIG. 17, the support assembly 512 includes a biasing member or spring 528 that extends along support arm 522 and protrudes from the ends 522a, 522b of support arm 522 and connects to respective mounts or attachment members 524b, 518b at the mounting base 524 and casing 518. The biasing member 528 thus biases the casing 518 toward the mounting base 524, and thus biases both the casing 518 and mounting base toward and into engagement with the respective ends 522b, 522a of the support arm 522. The biasing member 528 may include hooks or engaging portions 528a, 528b at opposite ends for connecting to or engaging with the members 524b, 518b. The members 524b, 518b may comprise metal or plastic pins or elements that extend from one or more walls of the mounting base 524 and casing 518, and may be insert molded therein or integrally molded as part of the mounting base and/or casing, or may be positioned within the mounting base and/or casing after the base/casing is formed, without affecting the scope of the present invention.

The biasing member may provide a desired biasing force or pulling force to provide the desired frictional engagement of the support arm ends with the respective mounting base or mirror casing. Optionally, the surface finish of the ends 522a, 522b and/or of the curved/rounded portions 524a, 518a may be selected to provide the desired frictional resistance to movement of the support arm 522 relative to the mounting base 524 and/or mirror casing 518. The surface finish may be different at one joint as compared to the other joint to provide the desired resistance at each joint (for example, the frictional resistance may be reduced at the mirror casing joint as compared to the frictional resistance at the mounting base joint). Optionally, the diameter or radius of curvature of one or both of the rounded portions 524a, 518a may be selected or adjusted (and the curved engaging surface at one or both ends 522a, 522b of the support arm may be correspondingly selected or adjusted) to provide the desired surface engagement and clamping force at the respective joints (and thus providing a selected or desired effective diameter of the rounded portion of the respective joint or joints of the support assembly).

The support arm 522 may comprise a metallic material or a polymeric or plastic material, without affecting the scope of the present invention. Also, the mounting base 524 may comprise a metallic material or a polymeric or plastic material, while the casing may comprise a metallic material or a polymeric material, without affecting the scope of the present invention. Although shown as being part of the casing in FIG. 17, the rounded portion 518a may be part of an attachment plate that attaches to the reflective element or to a toggle member or assembly (for prismatic reflective element applications) or may be otherwise incorporated into and protruding from the mirror casing, without affecting the scope of the present invention. Optionally, one or both of the rounded portions 524a, 518a may include a stop or tab portion (such as shown at 518c in FIG. 17 or such as other protrusions or tabs that may extend from a portion of the rounded portions, such as at the tab 524c shown in phantom in FIG. 17) for engaging the sidewalls of the support arm to limit pivotal movement of the support arm relative to the respective rounded portion or ball portion of the support assembly.

The support assembly of the present invention thus provides a robust and stable support arm and pivot joints for the support arm, and thus provides an enhanced support assembly for pivotally supporting the mirror head or casing relative to the mounting base of the mirror assembly. The support arm may comprise a large diameter support member and may be substantially hollow to provide enhanced access to the wiring extending through the support arm. The support arm may be substantially hollow and tubular or may provide a narrower passageway therethrough (for receiving the biasing member and wiring therethrough), and may provide an insert member or conduit (such as described above with respect to FIGS. 14 and 15) therethrough for receiving the biasing member and wiring, without affecting the scope of the present invention.

Figure 18:
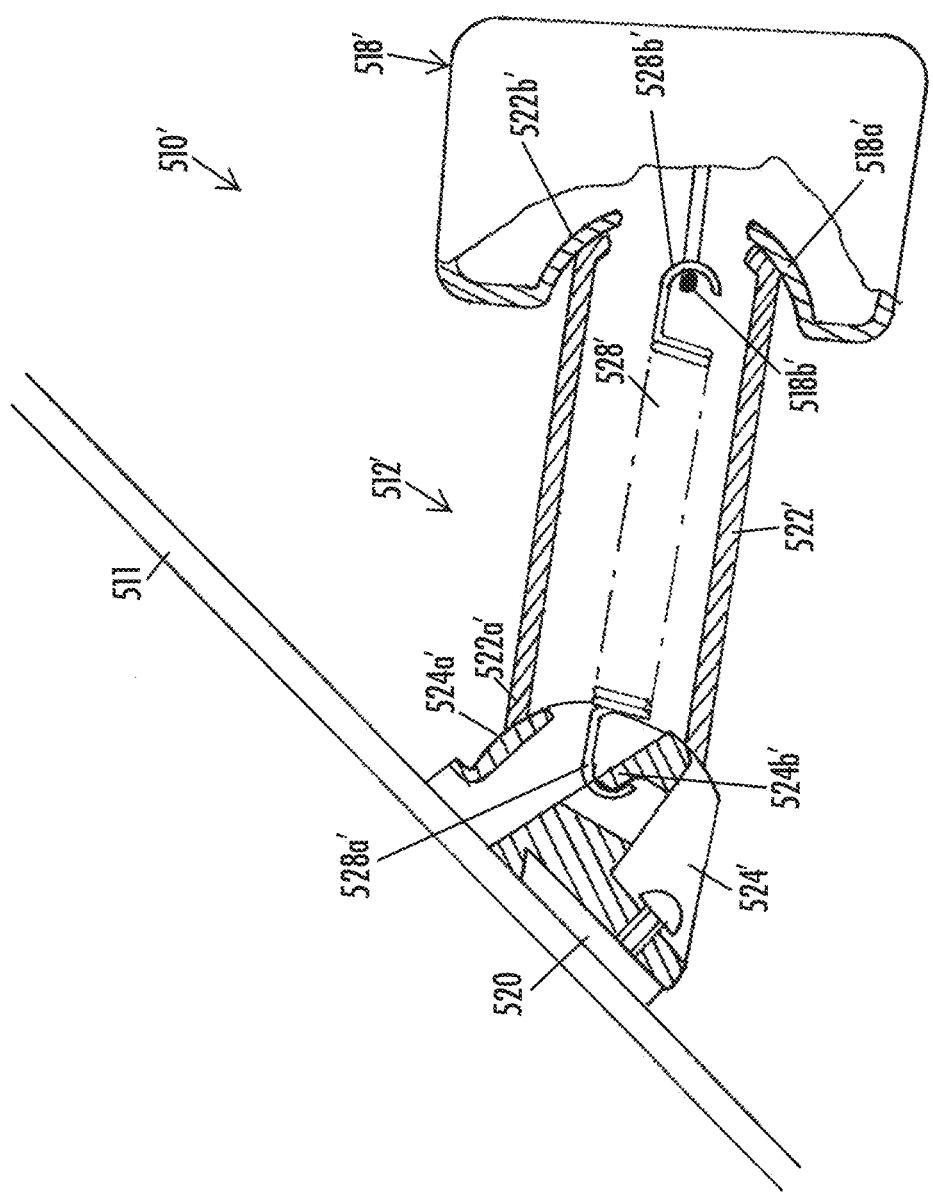
FIG. 18 is a partial sectional view of a mirror assembly incorporating another mounting arrangement in accordance with the present invention.

Although shown as having partial spherical or rounded or curved portions at the mounting base and at the casing (or attachment plate or the like), the support arm may include one or more rounded or partially spherical ends that are formed to be partially received within one or more correspondingly curved or formed partial sockets at the mounting base and/or mirror casing (or attachment plate or the like). For example, and with reference to FIG. 18, an interior rearview mirror assembly 510' may include a support assembly 512' that supports or mounts a mirror housing or casing 518' and reflective element assembly (not shown in FIG. 18) at an interior portion of a vehicle, such as at a mounting button 520 at a windshield 511 of a vehicle. The support assembly 512' includes a support arm 522' that is pivotally engaged with a mounting base 524' (which is attachable to the mounting button 520 at the windshield) at one end 522a' and with the mirror casing 518' at the other end 522b'. Similar to support arm 522, support arm 522' comprises a generally hollow tube with a generally open end 522a' that partially receives the curved or rounded or partially spherical portion 524a' of the mounting base 524' to pivotally attach the support arm to the mounting base. The opposite end 522b' of support arm 522' comprises a partially curved or rounded or partially spherical end, which is partially received within a curved or partial socket 518a' at the mirror casing 518'.

The support assembly 512' includes a biasing member or spring 528' that extends along support arm 522' and protrudes from the ends 522a', 522b' of support arm 522' and connects to respective mounts or attachment members 524b', 518b' at the mounting base 524' and mirror casing 518'. The attachment member 524b' may be formed as a lip or hook in the mounting base 524' such that the hook end 528a' of biasing member 528' may readily hook over the attachment member 524b' to attach the biasing member to the mounting base 524'. Likewise, the attachment member 518b' may be formed or positioned at the mirror casing 518' such that the hook end 528b' of the biasing member 528' may readily hook over or partially around the attachment member 518b' to attach the biasing member to the mirror casing (or to an attachment plate or the like at or in the mirror casing). The support assembly 512' may otherwise be substantially similar to the support assembly 512, discussed above, such that a detailed discussion of the support assemblies will not be repeated herein. Although not shown in FIG. 18, the mirror assembly 510' may include a wiring harness or the like that may be routed from the mirror head (such as from a circuit board or circuitry at the mirror head or casing), through the support arm and further through the mounting base and up toward and into electrical connection with a vehicle wiring harness, such as at the headliner of the vehicle or at an overhead console of the vehicle or the like. Other variations to the support arm and mounting base and casing (such as providing different radii of curvature and different partial spherical portions and partial sockets at either the support arm or the mounting base or mirror casing) may be implemented without affecting the scope of the present invention.

Figure 19:
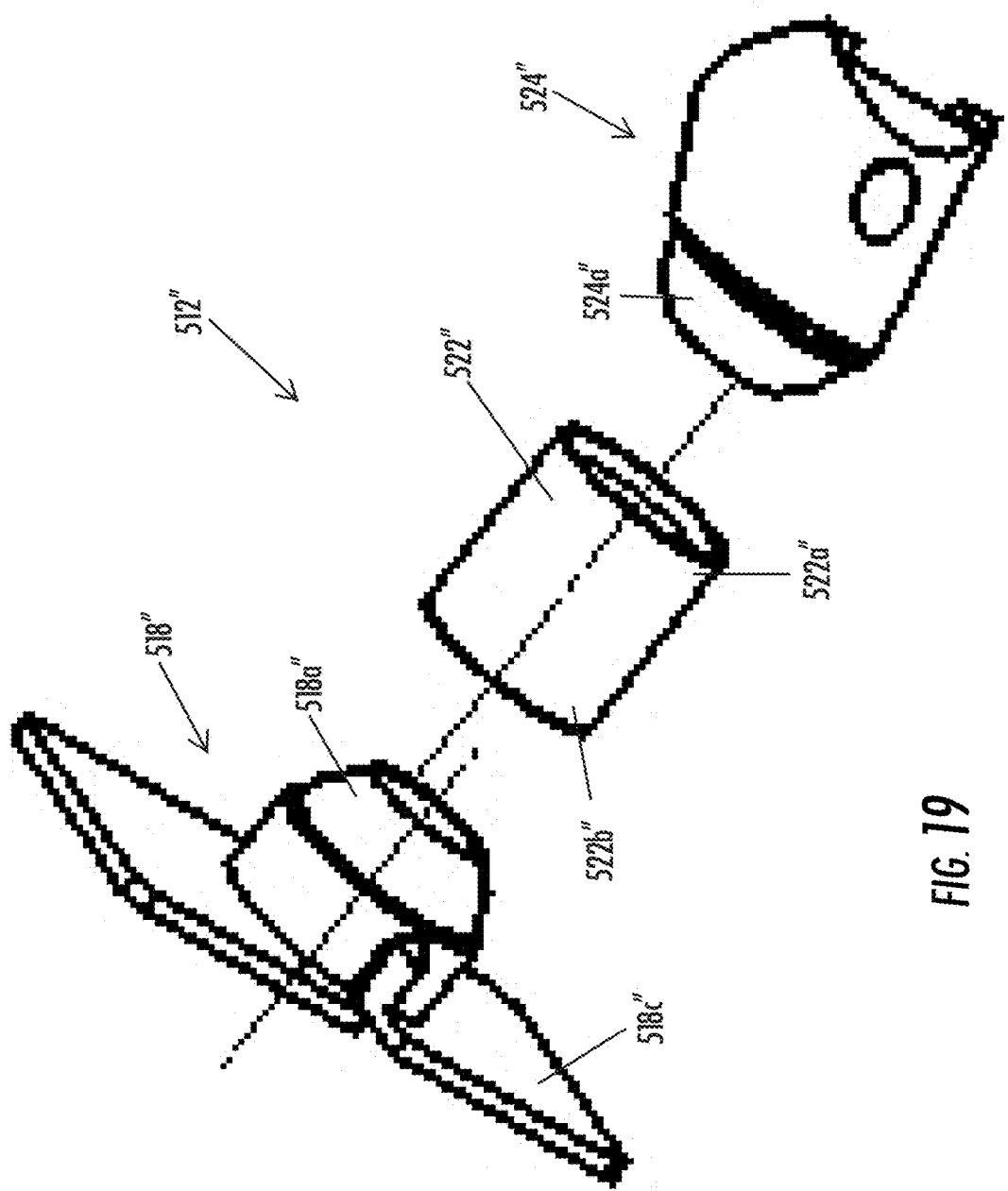
FIG. 19 is an exploded perspective view of another mounting arrangement in accordance with the present invention.
Figure 20:
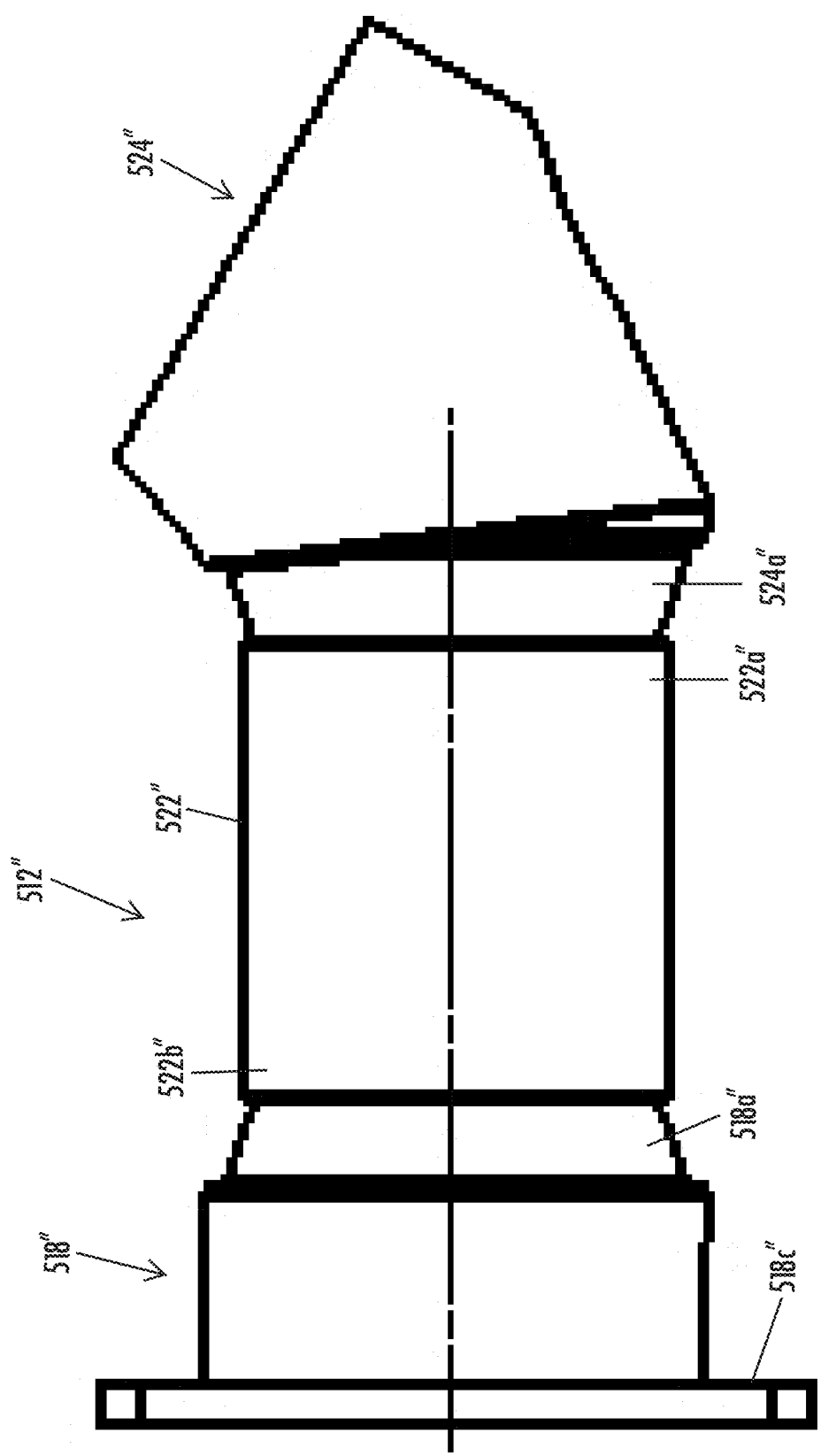
FIG. 20 is a side elevation of the mounting arrangement of FIG. 19.

Optionally, and with reference to FIGS. 19-21, a support assembly 512", which supports or mounts a mirror housing or casing and reflective element assembly (not shown in FIGS. 19-21) at an interior portion of a vehicle, includes a support arm 522" that is pivotally engaged with a mounting base 524" at one end 522a" and with an attachment plate 518" at the other end 522b". Similar to support arm 522, discussed above, support arm 522" comprises a generally hollow tube with a generally open end 522a" that partially receives the curved or rounded or partially spherical portion 524a" of the mounting base 524" to pivotally attach the support arm to the mounting base, and the opposite generally open end 522b" of support arm 522" is configured to partially receive a partially curved or rounded or partially spherical portion 518a" at the attachment plate 518". The support assembly 512" includes a biasing member or spring (not shown in FIGS. 19-21) that extends along support arm 522" and protrudes from the ends 522a", 522b" of support arm 522" and connects to respective mounts or attachment members 524b", 518b" (FIG. 21) at the mounting base 524" and attachment plate 518". The attachment plate 518" includes a generally planar or plate portion 518c" that is attachable to the mirror reflective element (such as via an adhesive or tape or the like) or to another portion of the mirror casing or mirror head, while the mounting base is attachable to an interior portion of the vehicle, such as to a mounting button or the like at the interior surface of the vehicle windshield or the like. The support assembly 512" may otherwise be substantially similar to the support assemblies 512 and/or 512', discussed above, such that a detailed discussion of the support assemblies will not be repeated herein.

Figure 21A:
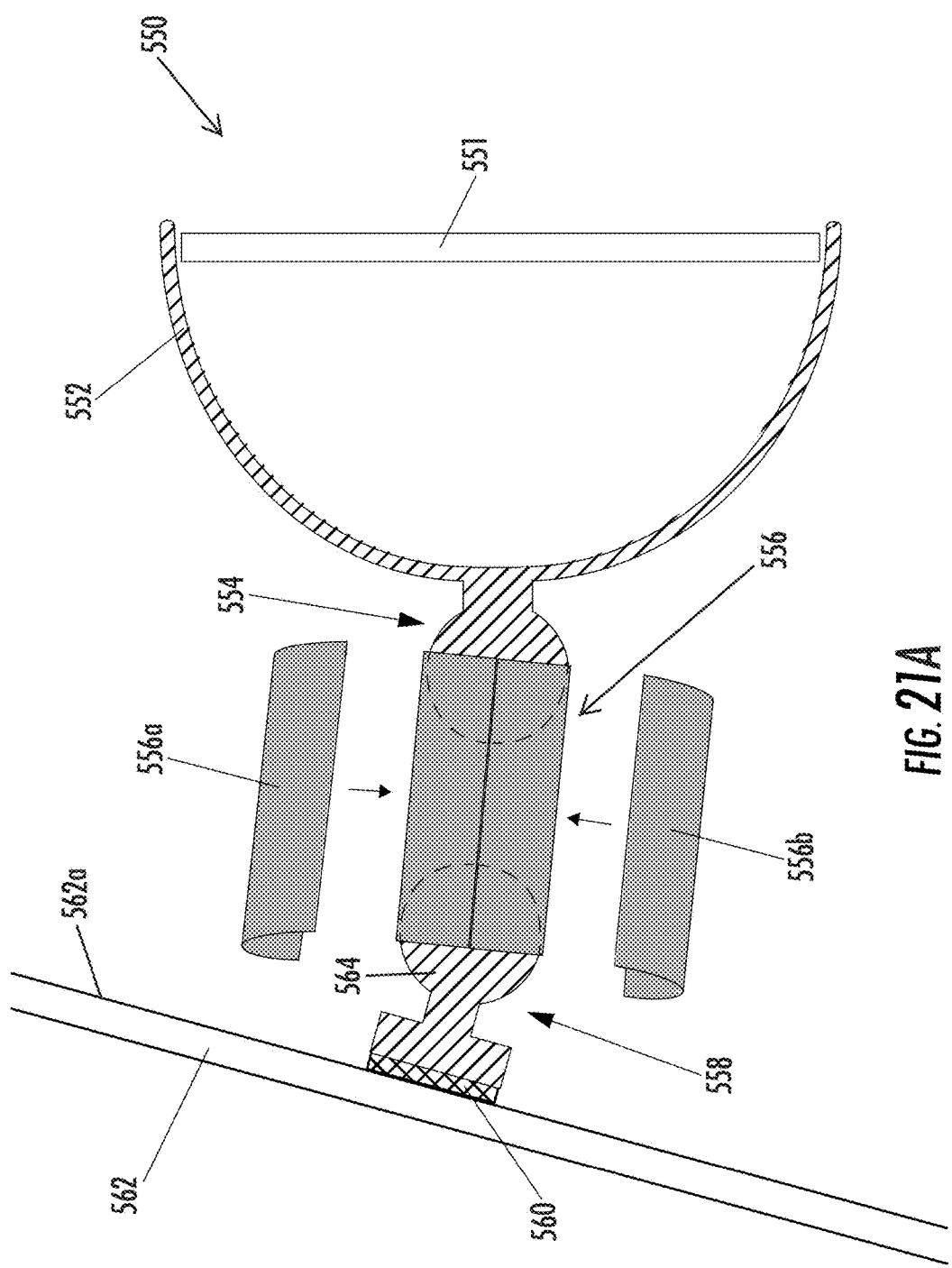
FIG. 21A is a side elevation of another mounting arrangement in accordance with the present invention.

Optionally, and with reference to FIG. 21A, a mirror assembly 550 includes a reflective element 551 and a mirror housing 552 with a mounting portion or ball member 554 formed or positioned thereon. The mirror assembly 550 is mounted at an interior portion of a vehicle, such as via a mounting or support arm 556 mounted at or attached to a mounting portion or base or mirror mount 558 attached to a mounting button 560 or the like at an interior surface 562a of a vehicle windshield 562. The mirror mount 558 includes a second ball member 564 formed thereon and extending at least partially therefrom. The support arm or element 556 may comprise a split element or tube with a pair of elements 556a, 556b that are positioned apart or separated to allow positioning of the ball members 554, 564 therein and/or therebetween and that may be assembled together and clamped or secured or retained together to pivotally receive and retain the ball members 554, 564 therein. The elements 556a, 556b may each include a partial spherical pocket or receiving cavity or portion formed on an interior surface thereof for engaging and receiving the ball member.

The elements 556a, 556b may be retained together via any retention or clamping means, without affecting the scope of the present invention. For example, the opposed edges of the elements 556a, 556b may be welded (such as sonic welding or the like) or adhered or bonded or heat staked together, or the elements 556a, 556b may be clamped together or bound together or fastened together (or otherwise mechanically attached together), such as via screws or bands or the like, or the elements 556a, 556b may snap together or provide other attachment means to readily secure/retain the elements together when pressed together about the ball members. The elements may be formed so that one socket portion is larger than the other to accommodate different sized ball members within the support arm when the support arm is assembled around the ball members. The support element may include external spring elements or the like to enhance the torque at the ball joints. Although shown as pivotally receiving a pair of ball members, it is envisioned that the split support arm may attach to a base portion of respective ball portions so that the ball portions are attached to and extend from opposite ends of the split support arm when the split support arm is assembled together. The ball portions may then be pivotally received in respective sockets of the mirror casing and mirror mount.

The split tube support arm 556 may be generally hollow so that wires and the like may be routed along the tube between the mirror head and the mirror mount. Preferably, the ball members 554, 564 may have passageways or conduits formed therein and therethrough to allow the wires to pass from the mirror head (such as from a circuit board within the mirror housing) through the ball member 554, through and along the support arm 556 and through the ball member 564, where the wire or harness may be routed upward along the windshield to the headliner or roof of the vehicle, such as described above.

Optionally, the mounting arrangements and mirror assemblies of the present invention may be utilized with a video slide-out mirror or other video displays or screens, such as the types described in PCT Application No. PCT/US03/40611, filed Dec. 19, 2003, and/or U.S. patent applications, Ser. No. 10/538,724, filed Jun. 13, 2005; and/or U.S. Ser. No. 10/054,633, filed Jan. 22, 2002, now U.S. Pat. No. 7,195,381, and/or U.S. provisional applications, Ser. No. 60/630,061, filed Nov. 22, 2004; and Ser. No. 60/667,048, filed Mar. 31, 2005, which are hereby incorporated herein by reference.

As disclosed in U.S. Ser. No. 10/054,633, filed Jan. 22, 2002, now U.S. Pat. No. 7,195,381, incorporated above, when a tow hitch initiation event is contemplated, the driver reverses the vehicle so that a ball member of the equipped vehicle is close to a corresponding trailer tongue of a trailer. The field of view of the video imaging sensor (that may comprise a CMOS or CCD imaging array) is directed to view (or adjustable to view) the approach of the trailer tongue to the ball hitch element. Note that this allows a driver safely hitch a trailer without the need for a second person to act as a "spotter", and with the driver being able to guide successful hitching by viewing the image as presented within the interior cabin while reversing/maneuvering the vehicle. As also disclosed in U.S. Ser. No. 10/054,633, filed Jan. 22, 2002, now U.S. Pat. No. 7,195,381, incorporated above, and with a TFT LCD video display disposed behind the rear substrate of a third-surface transflective electrochromic mirror reflective element in a "display-on-demand" configuration, the presence of (and image displayed by) the video display screen is only principally visible to the driver (who views through the transflective mirror reflective element) when the video display element is powered so as to project light from the rear of the mirror reflective element). Preferably, a single high-intensity power LED such as a white light emitting LED comprising a Luxeon™ Star Power LXHL-MW1A white light emitting LED having (at a 25 degree Celsius junction temperature) a minimum forward voltage of 2.55 volts, a typical forward voltage of 3.42 volts, a maximum forward voltage of 3.99 volts, a dynamic resistance of 1 ohm and a forward current of 350 milliamps, and available from Lumileds Lighting LLC of San Jose, Calif. is used as a backlight for the TFT LCD video screen. Alternately, a plurality of such single high-intensity power LEDs (such as an array of two or of four such power LEDs) is placed behind the TFT LCD video screen so that the intense white light projected from the individual single high-intensity power LEDs passes through the TFT LCD element and through the transflective electrochromic element, preferably producing a display intensity as viewed by the driver of at least about 200 candelas/sq. meter; more preferably at least about 300 candelas/sq. meter; and most preferably at least about 400 candelas/sq. meter. Alternately, cold cathode vacuum fluorescent sources/tubes can be used for backlighting and optionally can be used in conjunction with LED backlighting.

Further, when such a vehicle equipped with such a video mirror is also equipped with a side viewing or front viewing or rear viewing sensor vision system (such as by utilizing a radar sensor or an ultrasonic sensor or a camera sensor to monitor an area at or near or adjacent to the vehicle, such as described in U.S. provisional applications, Ser. No. 60/628,709, filed Nov. 17, 2004; Ser. No. 60/614,644, filed Sep. 30, 2004; Ser. No. 60/618,686, filed Oct. 14, 2004; and/or Ser. No. 60/638,687, filed Dec. 23, 2004, which are hereby incorporated herein by reference), the video screen may automatically extend when such a sensor system detects the presence of an obstacle and/or a human adjacent to the vehicle. Also, the video display screen may extend in conjunction with a trailer-hitch monitoring system (such as the types described in U.S. patent application Ser. No. 10/418,486, filed Apr. 18, 2003, now U.S. Pat. No. 7,005,974, which is hereby incorporated herein by reference) and icons and/or indicia and/or instructions may be created on the video image displayed on the extended video screen of the video mirror to assist or guide the driver to hitch a trailer to the trailer hitch of the vehicle.

As disclosed in U.S. patent application Ser. No. 10/418,486, filed Apr. 18, 2003, now U.S. Pat. No. 7,005,974, incorporated above, a vehicle imaging system includes an imaging sensor, an image processing system or image processor and a display. The image processor may receive a signal or image from the imaging sensor and may process the signal to detect at least one relevant object, such as the vehicle bumper and/or any object or objects near or approaching the vehicle or the vehicle bumper. The image processor may provide for edge detection of an object or objects via an edge detection algorithm or the like.

The vehicle imaging system comprises an imaging sensor having a field of view, an image processor and a display. The imaging sensor is operable to generate a signal indicative of an image representative of a scene occurring within the field of view. The image processor processes the signal to detect at least one relevant object within the image. The image processor generates an output signal representative of the at least one detected relevant object.

The display may comprise a dot matrix display.

In applications where a video display screen is extendable/retractable (such as a video slide out device or the like) and/or where a video display screen is activatable/deactivatable (such as a display at or behind the reflective element or toward the side, such as the passenger side, of the vehicle from the reflective element) in response to engagement of a reverse gear of the vehicle to assist the driver of the vehicle in maneuvering the vehicle in the rearward direction, the display screen may extend (and/or the display may be activated) when the vehicle is shifted into reverse and then may retract (and/or deactivate) when the vehicle is shifted into park or drive or other forward gear. In a trailer hitching situation, or in other reversing situations, where a vehicle is backed up toward a trailer tongue for connecting the trailer to the vehicle (or otherwise backed up toward other objects), the vehicle may be driven backward and forward multiple times to align the vehicle hitch with the trailer tongue (or to align or avoid other objects rearward of the vehicle). Such repeated shifting of the vehicle between reverse and drive may result in the display being extended/retracted multiple times and/or activated/deactivated multiple times, which may also result in the driver losing his or her frame of reference in the image displayed as he or she repeatedly engages and disengages the reverse gear of the vehicle. Thus, the circuitry or logic or control of the display of the present invention may extend and/or activate the display when the reverse gear of the vehicle is engaged, and may maintain the display in the extended/activated state, even if the vehicle is shifted into the "drive" gear or any forward gear, until a threshold criteria is met, such as when the forward speed of the vehicle exceeds a threshold speed, such as about 3 miles per hour (mph) or about 5 mph or about 7 mph or about 10 mph (or any desired threshold vehicle forward speed), or when the vehicle travels in the forward direction a threshold distance (such as about 10 feet or about 20 feet or about 30 feet or thereabouts), or when a time period has elapsed from the time of disengaging the reverse gear or engaging the forward gear (such as about 5 seconds or about 10 seconds or any other threshold time period after disengaging the reverse gear). The display thus stays extended/activated during short term forward movements, such as may typically occur during a hitching or other backup or reverse maneuvering event, in order to provide a continuous display to the driver of the vehicle during the entire hitching or reverse maneuvering operation. The camera or imaging device and system may also remain activated so that the rearward image is displayed and viewable at the display during the reverse maneuverings and short term forward movements.

Figure 32:
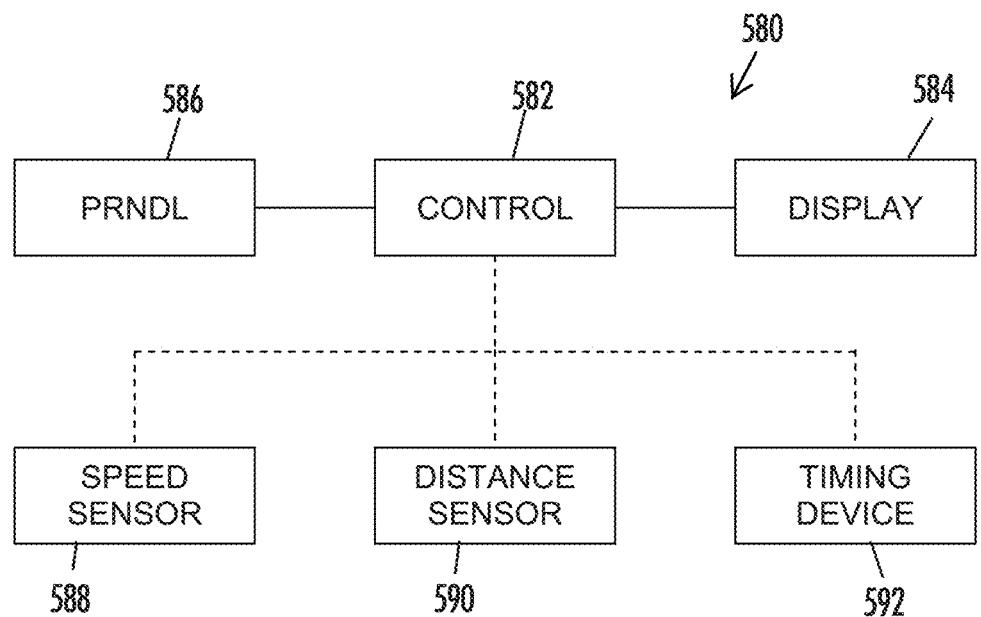
FIG. 32 is a block diagram of a display control system in accordance with the present invention.

For example, and with reference to FIG. 32, a display control system 580 includes a control or microprocessor 582 that is operable to control a display 584, and that may activate/deactivate the display and/or may extend/retract the display in response to an activating event or trigger. In the illustrated embodiment, control 582 extends and retracts display 584 in response to a signal indicative of the transmission gear of the vehicle that is engaged (such as a signal from a shifter or PRNDL 586 of the vehicle or the like). The control thus may extend the display screen when the reverse gear is engaged, and may retract the display screen in response to one or more deactivating or retracting events/signals. For example, control 582 may retract display 584 when the control receives a signal that is indicative of a speed sensor 588 (such as a wheel speed sensor or encoder or other speed sensing means) detecting or sensing that the vehicle is traveling forward at or greater than a threshold speed, or may retract the display when control 582 receives a signal that is indicative of a distance sensor 590 detecting or sensing that the vehicle has traveled forward a threshold distance after the reverse gear was disengaged, or may retract the display when control 582 receives a signal that is indicative of a timing device 592 signaling that a threshold amount of time has elapsed since the reverse gear was disengaged. Other inputs or signals or deactivating events or triggers that are indicative of the vehicle no longer being in a hitching or other reverse maneuvering situation may be utilized so that the control will retract the display after the reverse maneuvering situation is completed and not during the reverse maneuvering situation. The control thus will not immediately retract the display when the forward gear is engaged but will leave the display extended/activated during short term forward movements of the vehicle.

Optionally, and with reference to FIG. 33, a sun visor 594 of a vehicle, such as a driver side sun visor of the vehicle or a passenger side sun visor of the vehicle, may include a video display screen 596 on its inward side (the side that faces the headliner 597 when the visor is not flipped down). The video display screen 596 is associated with a rearward vision system or back up aid (such as described above) and the sun visor 594 includes a motor or drive mechanism 594*a* that is operable to automatically and electrically or electromechanically pivot the sun visor 594 to the lowered position (as shown in FIG. 33) in response to the reverse gear of the vehicle being engaged, so that the video display screen 596 is automatically positioned at a viewable location to display images of the scene rearward of the vehicle to the driver of the vehicle when the vehicle is shifted into reverse. The motor or drive mechanism may be operable to raise the sun visor after the reversing maneuver is completed. As shown in FIG. 33, sun visor 594 may also include user inputs or buttons 596*a* for controlling aspects of the video display screen and/or the imaging system and/or other aspects or accessories, such as the volume of associated speakers 598 or the like, which may be positioned at the sun visor or elsewhere in the vehicle.

In the illustrated embodiment, the motorized/automated sun visor 594 with video screen 596 is located at the passenger side of the vehicle. However, a motorized/automated sun visor with video screen may be located on the driver side of the vehicle, without affecting the scope of the present invention. It is preferred that the motorized sun visor with video display screen be positioned at the passenger side of the vehicle to ease viewing of the screen by the driver of the vehicle when maneuvering the vehicle in reverse. The sun visor may be pivotable about a generally vertical pivot axis, and preferably about a generally vertical pivot axis 594*b* that is located at the inward end of the sun visor (the end of the sun visor that is toward the center of the vehicle), so that the sun visor and video screen may be angled or canted toward the driver of the vehicle for enhanced viewing. It is desirable to have the pivot axis of the sun visor at the inward end of the sun visor so that pivotal movement or canting of the sun visor toward the driver does not move the sun visor into contact with the windshield of the vehicle so that the windshield may not limit or interfere with such pivoting. The motor or drive mechanism thus may be operable to lower or descend the sun visor, such as via pivoting the sun visor about a generally horizontal pivot axis 594*c*, to lower or descend the sun visor so that the video screen is viewable by the driver of the vehicle, and the motor or drive mechanism (or a second motor or drive mechanism) may be operable to pivot the sun visor about a generally vertical axis 594*b* to angle or cant the sun visor and display screen at least partially toward the driver of the vehicle. If the display screen is located at the passenger side sun visor, the screen may be a larger size (than if it were located at the driver side sun visor) because it is further from the eyes of the driver of the vehicle. The sun visor and motor or drive mechanism may have a manual override feature that allows for substantially unrestricted manual pivoting or moving of the sun visor so that the sun visor may be readily pivoted and used by the driver or passenger of the vehicle during forward driving operations as well.

The motorized flip-down or descending of the sun visor and video screen may be accomplished via a rotary motor or other actuating/pivoting/moving device or motor. Such a rotary motor may have relatively few moving parts and thus may be readily and reliably implementable at the sun visor. When the reverse gear is engaged, the visor thus may automatically flip or descend or lower or pivot downward (and may also pivot toward the driver of the vehicle as discussed above) so that the driver may view in the flipped-down/descended video screen the reversing image fed from a rear-mounted reversing or trailer-hitch camera or other rear vision system or back up aid or the like. The sun visor preferably remains flipped-down/descended until the likes of a time has elapsed (such as about 5 seconds or about 10 seconds or thereabouts) since the reverse gear was first engaged and/or until the vehicle has driven forward a certain distance (such as about 10 feet or about 20 feet or about 30 feet or thereabouts) and/or until the vehicle's forward speed exceeds a threshold forward speed (such as about 3 miles per hour (mph) or about 5 mph or about 7 mph or about 10 mph or thereabouts), in order to limit or reduce or avoid nuisance flipping or descending of the powered sun visor.

Figure 41:
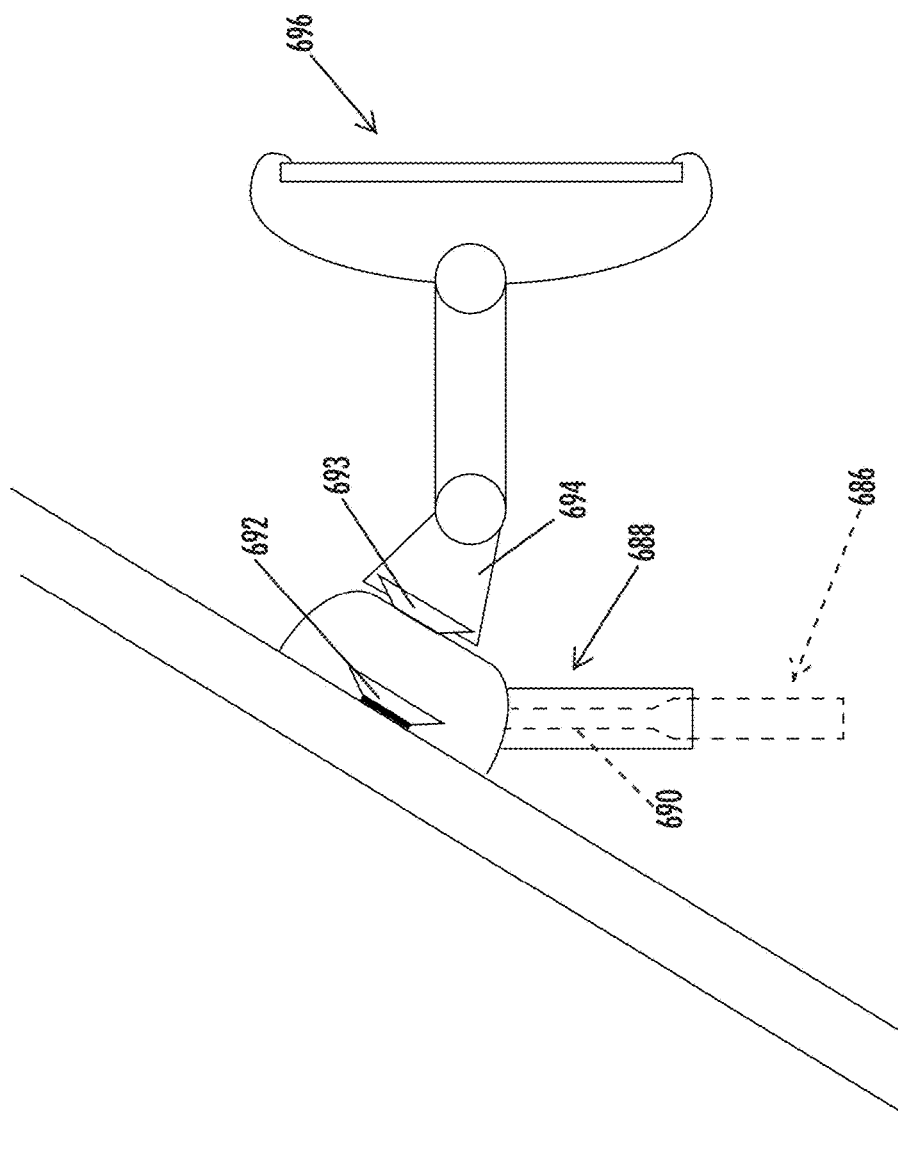
FIG. 41 is a side elevation of an interior rearview mirror assembly and video display module in accordance with the present invention.

Optionally, and with reference to FIG. 41, a video display screen 686 may be extendable or descendible from a screen module or device or assembly or housing or unit 688 via an extendable/retractable device or element 690. The module 688 may be mountable to a mirror mounting button 692 at the windshield of the vehicle and may include a second mounting button 693 for mounting a mounting portion 694 of an interior rearview mirror assembly 696 thereto (such as by utilizing aspects of the modules described in U.S. Pat. Nos. 6,690,268; 6,824,281 and 5,708,410, which are hereby incorporated herein by reference). The display screen 686 may be raisably retractable so as to be in a raised location when not in use (where the screen may be received partially within the module or housing or where the screen may be located at a location where it is not readily viewable by the driver of the vehicle because it is located generally behind the mirror assembly 696), and may be lowered or descended to a lowered or in use location (as shown in phantom in FIG. 41) where the screen is readily viewable by a driver of the vehicle. When so lowered, the video screen need not extend entirely below or need not clear the lower portion of the mirror assembly to be readily substantially viewable by the driver of the vehicle. The screen may also be pivoted (such as about a generally vertical pivot axis) so as to be angled or canted toward the driver of the vehicle to enhance viewing of the video screen by the driver of the vehicle. Preferably, the video screen is automatically descendible in response to the vehicle being shifted into reverse and may remain descended until a threshold forward speed or forward traveled distance is reached by the vehicle or a threshold time has elapsed after shifting the vehicle out of reverse, such as described above.

The display module 688 and video display screen 686 thus may be mounted at an interior portion of the vehicle, such as at an interior surface of the windshield of the vehicle, and may provide a button-on-button mounting arrangement for the interior rearview mirror assembly 696. Because a mirror mounting button is typically located at the windshield at a location that is generally above or at least partially elevated as compared to the height or location of the mirror casing and mirror reflective element when the mirror reflective element is positioned to provide a desired rearward field of view to the driver of the vehicle, the location at the windshield generally at or below the mounting button is not typically readily viewable by the driver of the vehicle. Thus, the module may be positioned at the mounting button and the video display screen may not be readily viewable until it is lowered or descended, such as in response to the reverse gear of the vehicle being engaged.

Although shown and described as extending/descending from a module or housing or unit, the extending device of the video display screen of the present invention may mount to the mounting device and the video display screen (such as a screen and frame or casing) may be raised and lowered via the extending device so as to be moved between the raised and lowered positions, without affecting the scope of the present invention. Also, although shown and described as mounting to the mounting button at the windshield and providing a second mounting button for the mirror assembly, the video display screen of the present invention may be attached to or mounted to the mirror mounting portion (such as mounting portion 694 in FIG. 41, and such as by utilizing aspects of the mirror assemblies described in U.S. Pat. No. 5,708,410, which is hereby incorporated herein by reference), and may extend/descend from the mounting portion, which may attach to the mounting button at the windshield, without affecting the scope of the present invention.

The video display screen thus may be readily lowered to a viewable location via extending/retracting device or element 690. Extending/retracting element 690 may comprise any suitable mechanical or electrical or electro-mechanical means. For example, the extending/retracting element may comprise a telescoping mechanism that telescopes or elongates to lower the display screen for viewing and that retracts to raise the display screen to its storage or non-use position, or the extending/retracting element may comprise an accordion-type mechanism or scissor linkage type mechanism or jack type mechanism or slide mechanism or pivot mechanism (that may pivot the screen about a generally horizontal pivot axis to lower the screen to the viewable location) or rack and pinion mechanism or a cylinder or track slide mechanism or any other suitable moving/adjusting mechanism. The extending/retracting element or device thus may be a relatively simple device that moves the screen between the storage or non-use position and the descended or viewable or in-use position (and may pivot or angle or cant the video display screen toward the driver of the vehicle). Optionally, the video display screen may be fixedly attached to the module or to the mounting portion of the mirror assembly so as to be readily viewable by the driver of the vehicle, and may be utilized for various applications, such as a backup aid (whereby the video screen may be automatically activated when the vehicle is shifted into reverse) or a navigation screen or cabin monitor or the like.

The video display screen may be readily attached to the windshield mounting button and may be provided as an aftermarket device (where the mirror assembly may be removed from the windshield mounting button, the video screen/module may be attached to the windshield mounting button, and the mirror assembly may be mounted to or attached to the button on the module). The video display screen may comprise any suitable display screen, such as an LCD screen or the like, such as a screen having a width or diagonal dimension of approximately 2.5 inches to about 3.5 inches or thereabouts. Although shown as a downwardly movable display screen, the video display screen may be movably adjusted or extended/retracted in a sideward direction, so as to extend toward one side or the other for viewing by the driver of the vehicle. In applications where the display screen is extended toward the passenger side (and thus away from the driver of the vehicle), the display screen may be selected to be a larger size as compared to applications where the display screen is extended toward the driver side of the vehicle. Also, it may be desirable to angle or cant the display toward the driver of the vehicle for enhanced viewing of the display screen, particularly for applications where the display screen is extended away from the driver of the vehicle.

The display screen may be purchased as a relative small, self-contained box or module that includes the display screen, frame or housing and electronic circuitry for the display screen. The display screen frame may then be attached to a suitable extending/retracting device or element that functions to selectively lower and/or pivot the display screen for viewing by the driver of the vehicle. The extending/retracting device may be mounted or attached to the mirror mount or to a module or base of the display screen so as to move the video display screen relative to the mirror mounting button area at the windshield. The video display screen of the present invention thus may utilize the area along the windshield generally below the mirror mount or mounting button that is not readily viewable by the driver of the vehicle because that area is generally or partially blocked from the driver's forward field of view by the mirror assembly and reflective element and casing of the mirror assembly.

Optionally, and with reference to FIGS. 22-24, a mirror assembly 610 may include a support assembly 612 that supports or mounts a mirror housing 618 and reflective element assembly 614 at an interior portion of a vehicle, such as at a mounting button at a windshield of a vehicle. The support assembly may include a mounting or support arm 622 and mirror mount or base portion 624, such as described above. The reflective element may comprise an electro-optic reflective element assembly, such as an electrochromic reflective element assembly, or a prismatic reflective element. In the illustrated embodiment, the reflective element comprises an electro-optic reflective element assembly, such as an electrochromic reflective element assembly utilizing principles described in U.S. provisional applications, Ser. No. 60/553,842, filed Mar. 17, 2004; Ser. No. 60/563,342, filed Apr. 19, 2004; and Ser. No. 60/629,926, filed Nov. 22, 2004, and/or PCT Application No. PCT/US03/29776, filed Sep. 19, 2003; and/or PCT Application No. PCT/US03/35381, filed Nov. 5, 2003; and/or PCT Application No. PCT/US2004/015424, filed May 18, 2004, and/or U.S. patent applications, U.S. Ser. No. 10/528,269, filed Mar. 17, 2005, now U.S. Pat. No. 7,274,501; U.S. Ser. No. 10/533,762, filed May 4, 2005, now U.S. Pat. No. 7,184,190; U.S. Ser. No. 11/021,065, filed Dec. 23, 2004, now U.S. Pat. No. 7,255,451, which are all hereby incorporated herein by reference. The reflective element assembly 614 includes a front substrate 670, a rear substrate 671, and an electrochromic medium 672 disposed between the substrates and substantially contained by a seal 674. The reflective element assembly may include a perimeter band or coating and/or other indicia or markings, such as by utilizing aspects described in U.S. patent applications, Ser. No. 10/533,762, filed May 4, 2005, now U.S. Pat. No. 7,184,190; and/or U.S. Ser. No. 11/021,065, filed Dec. 23, 2004, now U.S. Pat. No. 7,255,451, and/or U.S. provisional applications, Ser. No. 60/681,250, filed May 16, 2005; Ser. No. 60/690,400, filed Jun. 14, 2005; Ser. No. 60/695,149, filed Jun. 29, 2005, which are hereby incorporated herein by reference.

As shown in FIGS. 23 and 24, the front substrate 670 includes a perimeter or perimetal border coating 676 (not shown in FIG. 22) on its second surface 670b (opposite to the first surface 670a that faces the driver of the vehicle when the mirror assembly is installed in the vehicle). The perimetal coating 672 includes an enlarged area or region 674, such as along a lower region of the reflective element. The seal 674 (which seals the electrochromic medium 672 between the front substrate 670 and rear substrate 671) is disposed between the perimeter regions of the substrates and generally along the perimetal coating 676, and is generally concealed or hidden by the coating 676 so that the seal is not readily viewable through the front substrate by an occupant of the vehicle. The seal 674 thus may follow the shape of the coating, and may follow or be disposed along the bump or enlarged area or region 678, such that the seal and reflective element may define or provide a region outside of the seal but within the perimeter of the front substrate for positioning one or more accessories or the like. The accessories, such as sensors 680a, 680b, may be disposed or positioned at the coating 676 and outside of the seal 674, such that the reflective element assembly may include such accessories or sensors or inputs within the perimeter regions of the front substrate, thereby providing a generally flush or frameless reflective element and mirror assembly.

The perimetal coating 676 provides an outer area or region at the back surface of the front substrate and includes the bump or enlarged area or region 678 outward from the seal (and thus not behind an electro-optically dimmable portion of the mirror reflector) for positioning sensors, such as glare sensors, photo sensors, touch sensors or proximity sensors or the like. The perimetal or border coating or layer may comprise a reflective coating (such as a metallic thin film coating) or a non-reflective coating (such as a dark paint or ink or frit or a non-reflecting or poorly reflecting film), and may be substantially opaque or may be at least partially light transmitting (or there may be a local region within the bump or enlarged area or region 678 that is at least partially light transmitting so that a photo sensor can be disposed at this local light transmitting region and have a field of view through the perimetal or border coating and so detect, for example, glaring headlights from a rear approaching vehicle when the essentially frameless interior rearview mirror assembly is mounted in the interior cabin of the host vehicle), without affecting the scope of the present invention.

The border or perimetal coating 676, including its portion forming bump or enlarged area or region 678, is preferably selected so as to at least partially (and more preferably substantially, and most preferably completely) conceal or hide the seal that is disposed around the electrochromic medium and between the substrates. For applications with a glare sensor (where the sensor senses light from the rear of the vehicle and thus receives light through the front substrate), the coating is at least partially light transmitting at least in the region where the glare sensor is positioned. The sensors may be arranged on the enlarged region above and below one another (as shown in FIG. 24), or may be arranged side by side one another or in any other desired or appropriate pattern or arrangement, without affecting the scope of the present invention. The sensors may comprise glare sensors or photo sensors (such as sensors of the types described in U.S. Pat. Nos. 4,793,690 and 5,193,029, and U.S. patent applications, Ser. No. 10/512,206, filed Oct. 22, 2004, now U.S. Pat. No. 7,110,156; U.S. Ser. No. 10/514,709, filed Nov. 17, 2004, now U.S. Pat. No. 7,242,320; and/or U.S. Ser. No. 10/456,599, filed Jun. 6, 2003, now U.S. Pat. No. 7,004,593, which are all hereby incorporated herein by reference), or touch or proximity sensors (such as the sensors of the types described in PCT Application No. PCT/US03/40611, filed Dec. 19, 2003; and/or U.S. patent applications, Ser. No. 10/956,749, filed Oct. 1, 2004, now U.S. Pat. No. 7,446,924; and/or U.S. Ser. No. 10/933,842, filed Sep. 3, 2004, now U.S. Pat. No. 7,249,860, which are all hereby incorporated herein by reference).

The perimeter coating thus provides a coating or portion for the seal to be disposed along, in order to shape the seal so that a region is formed outside of the seal but within the perimeter of the front substrate. The coating may thus provide an outer area for a function, such as touch sensing, proximity sensing, light sensing and/or glare sensing via sensors positioned at the outer area. The coating and substrate of the present invention thus are suitable for use in a frameless mirror assembly, while providing functionality at the reflective element. As shown in FIG. 22, the front substrate may be offset or larger than the rear substrate so as to provide an overhang region 682a, 682b along the upper and/or lower perimeter regions. The accessory or sensor or sensors may be positioned along the overhang region, such as along the lower overhang region 682b.

In accordance with this aspect of the present invention, an essentially frameless interior mirror assembly (whether an electrochromic mirror assembly or a prismatic mirror assembly) can be formed where a user actuation interface is provided as a human machine interface, without having to create a gondola protrusion or bulge below the overall styling line defined by the interior mirror shape itself (and thus avoids any interference with a driver's forward field of view through the windshield of the vehicle), or without having to create an eyebrow protrusion or bulge above the overall styling line defined by the interior mirror shape itself (and thus avoids any interference with a driver's forward field of view through the windshield of the vehicle). However, should such protrusions or bulges be small/compact (less than about 1.5 cm protrusion from the line of the mirror shape preferred; less than about 1 cm more preferred; and less than about 0.75 cm most preferred), they can optionally be used alone or in combination with the perimetal/border coating 676 (including its portion forming bump or enlarged area or region 678) of the present invention.

Although shown and described as being a coating around the perimeter of an electrochromic reflective element assembly, the perimetal coating (for example, a layer of chromium or of rhodium or of rhodium/chromium) may be disposed around the perimeter edge or region of other reflective elements, such as prismatic reflective elements or the like. When disposed on prismatic reflective elements, the coating may only be disposed at the region at which the sensors are positioned, since the coating around the other portions or regions is not necessary, since there is no seal to hide or conceal on a prismatic reflective element assembly. Optionally, when one exterior side rearview mirror has an electro-optic reflective element (as is typically located at the driver side of the vehicle) and the other exterior side rearview mirror has a curved reflective element or non-electro-optic reflective element (as may be provided at the passenger side of the vehicle), a matching perimeter band may be disposed around the non-electro-optic reflective element so that the perimeter band of the passenger side mirror matches the perimeter band of the driver side mirror, such as by utilizing aspects described in U.S. provisional applications, Ser. No. 60/681,250, filed May 16, 2005; Ser. No. 60/690,400, filed Jun. 14, 2005; Ser. No. 60/695,149, filed Jun. 29, 2005, which are hereby incorporated herein by reference. Optionally, for applications where the perimeter band material of the electrochromic or driver side mirror is selected to be the same as or substantially the same as the third surface reflector material, the optical match (as viewed by a person viewing the reflective element) between the perimeter band and the third surface reflector may be sufficient so that the perimeter band is not readily discernible at the mirror reflector. Thus, in such applications, it may not be necessary to provide a perimeter band on the corresponding conventional (such as chrome or titanium or "Blue" coated), non-EC passenger side exterior mirror reflective element.

Also, when a perimetal coating 676 (including its portion forming bump or enlarged area or region 678) is used with an electro-optic mirror cell (such as an electrochromic mirror cell) that comprises a front substrate and a rear substrate sandwiching an electro-optic medium and spaced apart by a perimetal seal, the sensors, such as a photosensor and one or more proximity sensors, can be disposed behind the rear substrate (i.e. behind the fourth surface of the twin-substrate laminate) or the rear substrate can be notched at a portion that corresponds with and juxtapositions with the bump or enlarged area or region 678 of the coating 676, so that the sensors can be disposed directly behind the front substrate (the second surface of the twin-substrate laminate).

Optionally, the mirror assembly may include one or more photo sensors, such as for sensing ambient light and glare at the mirror assembly. The sensors may be attached to a printed circuit board, such as by utilizing aspects described in U.S. patent application Ser. No. 10/512,206, filed Oct. 22, 2004, now U.S. Pat. No. 7,110,156, which is hereby incorporated herein by reference. The photo sensor may be generally flat, rectangular sensor on an arm with a plurality of pins or contacts or terminals (such as, for example, three or five pins) extending therefrom for electrical connection to the circuit board. The sensor or sensors may comprise dual in-line photodiodes or phototransistors established on a common semi-conductor substrate (such as a silicon substrate). An infrared (IR) filter and light transmitting lens may be disposed at the sensors. Optionally, the sensors and associated circuitry may be established on a substrate or chip, such as by utilizing aspects of the EC driver-on-a-chip described in U.S. patent application Ser. No. 11/201,661, filed Aug. 11, 2005, now U.S. Pat. No. 7,480,149, which is hereby incorporated herein by reference. The sensor or sensors may be attached to the circuit board and positioned to align the sensing face of each sensor with an aperture or port of the mirror for receiving/sensing light at the photo sensor. Optionally, the sensors may attached to and positioned at the rear surface of the circuit board (the surface that faces away from the rear surface of the reflective element) and one photodiode may be aligned with an aperture or port formed through the circuit board, such that the sensing face of the photodiode senses light that is received through the reflective element and through the aperture or port in the circuit board, while the other photodiode is aligned with an aperture in the casing (such as an aperture at a lower portion of the casing or elsewhere at the casing) to receive ambient light from a lower region of the mirror assembly or the like. Optionally, one or both of the sensors or photodiodes may be positioned or oriented so as to generally align with a light pipe or the like for directing ambient or glare light along the light pipe to the sensor or sensors. For example, the light pipe or pipes may utilize aspects of the light-piping described in U.S. patent application Ser. No. 10/229,573, filed Aug. 28, 2002, now U.S. Pat. No. 7,008,090, which is hereby incorporated herein by reference.

For the third surface metallic reflectors, second surface metallic reflective bands and/or fourth surface wrap-around metallic conductor layers (such as are disclosed in U.S. patent application Ser. No. 11/021,065, filed Dec. 23, 2004, now U.S. Pat. No. 7,255,451; and/or U.S. provisional application Ser. No. 60/644,903, filed Jan. 19, 2005; and Ser. No. 60/667,049, filed Mar. 31, 2005, which are hereby incorporated herein by reference), thin film coatings formed preferably by sputtering of nickel-alloys or iron-alloys can be used.

For example, Inconel (a nickel-based superalloy such as Inconel alloy 600 which is 72 percent nickel, 16 percent chromium, and 8 percent iron) can be used. Other forms of Inconel can be used, depending on the property required for a particular mirror construction/coating. For example, Inconel alloy 750, which has a small percentage of titanium and aluminum added for hardenability, can be used. Another example of a suitable material is Inconel 625, which contains molybdenum and columbium.

Another suitable nickel-alloy choice is HASTELLOY, which is a registered trademark name of Haynes International, Inc. The predominant alloying ingredient is typically nickel. Other alloying metals may be added to the nickel, including varying percentages of the elements molybdenum, chromium, cobalt, iron, copper, manganese, titanium, zirconium, aluminum, carbon, and tungsten. For example, for the third surface metallic reflectors, second surface metallic reflective bands and/or fourth surface wrap-around metallic conductor layers of the electrochromic mirrors described herein, thin film coatings may be deposited on the substrates involved by sputtering in a vacuum chamber from a Hastelloy C 276 or a Hastelloy X alloy planar magnetron or rotary magnetron sputtering target.

Another suitable choice is Nichrome, which is an alloy of nickel and chromium. Typically, the alloy is 80 percent nickel and 20 percent chromium. Nichrome, when sputter deposited as a conductive, metallic, reflective thin film of at least about 300 angstroms thickness has a specular reflectivity greater than about 60 percent reflectivity; and depending on the vacuum deposition conditions greater than about 65 percent reflectivity (as measured using SAE J964a). For example, good results can be achieved using a thin film of Nichrome [typically about 400-600 angstroms thick sputter-deposited onto the inward-facing surface (third surface) of the rear substrate in a laminate-type electrochromic mirror cell construction], and then overcoating this thin layer of Nichrome with a thinner layer (typically about 100-200 angstroms thick or thereabouts) of Rhodium to form a Nichrome/Rhodium third surface reflector. If Nichrome is also used as a wrap-around fourth surface conductor [or for the perimetal reflector band around the edge perimeter of the inward-facing surface (second surface) of the front substrate of the EC cell construction], contact resistance challenges sometimes experienced when a chromium thin film conductor layer is contacted to by some silver-loaded conductive epoxies are reduced/mitigated.

Another alloy choice for these third surface metal reflector, second surface indicia reflective bands/indicia and/or fourth surface conductor layers is a coating of Nickel Silver, which is an alloy of copper with nickel and often, but not always, zinc. Nickel-silver alloys are commonly named by listing their percentages of copper and nickel, thus "Nickel Silver 55-18" would contain 55 percent copper, 18 percent nickel, and 27 percent other elements, most probably entirely zinc. For example, a NS-12 Nickel-silver alloy, which is 88 percent copper and 12 percent nickel, may be used.

Another alloy choice for these third surface metal reflector, second surface indicia reflective bands/indicia and/or fourth surface conductor layers is a coating of Cupronickel which is an alloy of copper, nickel and strengthening impurities. A typical mix is 75 percent copper, 25 percent nickel, and a trace amount of manganese. A 55 percent copper/45 percent nickel alloy may also be used.

Another alloy choice for these third surface metal reflector, second surface indicia reflective bands/indicia and/or fourth surface conductor layers is a coating of Monel metal, which is a copper-nickel alloy. Monel is a metal alloy, primarily composed of nickel and copper, with some iron and other trace elements. Also, bronze (copper alloyed with tin), brass (copper alloyed with zinc), and nickel silver (another group of copper-nickel alloys) may be used.

Another alloy choice for these third surface metal reflector, second surface indicia reflective bands/indicia and/or fourth surface conductor layers is a coating of stainless steel which is a ferrous alloy with a minimum of 10.5 percent chromium, preferably with additions of more than 12 percent (by weight) chromium. For example, a thin film coating sputtered off an AL-6XN alloy target, which is a superaustenitic stainless steel which was developed by Allegheny Ludlum Corporation (www.alleghenyludlum.com), can be used. It exhibits far greater resistance to chloride pitting, crevice corrosion and stress-corrosion cracking than exhibited by the standard 300 series stainless steels, and is less costly than traditional nickel-base corrosion resistant alloys. The UNS Designation of the AL-6XN® alloy is N08367.

The high nickel (24 percent) and molybdenum (6.3 percent) contents of the AL-6XN® alloy give it good resistance to chloride stress-corrosion cracking. The molybdenum confers resistance to chloride pitting. The nitrogen content of AL-6XN® alloy serves to further increase pitting resistance and also gives it higher strength than typical 300 series austenitic stainless steels, and thereby often allows it to be used in thinner sections. The high levels of chromium, molybdenum and nitrogen in AL-6XN® alloy all serve to produce exceptional corrosion resistance for this formable and weldable stainless steel.

Another alloy choice for these third surface metal reflector, second surface indicia reflective bands/indicia and/or fourth surface conductor layers is a coating of Chinese silver, which is an alloy made of silver, nickel and bronze, such as used for jewelry or a coating of a Ferroalloy that constitutes various alloys of less than 50 percent iron and one or more other element, manganese or silicon for example. The main Ferroalloys are: ferromanganese, ferrochromium, ferromolybdenum, ferrotitanium, ferrovanadium, ferrosilicon, ferroboron, and ferrophosphorus.

Another alloy choice for these third surface metal reflector, second surface indicia reflective bands/indicia and/or fourth surface conductor layer is a coating of German silver that is an alloy of 45-70 percent copper, 5-30 percent nickel, and 8-45 percent zinc—sometimes small amounts of tin or lead are added. It has a color resembling silver. Other names are Nickel silver, Pakfong (also Paktong) and Alpacca (originally a trademark of Berndorf AG).

Another alloy choice for these third surface metal reflector, second surface indicia reflective bands/indicia and/or fourth surface conductor layer is a coating of a titanium alloy such as a Grade F-5 titanium alloy (6 percent aluminum, 4 percent vanadium); Grade F-6 titanium alloy (5 percent aluminum, 2.5 percent tin); a titanium/palladium alloy; Grade F-12 titanium alloy (0.3 percent molybdenum, 0.8 percent nickel).

Another alloy choice for these third surface metal reflector, second surface indicia reflective bands/indicia and/or fourth surface conductor layer is a coating of a manganese alloy, such as a manganese-copper or a manganese-iron or a manganese-gold alloy. Another alloy choice for these metal reflector and/or conductor layers is a coating of a molybdenum alloy, such as a 52 percent molybdenum/48 percent rhenium alloy or a 99 percent Mo, 0.5 percent Ti and 0.08 percent Zr alloy (commonly known as a TZM alloy).

Another alloy choice for these third surface metal reflector, second surface indicia reflective bands/indicia and/or fourth surface conductor layer is Sterling silver, which is an alloy of silver containing least 92.5 percent pure silver and 7.5 percent other metals, usually copper. In Sterling silver, the silver is usually alloyed with copper to give strength. Other metals can replace the copper. For example, a thin film coating formed by sputter deposition from a Silver/Germanium alloy target can be used.

Another alloy choice for these third surface metal reflector, second surface indicia reflective bands/indicia and/or fourth surface conductor layer is an aluminum alloy, such as Duralumin which is an alloy of aluminum (about 95 percent), copper (about 4 percent), and small amounts of magnesium (0.5 percent to 1 percent) and manganese (less than 1 percent). When sputter deposited to form a thin film metallic conductor reflector/electrode layer, such aluminum alloy thin films may optionally be overcoated with a thin film of a transparent conductor (such as of indium tin oxide) that is thus disposed between the aluminum-based reflector layer and the electrochromic medium in the electrochromic cell construction (and thus protecting the aluminum-based reflector layer from direct contact with the electrochromic medium).

Another alloy choice for these third surface metal reflector, second surface indicia reflective bands/indicia and/or fourth surface conductor layer is Stellite, which is a range of cobalt-chromium alloys designed for wear resistance. It may also contain tungsten and a small but important amount of carbon.

Another alloy choice for these third surface metal reflector, second surface indicia reflective bands/indicia and/or fourth surface conductor layer is Billon, which is an alloy of silver (sometimes gold) with a high base metal content (such as copper) or a silver alloy such as a silver-palladium alloy.

Another alloy choice for these third surface metal reflector, second surface indicia reflective bands/indicia and/or fourth surface conductor layer are copper-zinc-aluminum alloys or nickel-titanium (NiTi) alloys, such as the nickel-titanium alloy available under the trade name Nitinol (an acronym for Nickel Titanium Naval Ordnance Laboratories).

Another alloy choice for these third surface metal reflector, second surface indicia reflective bands/indicia and/or fourth surface conductor layer are tungsten alloys with tungsten content ranging from 40 to 97 percent featuring varying degrees of physical and mechanical properties; examples include W—Fe, W—Cu and W—Co alloys.

Another alloy choice for these third surface metal reflector, second surface indicia reflective bands/indicia and/or fourth surface conductor layer are palladium alloys, such as palladium-rhodium alloys.

Another alloy choice for these third surface metal reflector, second surface indicia reflective bands/indicia and/or fourth surface conductor layer are indium alloys, such as indium-bismuth-tin alloys or lead-indium alloys or tin-indium alloys.

Another alloy choice for these third surface metal reflector, second surface indicia reflective bands/indicia and/or fourth surface conductor layer are zinc alloys, such as with copper or magnesium or nickel.

Another alloy choice for these third surface metal reflector, second surface indicia reflective bands/indicia and/or fourth surface conductor layer is Brass, which is an alloy of copper and zinc. Some types of brass are called bronzes, despite their high zinc content. Alpha brasses (with less than 40 percent zinc) or Beta brasses, with a higher zinc content, can be used, depending on the circumstance involved. White brass, with more than 45 percent zinc, can also be used when it delivers the desired property.

Another alloy choice for these third surface metal reflector, second surface indicia reflective bands/indicia and/or fourth surface conductor layer is a rhenium alloy, such as a molybdenum-rhenium or a tungsten-rhenium alloy.

Another alloy choice for these third surface metal reflector, second surface indicia reflective bands/indicia and/or fourth surface conductor layer is a gold alloy such as an ELKONIUM® 76 gold-copper alloy or an ELKONIUM® 70 gold-silver-nickel alloy or a gold-palladium-nickel alloy or a gold-copper alloy or a gold-copper-nickel alloy or a gold-indium alloy or gold-nickel alloy or a gold-tin alloy.

Another alloy choice for these third surface metal reflector, second surface indicia reflective bands/indicia and/or fourth surface conductor layer is a platinum alloy, such as with cobalt, or with copper or with iridium (for example, Pt70/Ir30) or with palladium or with rhodium or with gallium or with ruthenium or with tungsten or with indium.

Another alloy choice for these third surface metal reflector, second surface indicia reflective bands/indicia and/or fourth surface conductor layer is a rhodium alloy, such as with iron or platinum (for example, Pt90/Rh10 or Pt87/Rh13).

Another alloy choice for these third surface metal reflector, second surface indicia reflective bands/indicia and/or fourth surface conductor layer is a cobalt alloy, such as with iron or nickel.

Another alloy choice for these third surface metal reflector, second surface indicia reflective bands/indicia and/or fourth surface conductor layer is a copper alloy, such as with tin or nickel or lead. Examples include Phosphor Bronze, Gun Metal, Tin Bronze, Leaded Bronze and Nickel Bronze.

Another alloy choice for these third surface metal reflector, second surface indicia reflective bands/indicia and/or fourth surface conductor layer are superalloys, such as PM200 available from Plansee AG of Reutte, Austria, and having a composition in weight percentage: 20 Cr, 5.5 Al, 0.5 Ti, 0.3 Al, 0.5 Y2O3, remainder Fe. The Plansee PM 2000 is a highly oxidation resistant and extremely creep resistant ferritic iron-chromium based alloy, due to its high content of aluminum and chromium.

Another alloy choice for these third surface metal reflector layers, second surface indicia reflective bands/indicia layers and/or fourth surface conductor layers are tantalum alloys, such as tantalum-tungsten alloys and tantalum-niobium alloys. Another alloy choice for these metal reflector and/or conductor layers are niobium alloys or zirconium or iridium alloys or osmium alloys or ruthenium alloys or lead alloys or beryllium alloys or tin alloys.

Alloys formed of tin and lead with other metal elements and non-metal elements (such as phosphorous or silicon or carbon) may be used where the coating properties suit the particular electrochromic cell structure/performance desired.

Another alloy choice for these third surface metal reflector, second surface indicia reflective bands/indicia and/or fourth surface conductor layer is a magnesium alloy, such as Magnesium-manganese; Magnesium-aluminum-manganese; Magnesium-aluminum-zinc-manganese; Magnesium-zirconium; Magnesium-zinc-zirconium; Magnesium-rare earth metal-zirconium; Magnesium-silver-rare earth metal-zirconium; and/or Magnesium-yttrium-rare earth metal-zirconium.

Metal reflector layers and/or indicia layers and/or conductor layers may also be sputter (or otherwise) deposited from metal targets such as from a chromium metal target, or from a nickel metal target or from a tungsten metal target or from a ruthenium metal target or from a titanium metal target or from a molybdenum metal target or from a cobalt metal target or from a manganese metal target or from a silver metal target or from an aluminum metal target or from a platinum metal target or from a palladium metal target or from a gold metal target or from a rhenium metal target or from a rhodium metal target or from a tantalum metal target or from a niobium target or from a zirconium target or from an iridium target or from an osmium target or from a lead target or from a beryllium target or from a zinc target or from a tin target or from an indium target or from a target that is a mixture of one or more of these metals (optionally with other metallic and/or non-metallic elements included). In general, improved results in terms of making contact thereto, such as via a conductive epoxy (such as lower, stabler contact resistances), are obtained for metal reflector and/or conductor layers by using metals or alloys that have a low Gibbs Energy of formation of metal oxides as the sputter target (or evaporation material) for vacuum deposition of thin metallic layers. For example, deposited thin films of palladium or nickel or tungsten or molybdenum or rhodium have a low Gibbs Energy of formation of metal oxides compared to, for example, thin films of aluminum or chromium.

The choice of alloy or metal reflector and/or conductor layer to use is dependent on the reflectivity level and spectral content desired (for example, whether a silvery reflectivity is desired or whether a more copper-toned reflectivity is desired) and by the electrical properties (such as specific conductivity of the deposited thin film) and/or optical properties (such as the optical constants such as refractive index and k-value) desired for the deposited thin metallic film and/or by the sputtering rate/evaporation rate desired in the production process and/or by the cost bearable by the construction involved.

Also, when sputtering or otherwise vacuum depositing the metal reflector and/or conductor layers of the present invention from an alloy or mixed-metal target or source, the elemental composition/structure of the target/source is preferably substantially replicated in the deposited metallic thin film coating or layer but need not be exactly replicated.

Also, and as described previously above and optionally, the third surface metal reflector on the third surface of the rear substrate of the cell, the perimeter reflective border band around the edge border of the second surface of the front substrate and any indicia on the second surface but inward of the border band (if present) may be substantially the same material so that all three have substantially the same optical properties such as reflectivity level and refractive index/k-value. By so choosing, the optical contrast between the third surface reflector coating and the second surface perimeter border is substantially reduced and essentially eliminated such that the viewer barely sees or notices the presence of the second surface border band when the electrochromic cell is not powered (i.e. is undimmed and is in its bleached state). For example, the third surface reflector coating and the second surface perimetal border reflector band may both comprise chromium thin films or both may comprise ruthenium thin films or both may comprise rhodium thin films or both may comprise Hastelloy C-276 thin films or both may comprise molybdenum thin films or both may comprise aluminum (or aluminum alloy) thin films or both may comprise aluminum/palladium alloy thin films or both may comprise silver (or silver alloy) thin films or both may comprise an ITO/thick Ag (preferably greater than about 200 angstroms physical thickness; more preferably greater than about 250 angstroms thickness and most preferably greater than about 300 angstrom thickness)/ITO stack or a ZnAlO/thick Al/ZnAlO stack or a ZnAlO/thick Ag/ZnAlO stack or an SnO2/Ag/SnO2 stack or the like.

Figure 25:
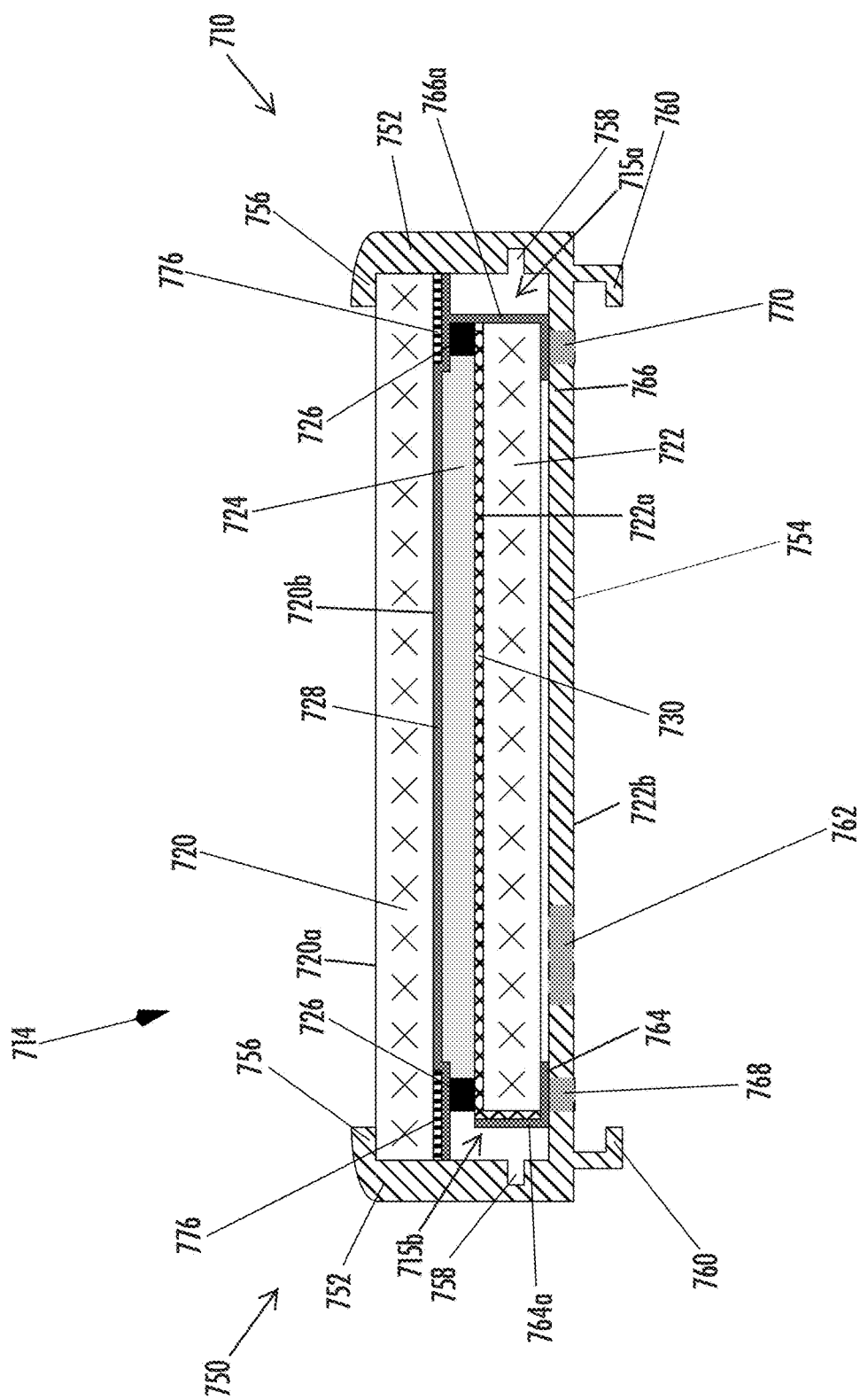
FIG. 25 is a sectional view of an reflective element and support element assembly in accordance with the present invention.

Optionally, and with reference to FIG. 25, a reflective element assembly 710 includes a reflective element 714 received within and/or held and/or supported by a support element 750. The support element 750 includes perimeter walls 752 and a back portion 754, which cooperate to define a pocket or cavity in which the reflective element 714 is received. The perimeter walls 752 include an outer lip portion or shoulder portion 756, which extends at least partially or slightly over the perimeter region of the front surface 720a of the reflective element 714, in order to retain the reflective element within the cavity of the support element and between the back portion 754 and the lip portion 756.

In the illustrated embodiment, the reflective element 714 comprises an electro-optic or electrochromic reflective element having a front substrate 720 and a rear substrate 722 and an electro-optic medium 724 disposed therebetween and substantially encompassed by a perimeter seal 726 around the electro-optic medium and between the substrates 720, 722. The electro-optic reflective element includes a transparent conductive coating or layer 728 substantially over the rear surface 720b of front substrate 720 and a metallic reflective conductive coating or layer (or coatings or layers) 730 substantially over the front surface 722a of the rear substrate 722. The coatings may comprise any suitable conductive and reflective/transparent coatings or layers, such as the types described in U.S. Pat. Nos. 6,690,268; 5,668,663 and/or 5,724,187, and/or in U.S. patent applications, Ser. No. 10/054,633, filed Jan. 22, 2002, now U.S. Pat. No. 7,195,381; U.S. Ser. No. 10/528,269, filed Mar. 17, 2005, now U.S. Pat. No. 7,274,501; U.S. Ser. No. 10/533,762, filed May 4, 2005, now U.S. Pat. No. 7,184,190; and/or U.S. Ser. No. 11/021,065, filed Dec. 23, 2004, now U.S. Pat. No. 7,255,451; and/or PCT Application No. PCT/US03/29776, filed Sep. 9, 2003; and/or PCT Application No. PCT/US03/35381, filed Nov. 5, 2003; and/or U.S. provisional applications, Ser. No. 60/630,061, filed Nov. 22, 2004; Ser. No. 60/667,048, filed Mar. 31, 2005; Ser. No. 60/629,926, filed Nov. 22, 2004; Ser. No. 60/531,838, filed Dec. 23, 2003; Ser. No. 60/553,842, filed Mar. 17, 2004; Ser. No. 60/563,342, filed Apr. 19, 2004; Ser. No. 60/681,250, filed May 16, 2005; Ser. No. 60/690,400, filed Jun. 14, 2005; and/or Ser. No. 60/695,149, filed Jun. 29, 2005, and/or PCT Application No. PCT/US03/40611, filed Dec. 19, 2003, which are all hereby incorporated herein by reference. As shown in FIG. 25, the rear substrate may have a smaller width or height or length dimension so that the reflective element has overhang regions 715a, 715b along respective edge portions of the reflective element, such as described in U.S. patent application Ser. No. 11/021,065, filed Dec. 23, 2004, now U.S. Pat. No. 7,255,451, which is hereby incorporated herein by reference. Although shown and described as an electro-optic or electrochromic reflective element, the reflective element may comprise any other type of mirror reflective element, such as a prismatic reflective element or the like, without affecting the scope of the present invention.

Support element 750 is preferably molded from a substantially rigid thermoplastic material, such as a polyolefin, such as a polypropylene or the like, or a substantially rigid thermoset polymeric resin, such as a Nylon or a urethane or the like; but a flexible polymeric or elastomeric material may also or otherwise be used, such as in applications where the structural integrity of the support element is less utilized. The perimeter wall portion 752 may flex to allow the reflective element to be inserted through the front of the support element, so that the reflective element 714 (which is oversized relative to the lip portion 756 and thus has perimeter dimensions greater than the perimeter dimensions of the perimeter edges 756a of the lip portion 756) may insert through the lip portion 756. When the reflective element is inserted within the cavity defined by the perimeter wall portion and back portion, the perimeter wall portion 752 may flex back toward its initial orientation, whereby the lip portion 756 will overlap the perimeter edge regions of the front surface 720a of the reflective element 714. Preferably, the lip portion 756 will overlap the front perimeter regions a small amount, such as about 1 mm or thereabouts, so as to provide a small or low profile lip or shoulder and thus a substantially frameless appearance to the reflective element. As can be seen in FIG. 25, the support element 750 may include a groove or notch portion 758 along and at least partially around the perimeter wall portion 752, and may be near or proximate to the back portion 754, to facilitate flexing of the perimeter wall portion 752 during insertion of the reflective element into the support element. Because the material of the support element may comprise a substantially rigid material, the groove or notch (or any other means for weakening or flexing the sidewalls of the support element, such as a narrowed wall thickness or the like) facilitates flexing of the sidewalls as the reflective element is inserted into or press fit the pocket or cavity of the support element. The groove or notch or narrowed wall thickness thus allows flexing outward of the sidewalls and gives a springiness to the sidewalls so that they readily return to or are biased toward their initial orientation after the reflective element is inserted past the lip portion of the support element.

As shown in FIG. 25, support element 750 may include one or more attachment elements or structure 760, such as tabs or the like protruding rearward from the rear or back portion 754, for attaching a back plate and/or printed circuit board or the like (not shown in FIG. 25) to the reflective element assembly 710. The attachment elements 760 may attach or secure or retain the reflective element assembly 710 to the back plate (such as a back plate and circuit board assembly with the associated accessories or circuitry or the like, or such as a back plate or mounting plate having the mounting portion (such as a socket for receiving a ball member of a mounting arm or the like) for adjustably mounting the reflective element assembly to a mounting structure). The reflective element assembly and mounting plate thus may be readily positioned in or at or attached to a mirror mounting structure and/or mirror casing.

Optionally, the back portion 754 may include one or more viewing apertures or openings 762 formed therethrough. The viewing apertures 762 may be formed to correspond or align with a display element (not shown) of the circuitry or circuit board of the mirror assembly, such that information or icons or indicia or the like emitted or projected or back lit by the display element may be viewable through the reflective element and the viewing aperture so as to be viewable at the reflective element by a driver of the vehicle. The viewing apertures 762 may be openings through the back portion 754, or may comprise a transparent or substantially transparent or translucent element, such as a plastic or clear lens or optic or the like (and may have an icon or symbol or information or indicia formed thereon so as to be backlit by the display element or illumination source at the rear of the reflective element), in order to provide optical coupling between the display element and the rear surface 722a of the reflective element 714. The display element or device may comprise any suitable display element or device or illumination source, such as those described below, without affecting the scope of the present invention.

In the illustrated embodiment of FIG. 25, reflective element 714 comprises an electro-optic or electrochromic reflective element with fourth surface electrically conductive bus-bars or elements 764, 766 at the rear surface 722b of rear substrate 722 of reflective element 714. The fourth surface electrically conductive bus-bars 764, 766 may include wrap-around conductive portions 764a, 766a to electrically conductively connect the fourth surface conductive bus-bars 764, 766 to the third surface conductive coatings or layers 730 or second surface transparent conductive coating or layer 728, respectively, such as by utilizing principles described in U.S. patent application Ser. No. 11/021,065, filed Dec. 23, 2004, now U.S. Pat. No. 7,255,451; and/or U.S. provisional applications, Ser. No. 60/644,903, filed Jan. 19, 2005; and Ser. No. 60/667,049, filed Mar. 31, 2005, which are hereby incorporated herein by reference. As shown in FIG. 25, the wrap-around portion 766a may extend along the edge of the rear substrate and along the seal to contact the second surface conductive coating 728 and/or the perimetal border coating 776 (and may comprise a conductive epoxy or solder material or the like disposed at the overhang region 715a of the reflective element 714). In such applications, the back portion 754 may include electrical connection apertures 768, 770 to allow for electrical contact or connection between circuitry of the back plate and/or circuit board or the like and the fourth surface bus-bars 764, 766, respectively. The electrical contacts or connectors of the mirror circuitry may insert through the apertures 768, 770 in the back portion 754 and into electrically conductive contact with the respective fourth surface bus-bars 764, 766. Electrical connection between the circuitry contacts and the fourth surface bus-bars 764, 766 may be established and maintained via conductive epoxy or solder or the like, or via mechanical connection of the circuitry contacts to the bus-bars or biasing of the circuitry contacts to the bus-bars or the like, without affecting the scope of the present invention. Optionally, the support element may include metallic or conductive posts or columns or connectors molded or formed or positioned through the back portion so that the integral conductive posts may electrically conductively contact/connect to the fourth surface electrical connection sites or regions, such as bus-bars, when the reflective element is inserted or press fit into the support element. The conductive posts may protrude rearward from the rear surface of the back portion (the surface facing away from the rear surface of the reflective element) or may be otherwise exposed at the rear surface of the back portion so as to facilitate electrical connection when the circuit board is attached to the support element and/or when the reflective element is installed in the mirror casing.

The spring loaded or biased or urged contacts, besides making electrical contact, may also provide substantially secure mechanical contact of the contacts or terminals of the mirror assembly, whereby the contacts or terminals may be soldered or spot welded or adhered to secure the contacts/terminals together. Because the contacts are mechanically urged together, a local spot weld or solder (such as an automatically applied solder joint) or conductive epoxy may be readily applied to the joint to augment the mechanical connection to ensure that electrical contact is secured. Such a welding or soldering or conductive material adhering step may be readily accomplished, without having to also hold the connectors together during the welding/soldering/adhering operation. The securing of the connectors thus may be accomplished in situations where it is difficult to access or view the connection. For example, in applications where the components are loaded or assembled along a single z-axis (such as described in U.S. patent application Ser. No. 10/933,842, filed Sep. 3, 2004, now U.S. Pat. No. 7,249,860, which is hereby incorporated herein by reference), one of the components may have a curable conductive epoxy applied thereto, whereby the epoxy will contact and secure the connections together after the connections are urged together and held together during the assembly process. As the conductive epoxy (such as a thermally curable epoxy or aerobically curable epoxy or moisture curable epoxy or UV curable epoxy or the like) is cured, the epoxy and the biased connectors ensure a substantially strong and secure contact of the connectors.

Figure 34:
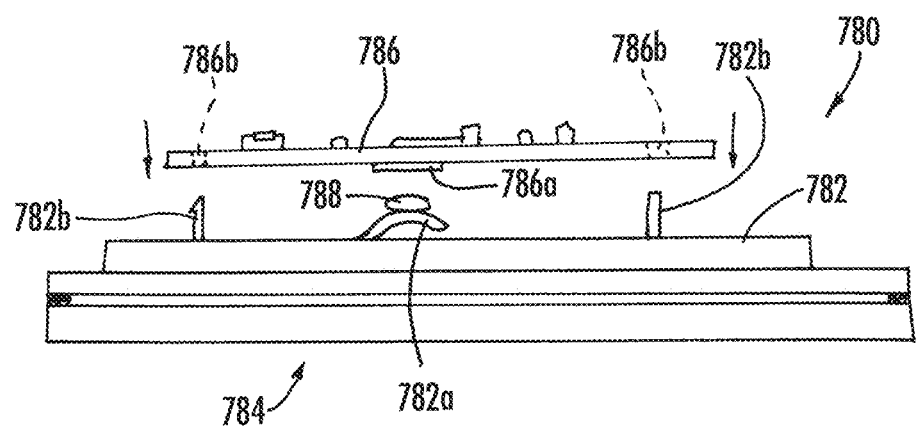
FIG. 34 is a forward facing view of a powered sun visor with video screen incorporated therein in accordance with the present invention, shown with the sun visor flipped or pivoted downward.

The biased contacts or connectors thus reduce the solder operations and may reduce or substantially eliminate precise soldering operations and may provide for solderless electrical connections of contacts/connectors of the mirror assembly. For example, and with reference to FIG. 34, a reflective element assembly 780 may include a reflector carrier or back plate 782 for attaching to a rear surface of a reflective element or cell 784 and a printed circuit board 786 for attaching to the back plate 782 and making electrical contact between the circuit board 786 and back plate 782 when attached thereto. As shown in FIG. 34, back plate 782 may include a spring clip or electrical contact 782a and one or more alignment tabs or posts 782b extending from a rear surface of the back plate. The circuit board 786 may include an electrical contact 786a (which is electrically connected to circuitry on the circuit board) and openings or apertures 786b for receiving posts 782b of back plate 782 when circuit board 786 is attached to back plate 782. Thus, as the circuit board 786 is pressed into engagement with back plate 782, electrical contact 786a is pressed into engagement with electrical contact 782a and mechanically held in contact via retaining clips or the like (not shown) that hold the circuit board to the back plate.

As shown in FIG. 34, one of the electrical contacts 782a, 786a is coated or wiped with a conductive epoxy 788 (such as a quick set conductive epoxy material or the like), so that when the electrical contacts are pressed together, there is a strong electrical connection between the contacts that is augmented by the presence and curing of the conductive epoxy. The electrical contact 782a at back plate 782 may be in electrical contact with a conductive pad or bus-bar at the rear surface of the reflective element, such as a fourth surface conductive bus-bar of the types described in U.S. patent applications, Ser. No. 11/021,065, filed Dec. 23, 2004, now U.S. Pat. No. 7,255,451; and/or U.S. provisional applications, Ser. No. 60/644,903, filed Jan. 19, 2005; and Ser. No. 60/667,049, filed Mar. 31, 2005, which are hereby incorporated herein by reference. The conductive pad or bus-bar may comprise any suitable material, such as a copper beryllium material or a silver plated nickel material or the like. Optionally, a metallic tab (such as a tab of the types described in U.S. provisional applications, Ser. No. 60/644,903, filed Jan. 19, 2005; and Ser. No. 60/667,049, filed Mar. 31, 2005, which are hereby incorporated herein by reference) may be provided that allows for connection to a wire or lead, whereby the wire or lead is crimped to the tab, and then the mechanical connection is later augmented via soldering or via conductive epoxy. Optionally, aspects of the mirror assemblies described in U.S. patent application Ser. No. 10/512,206, filed Oct. 22, 2004, now U.S. Pat. No. 7,110,156, which are hereby incorporated herein by reference, may be utilized.

The support element 750 (FIG. 25) thus may receive and support the reflective element 714 and may provide a substantially frameless reflective element assembly 710. The support element may substantially conceal the perimeter edges of the reflective element via the lip portion or small overhang portion. The support element may be molded to the desired shape and dimensions for a particular reflective element application, and the reflective element (of the substantially corresponding shape and slightly oversized dimensions) may be readily inserted into the molded support element to form the reflective element assembly. The reflective element may be inserted into the support element after the support element is molded and cooled or may be inserted into the support element when the support element is warm and pliable (such as soon after molding the support element and before the molded support element has cooled or after heating the molded and cooled support element to a desired elevated temperature to enhance the pliability of the molded support element), without affecting the scope of the present invention. When inserted into the support element, the reflective element is retained therein via engagement with the back portion 754 and the lip portion 756 and the side wall portion 752 at the perimeter edge of the front substrate. The wall portions/lip of the support element thus contact only the front substrate and do not contact the edge regions of the rear substrate (due to the oversized dimension of the front substrate relative to the rear substrate and the overhang regions of the reflective element), and thus does not impart hoop stresses to the seal of the reflective element or cell as could occur should the front substrate be offset/staggered to the rear substrate.

One advantage of the present invention is that the sidewalls and/or lip of the support element function to mask from view the cut edge and seamed edge sides of the front substrate, and so remove from direct view any sparkle or chips or glass imperfections or the like at the front viewable surface of the reflective element. Also, when cutting the front substrate shape, cutting tolerances in dimensions (such as a cutting tolerance of, for example, 0.015 inch or thereabouts) may occur. In this regard, forming the support element via injection molding (such as described below) may have advantages in that the injected molten resin can take up or accommodate any cutting tolerances of the front substrate inserted into the molding tool.

Although shown and described as being a substantially continuous panel along and over the rear surface of the reflective element, it is envisioned that the back portion of the support element may be partially or substantially open and thus may only partially cover the rear surface of the reflective element, such as around the perimeter regions of the reflective element, without affecting the scope of the present invention. Optionally, the back portion may be substantially continuous and may not include apertures or openings or the like, and thus may substantially or entirely cover the rear surface of the reflective element, without affecting the scope of the present invention.

Figure 26:
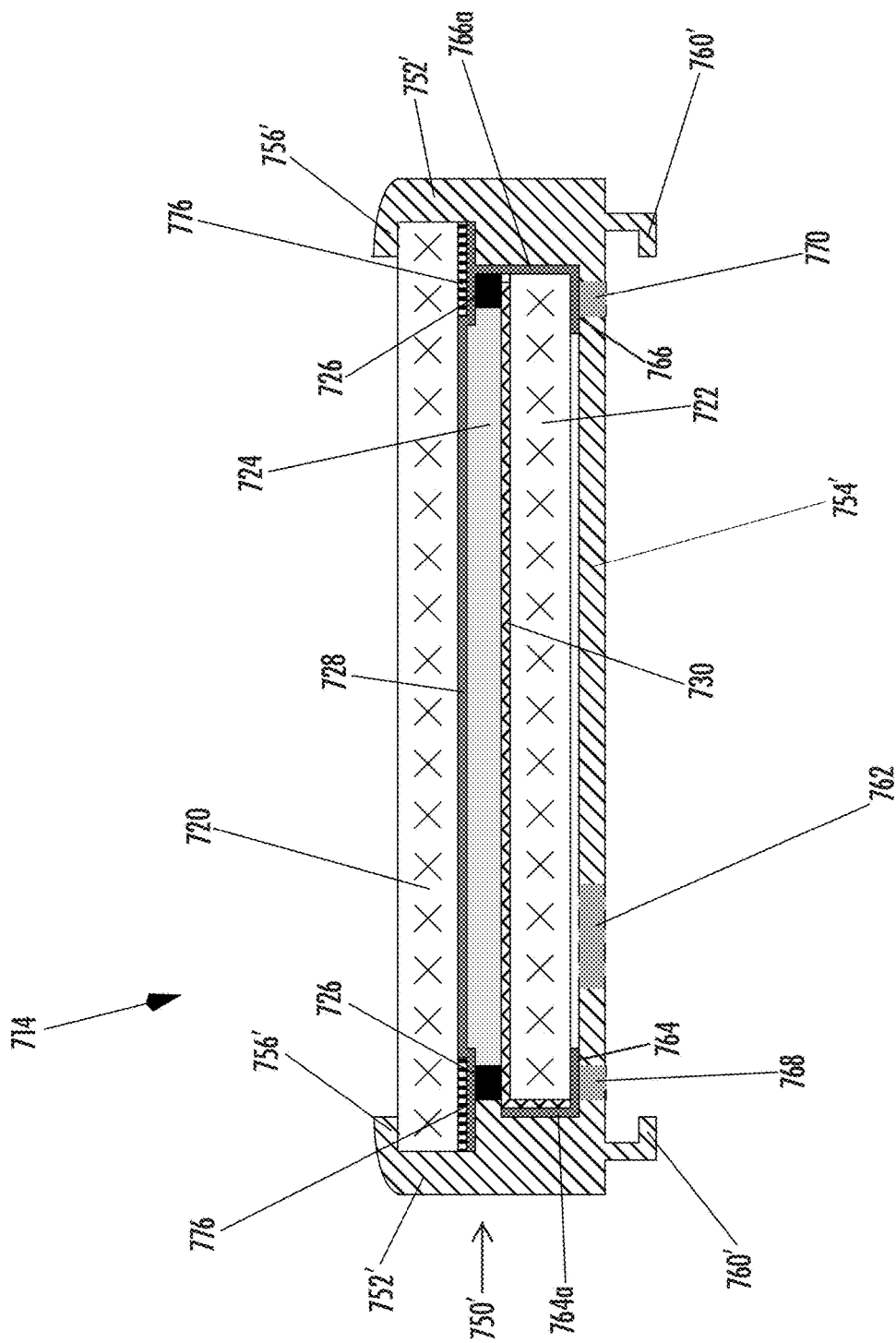
FIG. 26 is a sectional view of another reflective element and support element assembly in accordance with the present invention.

Optionally, and with reference to FIG. 26, a support element 750' may be molded around the perimeter regions and rear surface of the reflective element 714. For example, the reflective element or cell may be placed in an injection molding tool or the like, and a plastic or polymeric material may be injected or molded around the reflective element. Preferably, a low pressure injection molding process, with a low pressure mold material, such as reaction injection molding (RIM) urethane or suitable equivalent, or the like, may be used to mold the support element around the perimeter regions of the reflective element. In such applications, any tolerance variations in the dimensions of the front and/or rear substrates of the reflective element may be accommodated by the molded support element that is molded over the perimeter regions of the reflective element. The over molded support element thus may substantially fill in the overhang regions of the reflective element where the front substrate extends beyond or overhangs the rear substrate, and does not include the notches or grooves to allow for flexing of the support element. The electrical connection apertures 768, 770 may be formed in the back portion 754' of support element 750' or conductive posts or the like may be insert molded into the back portion 754' and in electrical/conductive contact with the fourth surface bus-bars 764, 766 as the support element is molded over and around the reflective element. The support element 750' may be otherwise shaped substantially similar to the support element 750 discussed above, and may include the openings or apertures 762, 768, 770 in the back portion 754' and the attachment elements 760' at the back portion 754', such that a detailed discussion of the support elements will not be repeated herein. The similar features of the reflective elements and support elements are referenced in FIG. 26 with similar reference numbers as used in FIG. 25.

Because the support element may be integrally molded substantially around the reflective element, the support element may seal and environmentally protect the reflective element within the support element. The overmolded support element may be substantially attached to the reflective element and may adhere to or bond to the reflective element as the molded material cures, so that the back portion may be substantially attached to the rear surface of the reflective element. Optionally, enhanced adhesion may be achieved by priming the perimeter edges of the substrates and/or rear surface of the reflective element, such as a with an adhesion enhancing or adhesion promoting coupling agent or compound or primer or the like, such as by utilizing principles described in U.S. Pat. Nos. 6,298,606; 6,128,860; 5,966,874; 5,704,173 and 5,551,197, which are hereby incorporated herein by reference. Such adhesion-promoting compounds may include silanes, such as available from Dow Corning, or titanium or zirconium coupling agents such as available from Kenrich Petrochemical, Inc., of Bayon, N.J., or equivalents.

As shown in FIG. 26, the overmolded support element 750' may include the small perimeter lip portion 756' that overlaps the perimeter edges of the front substrate of the reflective element and overlays the perimeter edge regions of the front surface of the front substrate. However, because the support element may be substantially adhered/attached to the reflective element by the molding process, the support element 750' may not include the lip portion. In such applications, the perimeter edge of the front substrate may, if desired, be finished or rounded to provide a non-sharp edge at the front of the reflective element.

Optionally, the support element 750, 750' may be formed to include the back plate or attachment plate of the reflective element, such that the back portion and back/attachment plate are unitarily formed. Optionally, the attachment or socket for a ball member of a mounting structure or the like may also be established at the unitary back portion and attachment plate of the support element. The attachment elements thus may not be molded at the back portion, or other attachment elements may be molded for attaching a circuit board or the like at the molded attachment plate of the support element.

Optionally, the molded support element 750, 750' may have or include or incorporate stiffening elements, such as stiffening ribs or plates or the like, positioned thereon or insert molded therein, in order to provide a stiffening function to the support element. Such stiffening elements or plates or the like may provide enhanced structural robustness to limit or substantially preclude flexing and breaking of the reflective element if the reflective element is impacted. Such a stiffening function is desirable since the reflective element is substantially frameless, whereby an impact to the front of the mirror assembly may be substantially absorbed by the reflective element instead of a bezel portion of a mirror casing. Such a stiffening function may thus be desirable and may assist in meeting impact and/or bending regulations/requirements, such as set forth in a French Bend test (such as is known in the automotive mirror safety testing arts) or the like. For example, the French Bend test requires that the reflective element withstand bending when impacted or struck by a large ball member. Because prior art mirror assemblies include bezel portions, the ball member (which is a large size relative to the width or height of the reflective element) often impacts the bezel portion and not the reflective element, such that the impact is substantially absorbed by the bezel portion. Thus, the stiffening function of the support element may be desired to assist the substantially frameless reflective element of the present invention in absorbing the impact and not over bending or flexing during such testing. Optionally, other elements, such as heating elements and/or the like (such as heating elements of the types described in U.S. provisional applications, Ser. No. 60/644,903, filed Jan. 19, 2005; and Ser. No. 60/667, 049, filed Mar. 31, 2005, which are hereby incorporated herein by reference) may be insert molded in and/or attached to the back portion of the support element.

The support element of the present invention thus provides a support function for the reflective element to substantially support and encase the reflective element within the plastic or polymeric pocket of the support element. The support element may also provide a mounting function, such as via a unitary mounting plate or mounting structure or via attachment elements for attaching to a mounting plate or structure. The support element may also provide a stiffening function via stiffening elements or via the material selected for the support element, in order to provide enhanced structural rigidity and strength to the reflective element and support element assembly. The support element of the present invention provides such functions while also providing a substantially frameless reflective element for a substantially frameless mirror assembly. The reflective element and support element assembly may be readily installed in or at a mirror casing and/or mounting structure, with the electrical connections between the reflective element conductive coatings (and optionally a heater or heater pad at the rear surface of the reflective element) and the associated circuitry and connections at a circuit board or backing plate or the like being made as the reflective element and support element assembly is attached to the backing plate or circuit board or the like.

The support element of the present invention also provides an enhanced appearance to the reflective element assembly and mirror assembly. The lip portion may slightly overlap or overlay the cut edge at the perimeter edge of the front substrate, and the sidewalls/structure of the support element may overlay the side edge (the thickness dimension of the front substrate) of the reflective element and thus may cover or conceal any sparkling or chips that may be present on or at the perimeter edge so that any such sparkling or chips or imperfections at or on the perimeter region of the reflective element may not be readily viewable by the driver or occupant of the vehicle. Also, it is envisioned that the support element may be molded or formed to have a desired or selected color and/or texture and/or design/appearance, so as to provide a desired cosmetic appearance to the reflective element and to the mirror assembly. Also, the presence of the slight lip portion and/or the sidewall/side structure of the support element help camouflage and/or mask edge imperfections even from indirect view or angled view from the front of the mirror reflector due to the multiple reflections at the edge caused by the mirror reflector, and as outlined in U.S. Pat. No. 5,066,112, which is hereby incorporated herein by reference.

In accordance with the present invention, a manufacturer of an electro-optic cell or reflective element can ship from the manufacturing plant (or from an assembly point in the manufacturing plant or facility) an electro-optic or electrochromic cell (with or without electrical connectors and the like) having raw edges to the assembly or molding station. At the assembly or molding stations, the cell may be inserted into the support element or the support element may be molded over the cell to form a cell subassembly. The cell subassembly (which includes the reflective element or cell and the support element) may be provided to an interior rearview mirror maker or manufacturer, where the appropriate or desired back plate or attachment plate or toggle plate may be attached to the back of the support element.

Preferably, the reflective element or cell subassembly is assembled into the mirror casing/assembly by assembling along a common axis or z-axis, such as described in U.S. patent application Ser. No. 10/933,842, filed Sep. 3, 2004, now U.S. Pat. No. 7,249,860, which is hereby incorporated herein by reference. Preferably, the back plate and/or circuit board does not have structure that limits the plate or board from moving along the common axis or z-axis and into engagement/contact with the support element. Desirably, a display element or device may be positioned on the rear side of the circuit board and in alignment with a hole through the circuit board so that the circuit board may be moved along the z-axis and into substantial engagement with the back surface of the support element with little structural elements between the circuit board substrate and the back surface of the support element.

Therefore, the present invention provides a unitarily molded or formed mounting assembly, with the toggle portion and/or channel mount molded over the ends of the mounting arm. The mounting arm may include a ball member or partial ball member at one or both ends for pivotally attaching the mounting arm to the toggle portion and/or the channel mount when the toggle portion and/or channel mount is/are molded over the ball members of the mounting arm. The molded or pre-formed mounting arm may be inserted or loaded into a mold and the toggle portion and channel mount may be molded over the ends of the mounting arm to form the mounting assembly via a unitary molding process. The pivot joints defined by the ball members and overmolded portions may provide different frictional resistance to provide different threshold torques for pivoting the mirror assembly or mounting arm about the respective pivot joints. For example, the mounting assembly may provide different surface conditions or different materials or the like to provide different torques at the pivot joints of the mounting assembly. The present invention thus provides for in mold forming of a socket around a ball member or ball members that is/are pre-formed and inserted into the mold cavity. The polymeric socket and/or mounting base may be molded over a metallic insert to provide the mounting structure and structural integrity at the base. The base may include an electrical element or component, such as an accessory or sensor or circuitry or circuit board or connector or the like, and may connect to a conductor that is molded in and along the support or mounting arm.

Optionally, other components can be overmolded along with those described above, including, for example, a mirror housing or casing. Also, aspects of the present invention are applicable broadly. For example, a support arm with integrally molded wire harness such as described above can be formed, and a mirror mount or base (and/or a back plate/toggle) can be attached thereto by other than overmolding (such as by mechanical attachment with spring-established torque at ball joints, such as is disclosed in U.S. Pat. Publication No. US2002/0088916, now U.S. Pat. No. 6,877,709, incorporated above). By combining the metallic portions with an overmolded plastic portion, the present invention provides advantages of both materials, the rigidity of metal and the flexibility and resilience of plastic in a single component/part. The present invention provides economical constructions and methods of fabrication for double ball interior mirror assemblies with integrated wire management so that wires emanating from the vehicle roof area may enter the interior mirror assembly (such as via a plug or socket connector integrated into the mirror mount or base portion of the assembly), and then, hidden from view of a vehicle occupant, may pass through the first ball joint (proximate to the location or attachment of the mirror mount or base to a mirror mounting button on the windshield), and then may pass through the mirror support arm, and then may pass through the second ball joint (that allows the mirror housing or casing to pivot about the support arm), and thus may pass into the cavity formed by the mirror housing or casing, in order to supply electrical power and signals to and from electronic components and circuitry disposed within the head of the interior mirror assembly.

Figure 27:
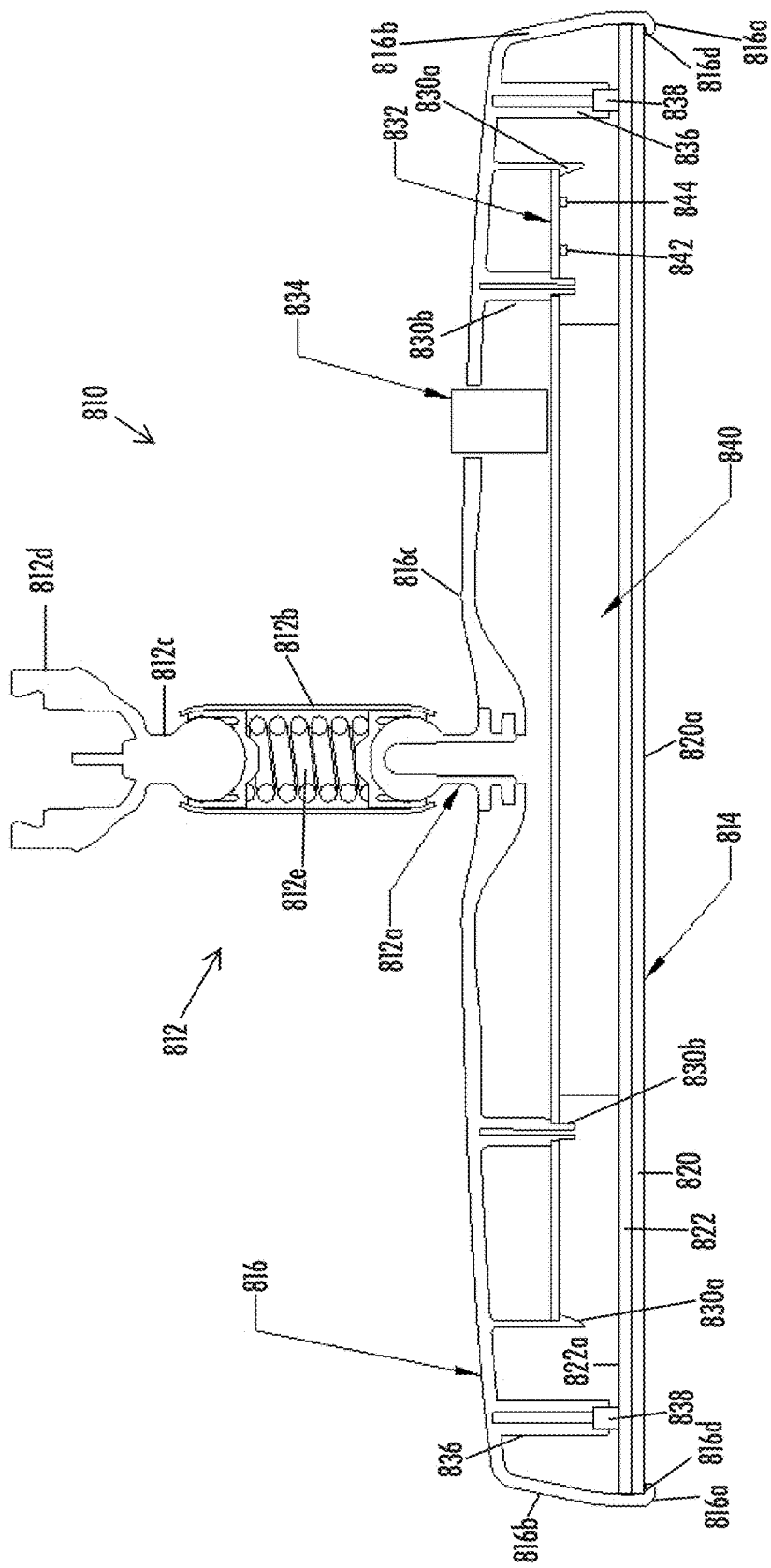
FIG. 27 is a sectional view of another rearview mirror assembly in accordance with the present invention.

Optionally, and with reference to FIG. 27, a mirror assembly 810 includes a reflective element assembly 814 that is received at least partially in a molding or casing or housing 816, which is mounted to an interior portion of the vehicle via a mounting arrangement 812. Casing 816 comprises a unitarily molded or formed casing that includes an outer rim or bezel portion 816a for receiving and retaining reflective element assembly 814 at casing 816. The reflective element assembly 814 comprises an electro-optic reflective element assembly or cell, such as an electrochromic reflective element assembly or cell, and includes a front substrate 820 and a rear substrate 822, with an electro-optic medium (not shown in FIG. 27) sandwiched therebetween, such as described above. The electro-optic reflective element assembly 814 may be readily installed or received in the casing and retained therein via the outer rim portion 816a, as discussed below.

Casing 816 includes outer rim portion 816a, side walls 816b and a rear wall 816c that define a cavity therewithin. Rear wall 816c may attach to or receive or may be molded over a ball stud or ball member 812a of mounting arrangement 812. For example, the ball stud 812a may be insert molded within a portion of rear wall 816c to affix ball stud 812a to casing 816 via a plurality of tabs of ball stud 812a that have the material of casing 816 molded over and around to retain and substantially secure the ball stud to the casing. The ball stud 812a may be received within a mounting arm 812b, which in turn may pivotally receive another ball member 812c of a mounting base or channel mount 812d. The channel mount 812d is attached to an interior surface of the vehicle to attach the mirror assembly to the vehicle. The mounting arrangement 812 includes a spring or biasing element 812e for urging the ball members 812a, 812c outward relative to mounting arm 812b to provide the desired frictional resistance to pivotal movement at each ball member. The mounting arm and/or ball members may utilize aspects of the mounting arrangements described above.

Casing 816 includes a plurality of tabs or retaining clips 830a and retaining or support posts 830b for retaining a printed circuit board 832 or other circuitry element within casing. The posts 830a function to space the circuit board 832 at the desired location from the rear wall 816c, while the tabs 830a snap or clip to the circuit board to retain the board or substrate at the desired location on the posts. Mirror assembly 810 also includes an electrical connector 834, such as a multi-pin connector for electrically connecting the circuit board and circuitry of the mirror assembly to a wire harness or the like of the vehicle. The connector may protrude through rear wall 816c so as to be accessible at the rear of the mirror assembly for connection thereto when the mirror assembly is installed in a vehicle.

Mirror casing 816 also includes a plurality of webs or support posts 836 extending from rear wall 812c and toward reflective element assembly 814. Support posts 836 may include a tensioning or biasing element 838 therein or therealong for engaging a rear surface 822a of rear substrate 822 of reflective element 814 to urge the reflective element forward or outward to maintain engagement of the front surface 820a of front substrate 820 at a lip 816d of outer rim portion 816a of casing 816. A foam element or anti-scatter element 840 may be disposed between the rear surface 822a of rear substrate 822 of reflective element 814 and the printed circuit board 832 to support the reflective element at its generally central region. Optionally, the side walls 816b of casing 816 may include notches or grooves or regions of reduced thickness so as to enhance flexing of the side walls as the reflective element is inserted into the casing, such as grooves or channels that function in a similar manner as the groove or notch portion 758 of support 750, discussed above with respect to FIG. 25. The side walls thus may flex outwardly as the reflective element is inserted into the casing and then may flex back toward the initial orientation after the reflective element is positioned inward of the bezel or rim portion 816b, with the rim portion covering a perimeter region of the front surface of the reflective element and substantially retaining the reflective element within the casing.

Preferably, reflective element 814 comprises a non-offset reflective element or a reflective element with the rear substrate smaller across at least one dimension so that the front substrate extends outwardly past the edges of the rear substrate, such that the perimeter of the front substrate defines the profile or footprint of the reflective element. The profile is thus set by the relatively predictable dimensions of the front substrate only, and thus is substantially consistent for a particular application, since variations or uncertainties in the degree of offset that may arise when the front and rear substrates are offset will thus not affect the profile of the reflective element. The present invention thus may be particularly suited for exterior mirror applications and/or mirror applications with a "frameless" reflective element having a flush or near flush front substrate to rear substrate alignment, such as having a recessed rear substrate (where the front substrate extends past the edges of the rear substrate to define overhang regions along the respective edge regions). The reflective element thus may be readily inserted into the casing and may be substantially retained therein when positioned within the casing and with the outer rim portion overlapping the perimeter edge of the front substrate and a perimeter portion of the front substrate.

Optionally, a photo sensor or glare sensor 842 may be positioned at the circuit board to detect or sense light or glare through the reflective element, while a display element or indicator 844 may be positioned at the circuit board to emit or transmit light or display information through the reflective element for viewing by the driver of the vehicle. The reflective element may have a window formed in its reflective coating or may comprise a transflective reflective element such as the types described below. The sensor and/or display element may be positioned remote from the foam element or may be positioned behind the foam element, whereby the foam element may have a corresponding passageway or opening formed therethrough to provide a light conduit between the reflective element and the sensor or display element.

The unitary casing 816 of the present invention thus provides enhanced assembly of the mirror assembly. The ball stud may be insert molded within the rear wall of the casing to provide a unitary construction of the casing and ball member. The printed circuit board (or other circuitry element or elements) may be readily inserted into the casing and snapped in place within the cavity of the casing, and the reflective element may be inserted into the casing and snapped in place via the lip or tab or perimeter rim portion of the casing. When the reflective element is received within the casing, the biasing elements urge the reflective element outward and into engagement with the perimeter tabs or lips of the perimeter rim portion to substantially retain the reflective element in place within the unitary casing. The foam element (or similar or other resilient member, such as a rubber pad or a similar resilient, spring-like member, that urges the reflective element into tight engagement with the rim portion of the mirror casing) may be positioned at the rear surface of the reflective element or at the circuit board or element prior to assembly of the reflective element to the casing. The foam or similar resilient element may be adhesively faced, such as via a pressure sensitive adhesive, so as to provide an anti-scatter feature when it urges to and adheres to the rear of the reflective element, and may reduce vibration of the reflective element. The mirror assembly thus may be readily assembled via insertion of the components into the unitary casing, and without having to separately secure or retain a bezel portion to a rear casing portion.

Optionally, the circuit board or circuitry or casing or mirror assembly may include electrical contacts for contacting contacts at the rear surface of the reflective element or cell as the cell is inserted into and retained in the casing, so that the electrical contacts to the reflective element or cell (such as to power the conductive coatings of the cell or to power a heater pad or the like at the cell) are made as the reflective element is inserted or loaded into the casing of an interior mirror or a back plate of an exterior electrochromic subassembly. For example, electrical contacts may extend outwardly from the circuit board or element when the circuit board or element is loaded into the casing to establish electrical conductivity between the circuitry of the circuit element and the reflective element. Optionally, the electrical contacts may be insert molded in the casing side walls or in webs or tabs of the casing so as to make the appropriate electrical contacts and connections to the contacts at the rear surface of the reflective element as the reflective element is loaded into the casing. The insert molded electrical contacts may connect to the contacts at the reflective element and may contact and connect to other electrical circuitry, such as to contacts on the circuit board or element as the circuit board or element is loaded into the casing, or such as to contacts or connectors of a vehicle wire harness or the like at the rear of the casing.

The electrical contacts of the circuit board or element or casing or circuitry of the mirror assembly may be biased or spring-loaded or resiliently urged so as to urge against the contacts at the rear surface of the reflective element to substantially ensure firm and reliable electrical connection between the contacts when the reflective element is inserted or loaded or pressed into the casing. The contacts thus provide a tight fit against the contacts of the rear surface of the reflective element by urging against the rear surface of the reflective element while the outer rim portion of the casing limits outward movement of the reflective element, such that the reflective element is tightly received between the outer rim or bezel portion of the casing and the posts of the casing and the electrical contacts of the circuit element and/or casing. The contacts may provide power and ground to the conductive coatings of the reflective element and/or may provide power and ground to a heater pad at the rear surface of the rear substrate (such as for exterior mirror applications) and/or may provide power and/or ground to other accessories or circuitry at the reflective element.

Therefore, the mirror assembly of the present invention may be readily assembled with the electrical connections being made during the snap-together assembly processes. The casing may be molded of a polymeric material (such as polypropylene or the like), and may be configured or molded or formed to receive and retain a printed circuit board or circuit substrate or element or circuitry therein. The circuit element may be inserted into the casing and snapped to the snap clasps or the like formed within the cavity of the casing. When inserted or loaded into the casing, the circuit element may connect to or may include a connector (such as a multi-pin connector or the like) that may be positioned at or through an opening in the rear wall of the casing for electrical connection to a vehicle wire harness or the like at the rear of the mirror assembly. Optionally, the circuit board or element may electrically contact one or more contacts that are insert molded within the casing to establish electrical connection to other circuitry or connectors of the casing and mirror assembly.

The reflective element may then be readily inserted into the casing, whereby the side walls of the casing may flex or spring outwardly to allow for insertion of the reflective element into the casing. The side walls may flex or spring toward their initial orientation when the reflective element is loaded into the casing, so that the outer rim portion of the casing engages the perimeter region of the front substrate of the reflective element to substantially retain the reflective element within the casing. As the reflective element is inserted or loaded into the casing, electrical contacts on the circuit element (or on or in the casing) may contact corresponding or appropriate contacts at the rear surface of the reflective element to establish electrical connection and conductivity between the circuitry of the circuit element (or casing or mirror assembly) and circuitry of the reflective element. The electrical contacts may urge toward and against the contacts on the rear surface of the reflective element when the reflective element is received and snapped in the casing so as to maintain firm and reliable electrical contact with the contacts at the rear surface of the reflective element. The present invention thus allows for loading of circuitry and accessories and the like within the casing and then loading of the reflective element into the casing whereby electrical connections may be made during the loading or snapping assembly processes.

Optionally, the mirror assembly of the present invention may include one or more user actuatable inputs or input devices or human machine interfaces. For example, the inputs or user interfaces may include buttons, such as are described in U.S. Pat. No. 6,501,387, which is hereby incorporated herein by reference, or that include touch/proximity sensors such as are disclosed in U.S. Pat. Nos. 6,001,486; 6,310,611; 6,320,282 and 6,627,918, and U.S. patent application Ser. No. 09/817,874, filed Mar. 26, 2001, now U.S. Pat. No. 7,224,324, and PCT Application No. PCT/US03/40611, filed Dec. 19, 2003, which are hereby incorporated herein by reference, or that include other types of buttons or switches, such as those described in U.S. patent applications, Ser. No. 11/029,695, filed Jan. 5, 2005, now U.S. Pat. No. 7,253,723; and/or U.S. Ser. No. 11/140,396, filed May 27, 2005, now U.S. Pat. No. 7,360,932; and/or U.S. provisional applications, Ser. No. 60/690,401, filed Jun. 14, 2005; Ser. No. 60/556,259, filed Mar. 25, 2004; Ser. No. 60/553,517, filed Mar. 16, 2004; and/or Ser. No. 60/535,559, filed Jan. 9, 2004; and/or PCT Application No. PCT/US2004/015424, filed May 18, 2004, which are hereby incorporated herein by reference, or that include fabric-made position detectors, such as are disclosed in U.S. Pat. Nos. 6,504,531; 6,501,465; 6,492,980; 6,452,479; 6,437,258 and 6,369,804, which are hereby incorporated herein by reference. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

Optionally, two or more inputs or buttons may be positioned adjacent to or near to one another, such as at the mirror assembly or accessory module or windshield electronics module. The buttons or switches or inputs may be selectively/individually activated by a user to activate/deactivate/control/adjust the corresponding accessory or device or feature/function. The control or mirror assembly or accessory module or windshield electronics module may include circuitry or logic that functions to desensitize one of the buttons or inputs when an adjacent button or input is activated, in order to limit or substantially preclude inadvertent activation of both buttons or inputs. For example, three buttons, such as for a garage door opening system of the vehicle, may be positioned adjacent to or near to one another. If one of the buttons is activated, such as by touching of the button with a person's finger or by close proximity of a person's finger to the button, then the logic or control may desensitize the other two buttons to limit inadvertent activation of the other buttons when the function associated with the first button activated was desired. Optionally, if two buttons or inputs are substantially simultaneously activated, the control or logic may function to desensitize the third button or input to limit or substantially preclude inadvertent activation of the third button or input. The non-activated input or inputs may be desensitized for a period of time following the activation of the first input or inputs, and then re-sensitized so that a user may subsequently activate the other input or inputs. Note, sensitivity of such a system may be set so as to be responsive to a gloved finger or the like.

Optionally, a reflective optical sensor capable of operating in bright sunlight and available from Vishay Intertechnology, Inc. of Malvern, Pa., may be used in conjunction with the interior mirror assemblies and/or windshield electronics modules/accessory modules of the present invention. For example, a TCND3000 surface-mount optical sensor, which integrates touch and proximity functions and operates in conjunction with an integrated circuit (E909.01) built on ELMOS Semiconductor's HALIOS® (High Ambient Light Independent Optical System) technology (available from ELMOS Semiconductor AG of Dortmund, Germany) to provide reliable operation in very bright sunlight up to 200 kLux, may be used as an economical alternative to mechanical switches.

The TCND3000 series device is highly integrated and combines an infra-red (IR) emitter as the source for the touch/proximity signal, another for compensation for ambient light, and a photo diode as the receiver for the touch/proximity signal to allow (working with the electrical signal evaluation system provided by the ELMOS E909.01 IC) contact-free detection of movement through a translucent surface, and enabling proximity detection at a distance of about 2 cm and touch detection at a distance at a distance of about 1 cm from the sensor surface. As a result, the sensor may be contained within a clear protective or decorative casing without loss of sensitivity. The self-adjusting system compensates for environmental disturbances such as ambient light, aging of optical components, and surface impurities or scratches. Such TCND3000 sensors measure about 5 mm by about 2.6 mm with a height profile of about 3 mm. These RoHS (restriction of hazardous substances)-compliant devices are available in a lead (Pb)-free, surface-mount-style package constructed on PCB mold technology. Each features a 5 Volt operating voltage, a ±20 degree angle of half-sensitivity, an 870-nm operating wavelength, and an operating temperature range of −40 degrees Celsius to +85 degrees Celsius. Such devices are designed for IR reflow soldering with a peak temperature of 260 degrees Celsius and therefore are suitable for lead-free solder processes.

Optionally, the mirror assembly may include one or more accessories incorporated onto the printed circuit board or positioned elsewhere at or within the mirror casing or at or within an accessory module or windshield electronics module associated with the interior rearview mirror assembly. For example, the accessory or accessories may include one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot or object detection system, such as imaging or detection systems of the types disclosed in U.S. Pat. Nos. 5,929,786 and/or 5,786,772, and/or U.S. patent application Ser. No. 10/427,051, filed Apr. 30, 2003, now U.S. Pat. No. 7,038,577, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093; and/or U.S. provisional applications, Ser. No. 60/607,963, filed Sep. 8, 2004; and Ser. No. 60/562,480, filed Apr. 15, 2004; and/or U.S. patent application Ser. No. 11/105,757, filed Apr. 14, 2005, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897; and/or PCT Application No. PCT/US03/40611, filed Dec. 19, 2003, and/or U.S. provisional applications, Ser. No. 60/630,061, filed Nov. 22, 2004; and Ser. No. 60/667,048, filed Mar. 31, 2005, a remote keyless entry receiver or system or circuitry and/or a universal garage door opening system or circuitry (such as the types disclosed in U.S. Pat. Nos. 6,396,408; 6,362,771; 5,798,688 and 5,479,155, and/or U.S. patent application Ser. No. 10/770,736, filed Feb. 3, 2004, now U.S. Pat. No. 7,023,322), lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253 and/or 5,669,698, and/or U.S. patent application Ser. No. 10/054,633, filed Jan. 22, 2002, now U.S. Pat. No. 7,195,381, microphones, such as disclosed in U.S. Pat. Nos. 6,717,524; 6,650,233; 6,243,003; 6,278,377 and/or 6,420,975, and/or PCT Application No. PCT/US03/30877, filed Oct. 1, 2003, speakers, a compass or compass system, such as disclosed in U.S. Pat. Nos. 5,924,212; 4,862,594; 4,937,945; 5,131,154; 5,255,442 and/or 5,632,092, and/or U.S. patent application Ser. No. 10/456,599, filed Jun. 6, 2003, now U.S. Pat. No. 7,004,593; and/or U.S. provisional application Ser. No. 60/636,931, filed Dec. 17, 2004, a navigation system, such as described in U.S. Pat. No. 6,477,464, and U.S. patent applications, Ser. No. 10/456,599, filed Jun. 6, 2003, now U.S. Pat. No. 7,004,593; U.S. Ser. No. 10/287,178, filed Nov. 4, 2002, now U.S. Pat. No. 6,678,614; U.S. Ser. No. 10/645,762, filed Aug. 20, 2003, now U.S. Pat. No. 7,167,796; and U.S. Ser. No. 10/422,378, filed Apr. 24, 2003, now U.S. Pat. No. 6,946,978; and/or PCT Application No. PCT/US03/40611, filed Dec. 19, 2003, a tire pressure monitoring system, such as the types disclosed in U.S. Pat. Nos. 6,294,989; 6,445,287 and/or 6,472,979, and U.S. provisional application Ser. No. 60/611,796, filed Sep. 21, 2004, a seat occupancy detector, a vehicle occupancy detector, such as the type described in U.S. provisional application Ser. No. 60/630,364, filed Nov. 22, 2004, a trip computer, a telematics system, such as an ONSTAR® system or the like, and/or any other desired accessory or system or the like (with all of the above-referenced patents and patent applications and PCT applications and provisional applications being commonly assigned, and with the disclosures of all of the above referenced patents and patent applications and PCT applications and provisional applications being hereby incorporated herein by reference in their entireties).

The accessory or accessories may be positioned at or within the mirror casing and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as BLUETOOTH™, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. patent application Ser. No. 10/456,599, filed Jun. 6, 2003, now U.S. Pat. No. 7,004,593, which is hereby incorporated herein by reference, without affecting the scope of the present invention.

Optionally, a variety of display types or screens can be utilized in conjunction with an interior rearview mirror assembly or windshield electronics module/accessory module of the present invention. For example, the mirror assembly or module may include or be associated with display elements, such as described in U.S. Pat. Nos. 6,329,925 and 6,501,387, which are hereby incorporated herein by reference, or such as a display on demand type of display, such as of the types disclosed in commonly assigned U.S. Pat. Nos. 6,690,268; 5,668,663 and 5,724,187, and/or in U.S. patent application Ser. No. 10/054,633, filed Jan. 22, 2002, now U.S. Pat. No. 7,195,381, and/or in PCT Application No. PCT/US03/29776, filed Sep. 19, 2003, and U.S. provisional applications, Ser. No. 60/412,275, filed Sep. 20, 2002; Ser. No. 60/424,116, filed Nov. 5, 2002; and Ser. No. 60/489,816, filed Jul. 24, 2003, which are all hereby incorporated herein by reference. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. patent applications, Ser. No. 10/956,749, filed Oct. 1, 2004, now U.S. Pat. No. 7,446,924, and/or U.S. Ser. No. 10/993,302, filed Nov. 19, 2004, now U.S. Pat. No. 7,338,177, and/or PCT Application No. PCT/US03/29776, filed Sep. 19, 2003; PCT Application No. PCT/US03/35381, filed Nov. 5, 2003, and U.S. provisional applications, Ser. No. 60/490,111, filed Jul. 25, 2003; and Ser. No. 60/423,903, filed Nov. 5, 2002; and/or PCT Application No. PCT/US03/40611, filed Dec. 19, 2003, which are all hereby incorporated herein by reference. Such display elements, such as a high intensity OLED or the like, may emit light with a high intensity through the coatings of the reflective element for a display on demand (DOD) transflective type of display. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854 and 6,420,036, and in PCT Application No. PCT/US03/29776, filed Sep. 9, 2003, which are all hereby incorporated herein by reference. Such display devices may transmit the display information or illumination through a transflective, third surface reflective element assembly, such as described in U.S. Pat. Nos. 5,668,663; 5,724,187 and 6,690,268, and/or in U.S. patent application Ser. No. 10/054,633, filed Jan. 22, 2002, now U.S. Pat. No. 7,195,381, and/or in PCT Application No. PCT/US03/29776, filed Sep. 19, 2003, which are all hereby incorporated herein by reference.

Although such transflective reflective element assemblies are capable of transmitting the illumination or display information through the assembly, it is sometimes desirable to provide a window in the metallic reflective coating through which the display information or illumination may be transmitted. Typically, such windows in the reflective coating of transflective reflective element assemblies are desirable for a glare sensor (such as a photo sensor or the like, such as a glare sensor and/or an ambient light sensor and electrochromic automatic dimming circuitry described in U.S. Pat. Nos. 6,447,124; 4,793,690 and 5,193,029, and U.S. patent application Ser. No. 10/456,599, filed Jun. 6, 2003, now U.S. Pat. No. 7,004,593, which are all hereby incorporated herein by reference) or the like to be positioned at, in order to allow substantial transmission of light from the rear of the mirror assembly or vehicle through the reflective element assembly to the glare sensor positioned within the mirror assembly.

Optionally, for example, the display or display element or display device may utilize any of the liquid crystal type display or video screens (such as the types disclosed in PCT Application No. PCT/US03/40611, filed Dec. 19, 2003, and/or U.S. provisional applications, Ser. No. 60/630,061, filed Nov. 22, 2004; and Ser. No. 60/667,048, filed Mar. 31, 2005, which are hereby incorporated herein by reference). Also, a microdisplay (such as is available from MicroVision Inc. of Bothell, Wash.), in which a single scanner is used to direct multiple light beams simultaneously into separate zones of an image so as to deliver a bright, high resolution, image over a wide field of view, can be used. Such a microdisplay may utilize conventional surface emitting or other types of light emitting diodes (LEDs) as light sources to provide an economical display with sharp resolution and high image brightness. For example, multiple red, green and blue LEDs or red, blue and green laser diodes can be used to write several million red, green, and blue spots that integrate to form a single high-fidelity image in a mega pixel display image. Such scanning display technologies can utilize a biaxial microelectromechanical scanner (MEMS) and other display/mechanical and electronic devices, such as are disclosed in U.S. Pat. Nos. 6,714,331; 6,795,221 and 6,762,867, which are hereby incorporated herein by reference, and can provide increased spatial resolution. Such displays can deliver an image with a full 30-degree horizontal field of view or more. Such a microdisplay/MEMS device can, for example, be placed in the mirror housing behind the mirror reflective element in an interior (or exterior) mirror assembly such that the image is projected onto the rear of the mirror reflective element, such as is disclosed in U.S. patent applications, Ser. No. 10/225,851, filed Aug. 22, 2002, now U.S. Pat. No. 6,847,487; and/or U.S. Ser. No. 11/105,757, filed Apr. 14, 2005; and/or U.S. provisional application Ser. No. 60/607,963, filed Sep. 8, 2004, which are hereby incorporated herein by reference.

If the mirror reflector of the mirror element is of the transflective (substantially reflective and at least partially transmitting to light) type, the driver or other occupant in the interior cabin of the vehicle can view the image (being back-projected onto the rear of the mirror reflective element) by viewing the mirror reflective element. This is because the front surface of the reflective element will typically reflect about 4 percent of the light incident on the reflective element toward the driver of the vehicle. Thus, if the display illumination (projected through the reflective element from behind the reflective element and within the mirror casing) does not dominate or distinguish over the reflectance off of the front surface of the mirror reflective element, the display illumination and information may appear washed out due to the reflected image that is reflecting off of the front surface of the reflective element. Such washout may be particularly noticeable during high ambient lighting or daytime lighting conditions. Because such back-projected microdisplays can have a very high image brightness (due to use of very high brightness LEDs, preferably organic LEDs (OLEDs), or lasers as illuminators), image wash-out during driving under high ambient lighting conditions (such as on a sunny day) is reduced using such scanning image microdisplay technology compared to use, for example, of TFT LCD displays.

Optionally, such microdisplays or TFT LCD displays or the like may incorporate a cooling device to reduce the temperature surrounding the device to provide enhanced performance of the device in high ambient temperature conditions. Typically, such LCD screens and the like may be selected to perform within a specified temperature range. If a greater operating temperature is desired, a display device that is capable of operating at the higher temperatures may be selected, typically at a cost premium for the greater operating range. In some situations, it may be cost effective to utilize a lower range or lower temperature display device and utilize a heating and/or cooling device at or near or attached to the display device (such as to a rear surface of the LCD display) to heat and/or cool the display device when the temperature at the display device is below or above the range of the display device. For example, a thermoelectric module, such as a Peltier device, may be utilized. Such thermoelectric modules are typically small solid-state devices that function as heat pumps. The module may comprise a sandwich formed by two ceramic plates with an array of small Bismuth Telluride cubes ("couples") or the like in between. When a current is applied to the module, heat may be moved from one side of the device to the other—where it may be dissipated or removed with a heat sink or the like. The "cold" side may be used to cool the display device. If the current is reversed, such thermoelectric modules may perform a heating function. Such a Peltier device thus may be positioned in direct contact with the rear of the LCD screen so that the Peltier device can thermally cool or heat the LCD screen by conduction of heat to the screen or extraction of heat from the screen. The Peltier device thus may provide rapid heating or cooling of the display device so that the temperature at the display device is within the desired or appropriate range.

Also, such MEMS technology can be used in a heads-up-display (HUD) system, such as the MicroHUD™ head-up display system available from MicroVision Inc. of Bothell, Wash. (and such as described in U.S. patent application Ser. No. 11/029,695, filed Jan. 5, 2005, now U.S. Pat. No. 7,253,723, which is hereby incorporated herein by reference). This provides a compact heads-up display capable of meeting specific size and performance specifications. For example, MicroVision's MicroHUD™ combines a MEMS-based micro display with an optical package of lenses and mirrors to achieve a compact high-performance HUD module that reflects a virtual image off the windscreen that appears to the driver to be close to the front of the car. This laser-scanning display can outperform many miniature flat panel LCD display screens because it can be clearly viewed in the brightest conditions and also dimmed to the very low brightness levels required for safe night-time driving.

The high-resolution MicroHUD™ display may be completely reconfigurable, enabling virtually any content to be displayed, including video or animated icons and graphics. Advantageously, such a MicroHUD™ display unit may be included at or within an interior rearview mirror assembly or a windshield electronics module/accessory module so as to project its image therefrom onto the inner surface of the windshield. This unique packaging of a HUD or projection image displayer into an interior rearview mirror assembly or a windshield electronics module/accessory module has advantages over conventional placement of such HUD projectors into the dashboard of the vehicle. These advantages include that the HUD image projector need not find space in an already crowded dashboard (where, for example, a center information cluster may want space or where HVAC ducts/components may run). Also, incorporation of the HUD projector in the likes of the mounting portion of the interior mirror assembly or into a windshield electronics module/accessory module can allow a HUD display to be provided more readily as an optional accessory for the vehicle or as a dealership option or aftermarket device. A variety of images (such as, for example, iconistic or graphical or video or textural or alphanumerical or numerical or the like) can be displayed, such as information from a side object/blind spot monitoring system and/or alert system and/or display device or system, such as the types described in U.S. Pat. No. 5,929,786, and/or U.S. patent applications, Ser. No. 10/427,051, filed Apr. 30, 2003, now U.S. Pat. No. 7,038,577; and/or U.S. Ser. No. 10/209,173, filed Jul. 31, 2002, now U.S. Pat. No. 6,882,287, and/or U.S. provisional applications, Ser. No. 60/638,687, filed Dec. 23, 2004; Ser. No. 60/696,953, filed Jul. 6, 2005; and/or Ser. No. 60/171,093, filed Sep. 14, 2005, which are all hereby incorporated herein by reference.

As disclosed in U.S. patent application Ser. No. 10/209,173, filed Jul. 31, 2002, now U.S. Pat. No. 6,882,287, incorporated above, a controller may be provided, such as a microprocessor including a digital signal processor microcomputer of CPU speed at least about 5 MIPS, more preferably at least about 12 MIPS and most preferably at least about 30 MIPS, that processes inputs from multiple cameras and other sensors.

A control may comprise a central video processor module such as is disclosed in provisional patent application Ser. No. 60/309,023, filed Jul. 31, 2001. Such video processor module operates to receive multiple image outputs from vehicle-mounted cameras, such as disclosed in patent application Ser. No. 09/793,002, filed Feb. 26, 2001, now U.S. Pat. No. 6,690,268, and integrates these in a central processing module to allow reaction to the local vehicle environment. Optionally, and when bandwidth limitations exist that limit the ability to send raw image data, particularly high-resolution images, from a remote camera to a central processing unit across robust transmission means, such as a fiber-optic cable or a high-density wireless link, distributed processing can occur, at least local to some of the image capture sensors. In such an at least partial distributed processing environment, the local processors are adapted to preprocess images captured by the local camera or cameras and any other device such as a Doppler radar sensor viewing a blind spot in an adjacent side lane and to format this preprocessed data into a standard format and transmit this standard formatted data. The data can be transmitted via a wired network or a wireless network or over a vehicle bus system, such as a CAN bus and/or a LIN bus, or the like, to the central processor for effective, centralized mapping and combination of the total local environment around the vehicle. This provides the driver with a display of what is happening in both the right and the left side lanes, and in the lane that the host vehicle is itself traveling in.

In this regard, the vehicle can be provided with a dedicated bus and central processor, as described above, for providing a vehicle environment awareness, which can be both internal such as might be provided by interior cabin or trunk monitors/sensors that determine occupant presence, head position and/or movement, eye movement, air bag deployment, microphone aiming, seat positioning, air conditioning and/or heating targeting, audio controls, and the like, or can be external to the vehicle such as in blind spot detecting or lane change detecting. An automatic environment awareness function may be provided that comprises automatic gathering of sensor-derived data collection and transmission in a standard format via a vehicle bus network, said data including data relating to the vehicle environment such as the exterior environment, for example, the presence of rear-approaching traffic in side and rear lanes to the host vehicle as captured by rear-facing CMOS or CCD cameras on the side of the host vehicle, such as included in a side view mirror assembly on either or both sides of the host vehicle and/or as detected by a rear lane/side lane-viewing Doppler radar sensor, and preferably includes processing in a central video processing unit.

Outputs from video and non-video sensors can be fused, such as, for example, a CMOS video camera sensor and a Doppler radar sensor, to allow all-weather and visibility side object detection. Fusion of outputs from video and non-video sensors, such as, for example, a CMOS video camera sensor and a Doppler radar sensor, can occur to allow all-weather and visibility side object detection.

Collision avoidance functionality can optionally be achieved using a forward-facing camera. For example, should the forward-looking camera detect an oncoming car likely to collide with the vehicle equipped with the present invention, or if another vehicle tries to pull in front of it, the system of the present invention can issue a warning (visual and/or audible) to one or both drivers involved. Such warning can be flash headlights and/or sound car horn. Similarly, the system can detect that the driver of the vehicle equipped with the present invention is failing to recognize a stop sign and/or a signal light, or some other warning sign and the driver can be warned visually, such as with a warning light at the interior mirror in the vehicle cabin, or audibly, such as via a warning beeper, or tactilely, such as via a rumble/vibration transducer that vibrates the steering wheel to alert the driver of a potential hazard.

Also, the vehicle can be provided on its front fender or elsewhere at the front of the vehicle with a side-looking camera as an image-based detector operable to warn the driver when he/she is making a left turn across lanes of traffic coming from his/her left (left-side warning) and then again when he/she is about to enter traffic lanes with traffic coming from his right (right-side warning).

As disclosed in U.S. patent application Ser. No. 10/427,051, filed Apr. 30, 2003, now U.S. Pat. No. 7,038,577, incorporated above, an imaging system for a vehicle and useful in this present invention comprises an imaging array sensor having a plurality of photo-sensing or accumulating or light sensing pixels, and a control responsive to the imaging array sensor. The imaging array sensor is positioned at the vehicle and operable to capture an image of a scene occurring exteriorly of the vehicle. The control is operable to process the captured image, which comprises an image data set representative of the exterior scene. The control is operable to apply an edge detection algorithm to the image captured by the imaging array sensor to detect edges or objects present exteriorly of the vehicle. The control may be operable to determine whether the detected edges or objects are indicative of a significant object or object of interest. The control is operable to process a reduced data set or subset of the image data set, which is representative of a target zone or area of the exterior scene, more than other image data representative of areas of the exterior scene which are outside of the target zone. The control thus may process image data of the reduced data set or subset, such as by applying an edge detection algorithm to the reduced data set, and substantially discount or limit processing of the other image data which is outside of the reduced data set or subset of the image or of the target zone of the exterior scene.

The control may be operable to adjust the reduced data set or subset and the corresponding target zone in response to various threshold criterion. The control may be operable to adjust the reduced data set or target zone in response to a distance to a detected edge or object. The control may approximate a distance to a portion of a detected edge or object in response to a location of the pixel or pixels capturing the portion in the captured image. The pixel location may be determined relative to a target pixel which may be directed generally at the horizon and along the direction of travel of the vehicle. For example, the control may be operable to approximate the distance using spherical trigonometry in response to a pixel size, pixel resolution and field of view of the imaging array sensor. The control may access an information array which provides a calculated distance for each pixel within the reduced data set or target zone to approximate the distance to the portion of the detected edge or object.

In order to determine if a detected edge or detected edges is/are part of or indicative of a vehicle, the control may be operable to determine if the detected edge or edges is/are associated with an ellipse or partial ellipse, since the ellipse or partial ellipse may be indicative of a tire of a vehicle near the equipped vehicle, such as a vehicle in a lane adjacent to the equipped vehicle. The control may also be operable to track one or more of the detected edges between subsequent frames captured by the imaging array sensor to classify and/or identify the object or objects associated with the detected edge or edges.

The object detection system or imaging system may comprise a lane change assist system operable to detect vehicles or objects of interest sidewardly of the vehicle. Optionally, the control may be in communication with a forward facing imaging system. The forward facing imaging system may communicate at least one of oncoming traffic information, leading traffic information and lane marking information to the control of the lane change assist system to assist the lane change assist system in readily identifying vehicles at the side of the subject vehicle or adjusting a reduced data set or an area or zone of interest within the captured image. The control may be operable to adjust the reduced data set or target zone in response to the forward facing imaging system.

Optionally, the object detection system or imaging system may comprise a forward facing imaging system, such as a lane departure warning system. The lane departure warning system may provide a warning or alert signal to the driver of the vehicle in response to a detection of the vehicle drifting or leaving its occupied lane.

It is further envisioned that many aspects of the present invention are suitable for use in other vehicle vision or imaging systems, such as other side object detection systems, forward facing vision systems, such as lane departure warning systems, forward park aid systems or the like, rearward facing vision systems, such as back up aid systems or rearward park aid systems or the like, or panoramic vision systems and/or the like.

Also, a full video image captured by the likes of a reversing camera or a forward facing night vision camera or a sidelane-monitoring camera can be displayed on/via the vehicle windshield (or elsewhere) by the likes of a MicroHUD™ device and, conceptually, thus replacing the exterior mirrors with cameras. For example, a driver sidelane video image and a passenger sidelane video image, both preferably with graphic overlays thereon, can be displayed at respective sides of the vehicle windshield via a MEMS-based display system (such as via a MicroHUD™ HUD display device) and with the image visible to the driver by viewing the vehicle windshield (such as via an optical image combiner created on the inner glass surface of the windshield and/or onto the polymeric laminating interlayer (typically a sheet of polyvinyl butyral or of silicone or the like) utilized in the laminate windshield).

Optionally, a laser emitter or laser diode or the like may be positioned within the mirror casing and behind the reflective element, and may be used to emit radiation onto a reflector (such as a microelectromechanical scanner (MEMS)) within the mirror casing that reflects the radiation toward and through the mirror reflective element for viewing by a driver of the vehicle (such as by utilizing aspects described in U.S. patent applications, Ser. No. 10/225,851, filed Aug. 22, 2002, now U.S. Pat. No. 6,847,487; and/or U.S. Ser. No. 11/105,757, filed Apr. 14, 2005; and/or U.S. provisional application Ser. No. 60/607,963, filed Sep. 8, 2004, which are hereby incorporated herein by reference).

Such a laser scanning display device may provide enhanced display characteristics for enhanced viewing of the display at the reflective element by the driver of the vehicle. Typically, in order to use a laser to back light a display area (such as an area of about 2 cm square or thereabouts), the laser beam may be projected through an optic that broadens the beam to the desired size, whereby the intensity of the beam is reduced. An advantage of such scanning display technologies is the intensity of the display delivered, and so its ability to be seen even under high ambient driving conditions (such as a sunny day). For example, should a standard backlit TFT LCD display be placed behind a transflective mirror element in the likes of an interior rearview mirror assembly, the front or first surface reflection off the front glass surface (typically around 4 percent of the light incident thereon) often far exceeds the intensity of the light transmitted through the transflective mirror reflective element used. Such transflective mirrors also reflect coincident with the reflection off the front surface, and thus further exasperate the washout of the display image being transmitted/emitted through the reflective element. Even if the reflective coating is locally fully removed to create a light transmitting window, reflectivity off the front glass surface often causes display washout and inability to appropriately read what is being viewed at the display. This is particularly problematic for video display (such as for the likes of a rear backup event or side lane maneuver event or the like).

Thus, one advantage of use of such a scanning display technology (such as described in further detail below) is that the full intensity of the laser is used, but by using the movable mirror/reflector of the microelectromechanical scanner (MEMS), the narrow point like, super high intensity beam rapidly moves across the display image dimension at a rate that is faster than the eye/brain can register, such that the eye/brain perceives a continuous (or substantially continuous) super bright image. Thus, using the concepts of the present invention as described below, a full video image can effectively be projected through or on a surface of the rearview mirror reflective element in a manner not unlike what can be seen during outdoor laser displays or the like (such as when images and video is laser written on the sides of buildings or clouds or the like). Also, multiple lasers of the same color can be focused so that their beams coincide at roughly the same point on the MEMS reflector so that the intensity of any one image element as written is correspondingly enhanced.

Figure 28:
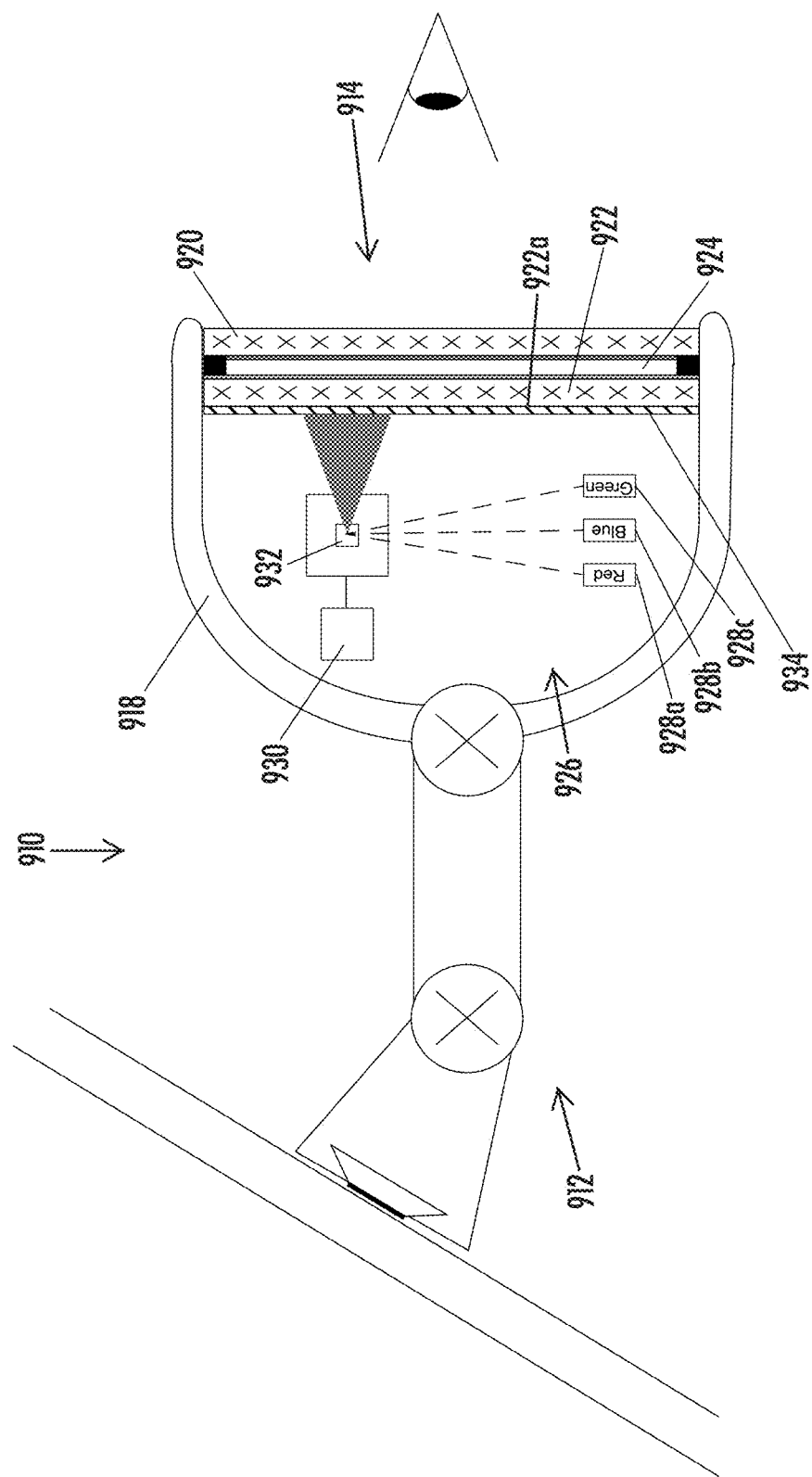
FIG. 28 is a sectional view of an interior rearview mirror assembly incorporating a laser display device in accordance with the present invention.

For example, and with reference to FIG. 28, an interior rearview mirror assembly 910 is pivotally or adjustably mounted to an interior portion of a vehicle, such as via a double ball mounting or bracket assembly 912. Mirror assembly 910 includes an electro-optic or electrochromic reflective element 914 supported at or in a housing or casing 918. The mirror assembly 910 includes a scanning display device 926 that is operable to display information (such as text, alphanumeric characters, icons, images, video images, or other indicia or information or the like) at the reflective element 914 for viewing by a driver of the vehicle. Advantageously, display device 926 is housed behind (to the rear of) the mirror reflective element and thus is within mirror casing 918. Thus, the automaker may acquire and install mirror assembly 910 (with the scanning display capability included) across a variety of vehicle models and lines. Reflective element 914 includes a front substrate 920 and a rear substrate 922 and an electro-optic medium 924 disposed therebetween, and may comprise a transflective reflective element that allows light from the display device 926 to pass therethrough for viewing by the driver of the vehicle, such as by utilizing principles described in U.S. Pat. Nos. 6,690, 268; 5,668,663 and/or 5,724,187, and/or in U.S. patent applications, Ser. No. 10/054,633, filed Jan. 22, 2002, now U.S. Pat. No. 7,195,381; and/or U.S. Ser. No. 11/021,065, filed Dec. 23, 2004, now U.S. Pat. No. 7,255,451; and/or PCT Application No. PCT/US03/29776, filed Sep. 9, 2003; and/or PCT Application No. PCT/US03/35381, filed Nov. 5, 2003; and/or U.S. provisional applications, Ser. No. 60/630, 061, filed Nov. 22, 2004; Ser. No. 60/667,048, filed Mar. 31, 2005; Ser. No. 60/629,926, filed Nov. 22, 2004; Ser. No. 60/531,838, filed Dec. 23, 2003; Ser. No. 60/553,842, filed Mar. 17, 2004; and Ser. No. 60/563,342, filed Apr. 19, 2004, and/or PCT Application No. PCT/US03/40611, filed Dec. 19, 2003, which are all hereby incorporated herein by reference. Optionally, use of an elemental semiconductor mirror, such as a silicon metal mirror, such as disclosed in U.S. Pat. Nos. 6,286,965; 6,196,688; 5,535,056; 5,751,489 and 6,065,840, and/or in U.S. patent application Ser. No. 10/993,302, filed Nov. 19, 2004, now U.S. Pat. No. 7,338, 177, which are all hereby incorporated herein by reference, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side mirrors are bent or curved. Optionally, the curved reflective element or glass substrate may be formed by first taking flat glass sheets/shapes that are hydrophilic coated and then bending the glass sheets/shapes to from bent (convex or aspheric) sheets/shapes. The bent sheets/shapes are non-crazed/optically clear after bending and still maintain the hydrophilic property after bending. Optionally, the bent sheets/shapes can then also be coated with a transparent conductive material, such as an ITO material or the like, on their "second" surface, such that such a hydrophilic first surface coated and transparent conductive material coated second surface substrate can be used as a front or first substrate in an electro-optic reflective element or mirror cell, such as an electrochromic reflective element or mirror cell.

For example, sheets of hydrophilic coated glass may be procured, such as from various sources. For example, suitable bendable hyrdrophilic-coated glass sheets are available from KUPO CO., LTD of Taipei, Taiwan under the trade name ACTMIR. ACTMIR hydrophilic-coated glass can be activated by exposure to ultraviolet (UV) irradiation (under 400 nm) that is present in sunlight. Low power ultraviolet irradiation (about 0.1 to about 1.0 mW/CM2) is sufficient to activate ACTMIR's photocatalytic hydrophilic capability. ACTMIR achieves its hydrophilic property using a titanium dioxide photocatalyst formed via nanoparticulate coating technology. This nanomaterial coating layer(s) can be first bent at high temperatures (typically about 700 Celsius or higher) without losing its cosmetic quality or hydrophilic capability, and then the bent hydrophilic-coated glass can be coated on the side opposite to that of the hydrophilic layer(s) with a transparent conductor, such as ITO or the like, that is typically deposited at temperatures of about 350 to about 450 degrees Celsius or higher.

The flat sheets are thus brought to a glass bender and are bent to either a convex or aspheric radius of curvature, but with the flat, hydrophilic coated glass loaded into the bender such that the hydrophilic coated surface is on the convex surface of the resultant bent sheet of glass. The hydrophilic coating or coatings selected and utilized are such that the coating or coatings can withstand the high temperatures and mechanical stresses of a glass bending operation while still maintaining their hydrophilic property and propensity, and while still sustaining good cosmetic optical quality (such as little to no crazing, flaking or other cosmetic optical degradation) through and after the bending/annealing process. After being so bent, such hydrophilic clear glass bent lites/mini-lites/shapes can be transparent conductive coated (such as with an ITO coating or the like) on the concave surface and subsequently used in the manufacture of an electrochromic reflective element or cell. Prior known hydrophilic electrochromic manufacturing operations typically require coating of the convex surface after glass bending. The ability to hydrophilic coat—then bend (with the hydrophilic coating on the convex surface of the bent glass)—then ITO coat the concave surface—then EC cell manufacture has advantages in reduction of complexity and cost of the electrochromic reflective element or cell.

Display device 926 comprises a scanning beam display system that includes a plurality of laser light sources or diodes 928a, 928b, 928c, a controller 930 and a microelectromechanical scanner (MEMS) 932. The display device 926 is contained within the interior casing 918 of mirror assembly 910. The controller 930 receives and/or generates image signals that control the intensity, mix and on-time of the light output by the three laser diodes 928a, 928b, 928c. The controller 930 also establishes the coordinates for the movable elements of the MEMS assembly 932 so that the individual picture elements (pixels) of the displayed image are created for view by the driver or other vehicular occupant. For monochrome (one-color) systems, only one laser diode source may be used. Optionally, for full-color displays, three light sources (e.g., red, green and blue) are modulated and merged to produce an image element of the appropriate color. Under the control of controller 930, a horizontal and vertical scanner or a single micro-electromechanical scanner (MEMS) 932 directs the light beams received from laser diodes 928a, 928b, 928c, and projects them onto the rear of (and/or into the body of) mirror reflective element 914 to create the image viewed. Optics (not shown) may be included as desired to achieve the desired spatial and resolution dimensions displayed.

For example, mirrors and/or lens elements or other refractive or diffractive and/or reflective optical elements can be used to project the rapidly scanned beam or beams of light onto the rear of the mirror element (and/or into the body thereof) to create the image seen. Such a scanned-beam automotive mirror display can deliver very high resolution, very high intensity images, with the resolution being limited principally by diffraction and optical aberrations in the light sources used within the mirror casing. Optionally, the rear surface 922a of the rear substrate 922 of the reflective element 914 may include a diffuser coating or layer/combiner 934 or other diffuser means or the like, and the diffuser coating or layer or area may be over substantially the entire rear surface 922a or may be over only that portion of the rear or fourth surface rastered by light reflected off the MEMS 932 that creates the display image. Also, and optionally, diffuser coatings and/or layers/combiners may be included within the body of the mirror reflective element, such as on the third surface of the electro-optic reflective element. Although illustrated as a transflective mirror element, the reflective coating may be locally removed from a non-transflective mirror element to create a window for viewing the display thereat or therethrough. The window region may include a diffuse coating and/or layer/combiner or the like, such as on the rear surface of the reflective element (such as if the reflective element is an electro-optic or electrochromic reflective element or a non-electro-optic or prismatic reflective element) or on the third surface (such as if the reflective element is an electro-optic or electrochromic reflective element), if desired.

The laser diodes may be rastered or scanned at a desired rate over the MEMS reflector so that a generally continuous image is created by reflection off the MEMS and onto/into and as viewed through the reflective element. In the illustrated embodiment, the laser diodes are positioned to project or emit or radiate their laser beams so that they are incident on the electromechanically moved portion of the MEMS and whereby the laser beams are reflected toward the reflective element by the MEMS reflector.

The MEMS 932 may be positioned within the casing and angled or oriented to reflect illumination or radiation from the laser diodes 928a, 928b, 928c toward the rear surface of the reflective element 914. The reflective surface of the MEMS 932 may be created on a chip, and may be adjusted to provide the desired projection or reflection angle through the reflective element 914 for viewing by a driver of the vehicle. The MEMS reflector may be electrically adjusted and/or electromechanically adjusted to provide the appropriate or desired information or icon or image for the laser beams to project onto and through the reflective element. The laser diodes 928a, 928b, 928c may comprise any laser diodes, such as, for example, laser diodes of the types commercially available from Cree Research Inc. of Durham, N.C., which offers different color laser diodes, such as visible red laser diodes and/or blue laser diodes, such as gallium nitride based blue lasers, and other colors as may be desired, such as green.

Because of the high intensity illumination provided by such laser diodes, the intensity at the display region of the reflective element will be sufficient to dominate the reflection of the rearward scene off of the front surface of the front substrate of the reflective element, and thus will not appear washed out, even during high ambient lighting conditions, such as on a sunny day or the like. Optionally, the intensity of the laser diodes may be adjusted, such as via manual adjustment and/or via automatic adjustment, such as in response to the ambient light levels in the cabin of the vehicle or in the vicinity of the display. The display information may be associated with any accessory or component or feature of the interior rearview mirror assembly or of the vehicle, such as point-to-point navigational instructions, status information for various functions, such as passenger side airbag status, tire pressure status and/or the like, or compass heading or temperature information or other information or the like.

Although shown and described as being incorporated into an electro-optic or electrochromic interior rearview mirror assembly, it is envisioned that the scanning beam display system may be incorporated into a prismatic interior rearview mirror assembly or a transflective prismatic rearview mirror assembly (such as by utilizing principles described in PCT Application No. PCT/US03/29776, filed Sep. 19, 2003; U.S. patent applications, Ser. No. 11/021,065, filed Dec. 23, 2004, now U.S. Pat. No. 7,255,451; and/or U.S. Ser. No. 10/993,302, filed Nov. 19, 2004, now U.S. Pat. No. 7,338, 177, which are all hereby incorporated herein by reference). Optionally, the laser scanning beam display system may be incorporated into an exterior rearview mirror assembly without affecting the scope of the present invention. For exterior rearview mirror applications, the display system may function to display blind spot detection icons or information, or turn signals or security lights or the like, at the reflective element of the exterior rearview mirror assembly of the vehicle. For example, a non-electro-optic/fixed reflectivity reflector may use an elemental semiconductor mirror, such as a silicon metal mirror, such as disclosed in U.S. Pat. Nos. 6,286,965; 6,196,688; 5,535,056; 5,751,489 and 6,065, 840, and/or in U.S. patent application Ser. No. 10/993,302, filed Nov. 19, 2004, now U.S. Pat. No. 7,338,177, which are all hereby incorporated herein by reference, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side mirrors are bent or curved.

Also, a video display and/or other information display may be located at the interior mirror assembly (or at a windshield electronics module/accessory module) that utilizes a Micro-Electro-Mechanical-Systems (MEMS) structure combined with thin film optics, such as is available Iridigm of San Francisco, Calif. under the trade name iMoD™ technology. This display technology (such as is described in U.S. Pat. Nos. 6,794,119; 6,741,377; 6,710,908; 6,680,792; 6,674,562; 6,650,455; 6,589,625; 6,574,033; 5,986,796 and 5,835,255, which are hereby incorporated herein by reference) is designed to deliver lower power consumption and excellent display image quality, and can withstand extreme temperatures and can be viewed in substantially any environment, including bright sunlight.

Optionally, and particularly for an exterior mirror reflective element, a display may be etched or formed or established through the mirror reflector layer or coating and back lit via rear mounted light sources so as to illuminate the display indicia or icon. For example, FIGS. 35 and 36 show an exterior electrochromic (EC) mirror unit that includes an indicator (such as a turn signal indicator such as is disclosed in U.S. Pat. No. 4,906,085, or a blind spot system alert indicator such as disclosed in U.S. Pat. No. 5,313,335, the disclosures of which are incorporated by reference in their entireties herein) that is disposed to the rear of the EC reflector element so that light emitted by the rear-disposed indicator shines through the EC medium to be viewed from the front of the EC mirror element when the rear-disposed indicator light source is illuminated. The EC reflective element typically is powered by photosensors located at the interior mirror assembly within the cabin of the vehicle to which the exterior EC mirror unit is mounted. Such as is disclosed in U.S. Pat. No. 2,263,382, issued to Gotzinger (the disclosure of which is incorporated by reference in its entirety herein), when the light of the indicator light source behind the EC mirror cell is turned on, there is illumination through a symbol scratched into the metallic reflector layer on the third surface of the EC cell (that may be constructed such as is disclosed in U.S. Pat. Nos. 5,668,663; 5,724,187; 5,910,854 and/or 6,002,511, the disclosures of which are incorporated by reference in their entireties herein) or in a fourth surface reflector layer (such as disclosed in U.S. Pat. No. 5,786,772, the disclosure of which is incorporated by reference in its entirety herein). Such fine scratches or holes are created in the metal reflector layer such as by laser ablation. For example, and as shown in FIGS. 35 and 36, an ablating laser can be used to create fine scratches or holes (such as fine circular holes or fine ovals or fine star-shaped holes or other designs of holes/scratches) by removing locally the likes of a rhodium/chromium or a silver or an ITO/silver/ITO or a ruthenium/chromium metallic reflector layer to create a symbol (such as for a blind spot indicator and/or a turn signal indicator). As described in U.S. Pat. No. 2,263,382, issued to Gotzinger, the turn signal or blind spot symbol or icon is formed by an aggregation of fine scratches or holes in the "silvering" of the mirror element so that when the rear-disposed light (such as a red or amber light emitting diode or a plurality of light emitting diodes) is turned on, there is illumination through the scratched lines/holes, which are so fine as to be hardly noticeable to a viewer of the exterior mirror on the vehicle when not illuminated. Also, the illumination may be diffused in the scratches and presents the appearance of a solid area of color/illumination.

Referring to FIGS. 35 and 36, an exterior mirror reflective element 950 of an exterior rearview mirror assembly includes a glass substrate 952 with a metallic mirror reflector layer or coating 954 (such as a coating of rhodium/chromium or ruthenium chromium or a silver or an ITO/silver/ITO or the like) disposed on a surface of the glass substrate (such as on a front or third surface of a rear substrate of an electrochromic reflective element or on a front or rear surface of a single substrate reflector). Note that the glass substrate can form a rear substrate for an electro-optic, such as electrochromic, reflective element, such as the glass substrates 952', 952" shown in FIGS. 39 and 40 (discussed below), whereupon mirror reflective layer or coating 952', 952" would constitute a third surface reflector, or the glass substrate (such as glass substrate 952 shown in FIGS. 35 and 36) may be a single substrate mirror reflector element (commonly chrome coated or the like) whereupon metallic reflector layer or coating 954 may be a first surface reflector layer or a second surface reflector layer, depending on the preference of a particular automaker. A plurality of fine holes or scratches or ports 956 may be scratched or established through the reflector coating 954 and in clusters 958 that cooperate to define an iconistic display or indicia 960, such as a turn signal symbol or icon. The exterior rearview mirror assembly includes one or more illumination sources disposed behind the reflective element and activatable or energizable to emit illumination that passes or transmits through the scratches 956 so as to be viewable be a person viewing the reflective element of the exterior mirror assembly. As shown in FIG. 36, the scratches or holes 956 may be spaced apart with portions 954a of the reflector coating 954 therebetween, and may have inter-spacing between adjacent scratches or holes and preferably having the inter-space spacing or distance between adjacent scratches or holes being greater than the width/diameter dimension of the individual scratches/holes. For example, the scratches may have a diameter or width dimension of about 0.1 mm to about 0.2 mm, and may aggregate in locally clustered scratches/holes, with the scratches/holes being inter-spaced about 0.2 mm to about 0.3 mm apart from one another. Although shown and described as being formed or established at an exterior rearview mirror reflective element, aspects of the fine scratched surface and indicia/symbol described above may applicable to interior rearview mirror assembly applications, without affecting the scope of the present invention. Optionally, a photo sensor or photodiode or the like may be positioned within the mirror assembly and generally behind one or more of the fine scratches so as to sense glare and/or ambient light through the fine scratch or scratches, without affecting the scope of the present invention.

Figure 37A:
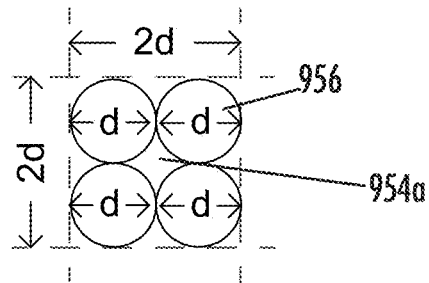
FIGS. 37A and 37B are enlarged views of different spacings of holes in the coating layer suitable for the display of FIGS. 35 and 36.
Figure 37B:
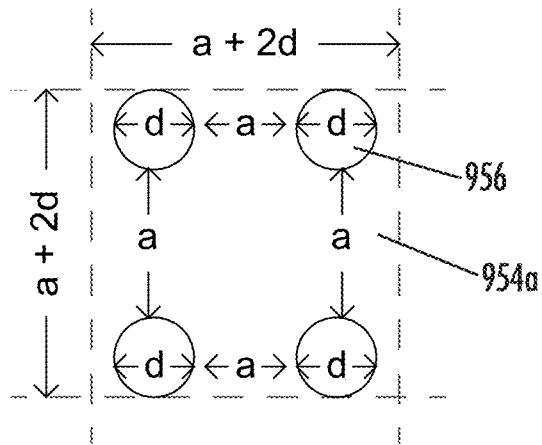

As illustrated in FIGS. 37A, 37B, the fine scratches may be selectively spaced apart so as to provide a desired packing area and consequent local light transmission. Referring to FIG. 37A, circles or scratches that are substantially adjacent to or abutting one another form a closest packing. More preferably, and as shown in FIG. 37B, individual scratches or holes in the metallic reflector coating or layer are spaced apart (by a spacing dimension (a) in FIG. 37B), so that the mirror reflector coating is present between the scratches. Note that the spacing dimension (a) may or may not be equal to scratch size dimension (b). Optionally, the spacing dimension may be greater than the diameter or width dimension of the scratches/holes. The desired light transmission of light from the illumination source disposed behind the mirror element and shining through the cluster of fine scratches is principally determined by the width or diagonal or cross dimension (d) of the scratches and the interspace spacing dimension (a) between the scratches. The light transmission ratio may be crudely estimated as a function of the diameter (d) (or width or other dimension or cross dimension) of the scratches and the inter-spacing distance (a) between the scratches. More particularly, the light transmission ratio is calculated via the following equation: % $T=4d^2/(a^2+4ad+4d^2)$ %. Various hole sizes and spacing distances and transmission ratios are shown in the table of FIG. 38.

Figure 39:
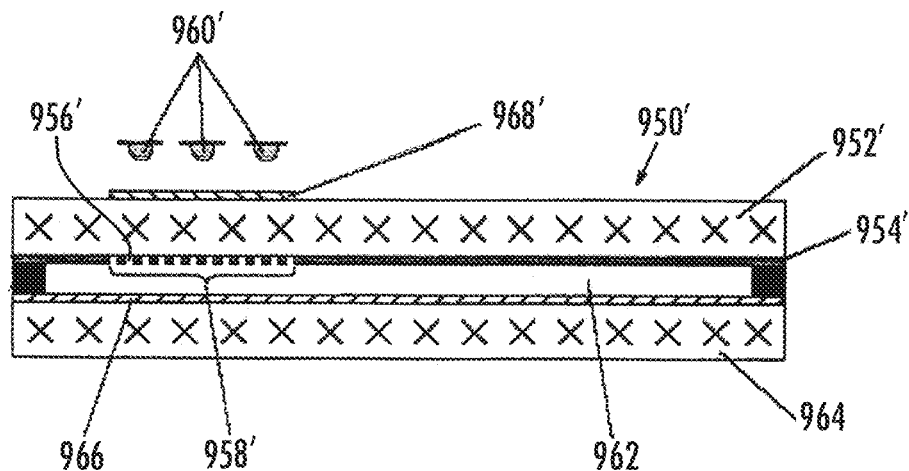
FIG. 39 is a sectional view of another reflective element in accordance with the present invention.
Figure 40:
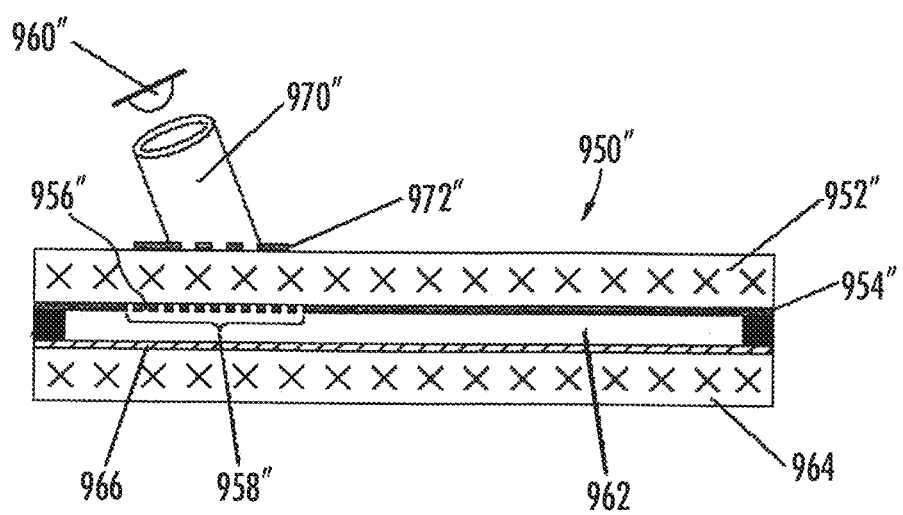
FIG. 40 is a sectional view of another reflective element in accordance with the present invention.

Optionally, and as shown in FIGS. 39 and 40, the clusters 958', 958" may be established in a third surface reflector coating or layer 954', 954" of an electro-optic reflective element 950', 950", with an indicator or illumination source 960', 960" positioned behind the rear substrate 952', 952" and operable to transmit illumination through the rear substrate 952', 952", the scratches/holes 956', 956", the electrochromic medium 962 and the front substrate 964 (which has a transparent conductive coating 966, such as an ITO or the like, on its rear or second surface). As shown in FIG. 39, the illumination source 960' may comprise a plurality of LEDs or the like positioned rearward of a light directional filter 968' on the rear surface of the rear substrate 952' so as to direct light from the LEDs in a desired direction, such as generally toward the driver of the host vehicle for an object-in-a-blind-spot alert system or the like (or generally away from the driver of the host vehicle for a turn signal indicator). Likewise, and with reference to FIG. 40, the illumination source 960" may be located at a directional tube 970" that is angled to direct the illumination in the desired direction (such as generally toward the driver of the vehicle for an object-in-a-blind-spot alert system or the like or generally away from the driver of the host vehicle for a turn signal indicator). As shown in FIG. 40, a mask 972" may be provided at the rear surface of the rear substrate 952" to define the blindspot alert icon (such as an ISO icon or the like). The directional tube and indicator may utilize aspects of the indicator device described in U.S. provisional application Ser. No. 60/171,093, filed Sep. 14, 2005, which is hereby incorporated herein by reference. The illumination source or sources and the light directing film and/or light directing structure or tube thus function to provide a directional display that is principally viewable by a person viewing the reflective element along the direction of the principle axis of light transmitting through the reflective element.

Depending on the fineness of the scratches (about 0.075 mm to about 0.3 mm width/diameter preferred; about 0.1 mm to about 0.25 mm width/diameter more preferably; about 0.15 mm to about 0.22 mm width/diameter most preferably) and their packing density relative to each other (a scratch/hole inter-space distance of about 0.075 mm to about 0.3 mm preferred; about 0.1 mm to about 0.25 mm more preferably; about 0.15 mm to about 0.22 mm most preferably), the effective transmission through the local fine scratched symbol or icon can vary from about 10 percent transmission for visible light to about 40 percent (because the packing density of the clustered light-transmitting holes scratched in the mirror reflector layer to locally-adjacent substantially non-light transmitting non-scratched mirror reflector layer coating is about 10 percent to about 40 percent). In general, it is preferable to have a percent transmission or percent transmitting or percent transmissivity for such Gotzinger-based fine-scratched symbol to be about 10 percent to about 20 percent (about 12 percent to about 17 percent more preferred; about 13 percent to about 16 percent most preferred), as this makes the symbol particularly hardly noticeable while preserving local average reflectivity (at least about 40 percent average local preferred, more preferably at least about 50 percent and most preferably at least about 60 percent). For example, and as seen in the table in FIG. 38, a scratch/hole width or diameter of about 0.8 mm to about 0.25 mm and an inter-spacing of about 0.3 mm to about 0.5 mm can give a percent transmission through the blind spot symbol or through the turn signal symbol/icon of about 10 percent transmission to about 20 percent transmission while still having the presence of the symbol largely unnoticeable to a viewer unless the rear-disposed indicator light source is illuminated by applying electrical power, and while locally preserving an average of at least about 50 percent transmission at the fine scratched surface. Naturally, and depending on the particular mirror constructions involved and on the light intensity output of rear-disposed light sources, other scratch or hole sizes and/or inter-space dimensions may be contemplated. In general, it is preferred to have a ratio of the spacing between scratches/holes dimension to the dimension of the scratch/hole itself be at least greater than about 1.1, more preferably greater than about 2, and most preferably greater than about 4; but it is also preferred to have the ratio of the spacing between scratches/holes dimension to the dimension of the scratch/hole itself be less than about 7, more preferably less than about 6, and most preferably less than about 5.

Changes and modifications to the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A rear backup system for a vehicle, said rear backup system comprising:
   a rear backup video camera at a rear portion of a vehicle equipped with said rear backup system;
   said rear backup video camera having a rearward field of view external of the equipped vehicle;
   said rear backup video camera operable to capture image data;
   a display device comprising a video display screen operable to display video images viewable by a driver of the equipped vehicle;
   wherein, responsive to a transmission of the equipped vehicle being shifted into reverse gear to commence a backup event, video backup images derived from image data captured by said rear backup video camera are displayed at said video display screen of said display device;
   wherein display of the video backup images at said video display screen continues after shifting of the vehicle transmission out of reverse gear;
   wherein display of the video backup images at said video display screen ceases once a threshold condition is met;
   wherein the threshold condition comprises a threshold period of time elapsing after the vehicle transmission has been shifted out of reverse gear, the threshold period of time constituting a linger time no longer than 10 seconds; and
   wherein said rear backup video camera continues to capture image data at least until the linger time elapses.

2. The rear backup system of claim 1, wherein the linger time is longer than 5 seconds.

3. The rear backup system of claim 2, wherein an instruction is displayed with the video backup images to assist the driver during the backup event.

4. The rear backup system of claim 2, wherein an icon is displayed with the video backup images to assist the driver during the backup event.

5. The rear backup system of claim 2, wherein a marking is displayed with the video backup images to assist the driver during the backup event.

6. The rear backup system of claim 2, wherein an indicia is displayed with the video backup images to assist the driver during the backup event.

7. The rear backup system of claim 2, wherein the backup event comprises hitching a trailer to a trailer hitch of the equipped vehicle.

8. The rear backup system of claim 2, wherein said video display screen of said display device comprises a backlit thin film transistor LCD video display screen.

9. The rear backup system of claim 8, wherein said backlit thin film transistor LCD video display screen is backlit by a laser.

10. The rear backup system of claim 8, wherein said backlit thin film transistor LCD video display screen is backlit by at least one white light emitting light emitting diode.

11. The rear backup system of claim 2, wherein said video display screen of said display device comprises an organic light emitting diode (OLED) video display screen.

12. The rear backup system of claim 2, wherein said display device comprises a microelectromechanical scanner.

13. The rear backup system of claim 2, wherein said display device is disposed at an interior rearview mirror assembly of the equipped vehicle, and wherein said display device displays video backup images through a mirror reflective element of said interior rearview mirror assembly for viewing by the driver of the equipped vehicle.

14. The rear backup system of claim 13, wherein said interior rearview mirror assembly comprises a molded plastic mounting arm having at least one ball member at at least one end thereof and having electrical conducting elements extending therethrough, and wherein a mirror mounting portion is molded over said ball member, and wherein said mounting arm comprises a mounting arm polymeric material having a first linear mold shrinkage factor and a first flexural modulus and wherein said mirror mounting portion comprises a mirror mounting polymeric material having a second linear mold shrinkage factor and a second flexural modulus, and wherein said second linear mold shrinkage factor is greater than said first linear mold shrinkage factor and wherein said second flexural modulus is lower than said first flexural modulus.

15. The rear backup system of claim 2, wherein the equipped vehicle comprises an interior rearview mirror assembly, and wherein said interior rearview mirror assembly comprises a mirror reflective element, and wherein said mirror reflective element comprises a transflective mirror reflector, and wherein said video display screen of said display device comprises a backlit thin film transistor LCD video display screen, and wherein said display device is disposed at said interior rearview mirror assembly behind said transflective mirror reflector, and wherein the displayed video backup images are viewable through said transflective mirror reflector of said mirror reflective element by the driver of the equipped vehicle, and wherein said interior rearview mirror assembly comprises an electrochromic mirror reflective element comprising a front substrate having first and second surfaces and a rear substrate having third and fourth surfaces, and wherein an electrochromic medium is disposed between said second surface of said front substrate and said third surface of said rear substrate, and wherein said transflective mirror reflector is disposed at said third surface of said rear substrate.

16. The rear backup system of claim 2, wherein said display device is disposed at an interior rearview mirror assembly of the equipped vehicle, and wherein, when the transmission of the equipped vehicle is shifted into reverse gear, said video display screen of said display device slides out laterally from a retracted non-viewing position behind a mirror reflective element of said interior rearview mirror assembly to an extended viewing position where the displayed video backup images are viewable by the driver of the equipped vehicle, and wherein said video display screen remains its extended position until the linger time elapses, and wherein after the linger time elapse, said video display screen of said display device slides laterally back to its retracted non-viewing position behind the mirror reflective element of said interior rearview mirror assembly.

17. A rear backup system for a vehicle, said rear backup system comprising:
   a rear backup video camera at a rear portion of a vehicle equipped with said rear backup system;
   said rear backup video camera having a rearward field of view external of the equipped vehicle;
   said rear backup video camera operable to capture image data;
   a display device comprising a video display screen operable to display video images viewable by a driver of the equipped vehicle;
   wherein, responsive to a transmission of the equipped vehicle being shifted into reverse gear to commence a backup event, video backup images derived from image data captured by said rear backup video camera are displayed at said video display screen of said display device;
   wherein display of the video backup images at said video display screen continues after shifting of the vehicle transmission out of reverse gear;
   wherein display of the video backup images at said video display screen ceases once a threshold condition is met;
   wherein the threshold condition comprises a forward motion speed of the equipped vehicle exceeding a threshold speed of forward motion after the vehicle transmission has been shifted out of reverse gear and into forward gear;
   wherein the threshold speed of forward motion is at least 3 miles per hour; and
   wherein said rear backup video camera continues to capture image data at least up to when the threshold condition is met.

18. The rear backup system of claim 17, wherein the threshold speed of forward motion is 10 miles per hour.

19. The rear backup system of claim 17, wherein forward motion speed of the equipped vehicle is sensed by a speed sensor of the equipped vehicle.

20. The rear backup system of claim 19, wherein the speed sensor of the equipped vehicle comprises a wheel speed sensor.

21. The rear backup system of claim 19, wherein the speed sensor of the equipped vehicle comprises a wheel speed encoder.

22. The rear backup system of claim 17, wherein an instruction is displayed with the video backup images to assist the driver during the backup event.

23. The rear backup system of claim 17, wherein an icon is displayed with the video backup images to assist the driver during the backup event.

24. The rear backup system of claim 17, wherein a marking is displayed with the video backup images to assist the driver during the backup event.

25. The rear backup system of claim 17, wherein an indicia is displayed with the video backup images to assist the driver during the backup event.

26. The rear backup system of claim 17, wherein the backup event comprises hitching a trailer to a trailer hitch of the equipped vehicle.

27. The rear backup system of claim 17, wherein said video display screen of said display device comprises a backlit thin film transistor LCD video display screen.

28. The rear backup system of claim 17, wherein said video display screen of said display device comprises an organic light emitting diode (OLED) video display screen.

29. A rear backup system for a vehicle, said rear backup system comprising:

a rear backup video camera at a rear portion of a vehicle equipped with said rear backup system;

said rear backup video camera having a rearward field of view external of the equipped vehicle;

said rear backup video camera operable to capture image data;

a display device comprising a video display screen operable to display video images viewable by a driver of the equipped vehicle;

wherein, responsive to a transmission of the equipped vehicle being shifted into reverse gear to commence a backup event, video backup images derived from image data captured by said rear backup video camera are displayed at said video display screen of said display device;

wherein display of the video backup images at said video display screen continues after shifting of the vehicle transmission out of reverse gear;

wherein display of the video backup images at said video display screen ceases once a threshold condition is met;

wherein the threshold condition comprises forward travel of the equipped vehicle exceeding a threshold distance of forward travel after the vehicle transmission has been shifted out of reverse gear and into forward gear;

wherein the threshold distance of forward travel is at least 10 feet; and wherein said rear backup video camera continues to capture image data at least up to when the threshold condition is met.

30. The rear backup system of claim 29, wherein the threshold distance of forward travel is 20 feet or less.

31. The rear backup system of claim 29, wherein the threshold distance of forward travel is at least 20 feet.

32. The rear backup system of claim 29, wherein the threshold distance of forward travel is 30 feet or less.

33. The rear backup system of claim 32, wherein an instruction is displayed with the video backup images to assist the driver during the backup event.

34. The rear backup system of claim 32, wherein an icon is displayed with the video backup images to assist the driver during the backup event.

35. The rear backup system of claim 32, wherein a marking is displayed with the video backup images to assist the driver during the backup event.

36. The rear backup system of claim 32, wherein an indicia is displayed with the video backup images to assist the driver during the backup event.

37. The rear backup system of claim 32, wherein the backup event comprises hitching a trailer to a trailer hitch of the equipped vehicle.

38. The rear backup system of claim 32, wherein said video display screen of said display device comprises a backlit thin film transistor LCD video display screen.

39. The rear backup system of claim 32, wherein said video display screen of said display device comprises an organic light emitting diode (OLED) video display screen.

* * * * *